United States Patent
Rodriguez-Fraticelli et al.

(10) Patent No.: US 12,508,218 B2
(45) Date of Patent: Dec. 30, 2025

(54) COATING COMPOSITIONS

(71) Applicant: Coty Inc., New York, NY (US)

(72) Inventors: Mariano Agustin Rodriguez-Fraticelli, Lausanne (CH); Jose Maria Velazquez Mendoza, Nyon (CH); Marta Alexandra de Sousa Oliveira Maia, Versoix (CH)

(73) Assignee: Coty Inc., New York, NY (US)

( * ) Notice: Subject to any disclaimer, the term of this patent is extended or adjusted under 35 U.S.C. 154(b) by 913 days.

(21) Appl. No.: 17/616,797

(22) PCT Filed: Jun. 5, 2020

(86) PCT No.: PCT/US2020/036393
§ 371 (c)(1),
(2) Date: Dec. 6, 2021

(87) PCT Pub. No.: WO2020/247799
PCT Pub. Date: Dec. 10, 2020

(65) Prior Publication Data
US 2022/0304914 A1    Sep. 29, 2022

Related U.S. Application Data

(60) Provisional application No. 62/858,174, filed on Jun. 6, 2019.

(51) Int. Cl.
*A61K 8/73*      (2006.01)
*A61K 8/11*      (2006.01)
*A61Q 13/00*     (2006.01)

(52) U.S. Cl.
CPC .................. *A61K 8/73* (2013.01); *A61K 8/11* (2013.01); *A61Q 13/00* (2013.01); *A61K 2800/30* (2013.01)

(58) Field of Classification Search
CPC . A61K 8/738; A61K 8/73; A61K 8/35; A61K 8/11; A61K 8/735; A61K 8/604; A61K 8/608; A61K 8/8147; A61K 8/602; A61K 8/37; A61K 8/345; A61K 8/347; A61K 8/42; A61K 8/342; A61K 2800/622; A61K 2800/30; A61Q 13/00
USPC ........................................................ 512/4, 1
See application file for complete search history.

(56) References Cited

U.S. PATENT DOCUMENTS

| | | | |
|---|---|---|---|
| 4,324,703 A * | 4/1982 | Seldner .................. | A61Q 13/00 510/106 |
| 9,265,711 B2 | 2/2016 | Kulkarni et al. | |
| 2006/0243322 A1 | 11/2006 | Heltovics et al. | |
| 2009/0176690 A1 | 7/2009 | Laudamiel et al. | |
| 2012/0114569 A1 | 5/2012 | Kulkarni et al. | |
| 2014/0127335 A1 | 5/2014 | Miller et al. | |
| 2016/0303037 A1 | 10/2016 | Joshi et al. | |
| 2016/0362630 A1 * | 12/2016 | Holland ................ | A61Q 13/00 |

FOREIGN PATENT DOCUMENTS

| | | | |
|---|---|---|---|
| CN | 102933193 | 2/2013 | |
| CN | 106061459 A | 10/2016 | |
| CN | 106456816 A | 2/2017 | |
| CN | 106659280 A | 5/2017 | |
| CN | 107708652 A | 2/2018 | |
| CN | 107787217 A | 3/2018 | |
| CN | 107810259 A | 3/2018 | |
| CN | 114126572 | 3/2022 | |
| EP | 1331920 B1 | 6/2007 | |
| EP | 1289483 B1 | 8/2007 | |
| EP | 1289485 B1 | 9/2007 | |
| EP | 2063857 A2 | 6/2009 | |
| EP | 1331921 B1 | 1/2011 | |
| EP | 1289484 B2 | 4/2011 | |
| EP | 3103523 A1 | 12/2016 | |
| EP | 2453003 B1 | 5/2017 | |
| EP | 3300794 A2 | 4/2018 | |
| EP | 3423622 A1 | 1/2019 | |
| WO | WO-2011154926 A1 * | 12/2011 | ............... A61K 8/34 |
| WO | WO-2017144093 A1 | 8/2017 | |
| WO | WO-2017190035 A1 | 11/2017 | |
| WO | WO-2018053356 A1 | 3/2018 | |
| WO | 2019156707 | 8/2019 | |
| WO | 2019156708 | 8/2019 | |
| WO | WO-2019156708 A1 * | 8/2019 | ............. A61K 8/342 |
| WO | WO-2020247799 A1 | 12/2020 | |

OTHER PUBLICATIONS

"International Application Serial No. PCT/US2020/036393, International Search Report mailed Sep. 29, 2020", 5 pgs.
"International Application Serial No. PCT/US2020/036393, Written Opinion mailed Sep. 29, 2020", 10 pgs.
"Perfume Fixative (Glucam P-20 humectant)", Retrieved from the Internet: <URL: https://www.creatingperfume.com/GlucamP-20humectant.aspx>, (Jan. 1, 2015), 2 pgs.
"International Application Serial No. PCT US2020 036393, International Preliminary Report on Patentability mailed Dec. 16, 2021", 12 pages.
"Chinese Application Serial No. 202080051023.9, Office Action mailed Jun. 21, 2023", w Machine English Translation, 20 pgs.
"Chinese Application Serial No. 202080051023.9, Office Action mailed Dec. 9, 2023", w English Claims, 23 pgs.
"Chinese Application Serial No. 202080051023.9, Response filed Feb. 20, 2024 to Office Action mailed Dec. 9, 2023", w English Claims, 32 pgs.

(Continued)

*Primary Examiner* — Jessica Whiteley
(74) *Attorney, Agent, or Firm* — Schwegman Lundberg & Woessner, P.A.

(57) ABSTRACT

Various embodiments according to the present disclosure provide a coating composition. The coating composition includes a carrier. The coating composition further includes a substantially non-odorous fragrance modulator present in the amount of from about 0.1 wt % to about 50 wt %, relative to the total weight of the composition.

18 Claims, 1 Drawing Sheet

(56) References Cited

OTHER PUBLICATIONS

"Chinese Application Serial No. 202080051023.9, Decision of Rejection mailed Apr. 3, 2024", w English Claims, 14 pgs.
"Chinese Application Serial No. 202080051023.9, Request for Reexamination filed Jun. 5, 2024", 14 pgs.
"European Application Serial No. 20750415.0, Communication Pursuant to Article 94(3) EPC mailed Jul. 23, 2024", 5 pgs.

* cited by examiner

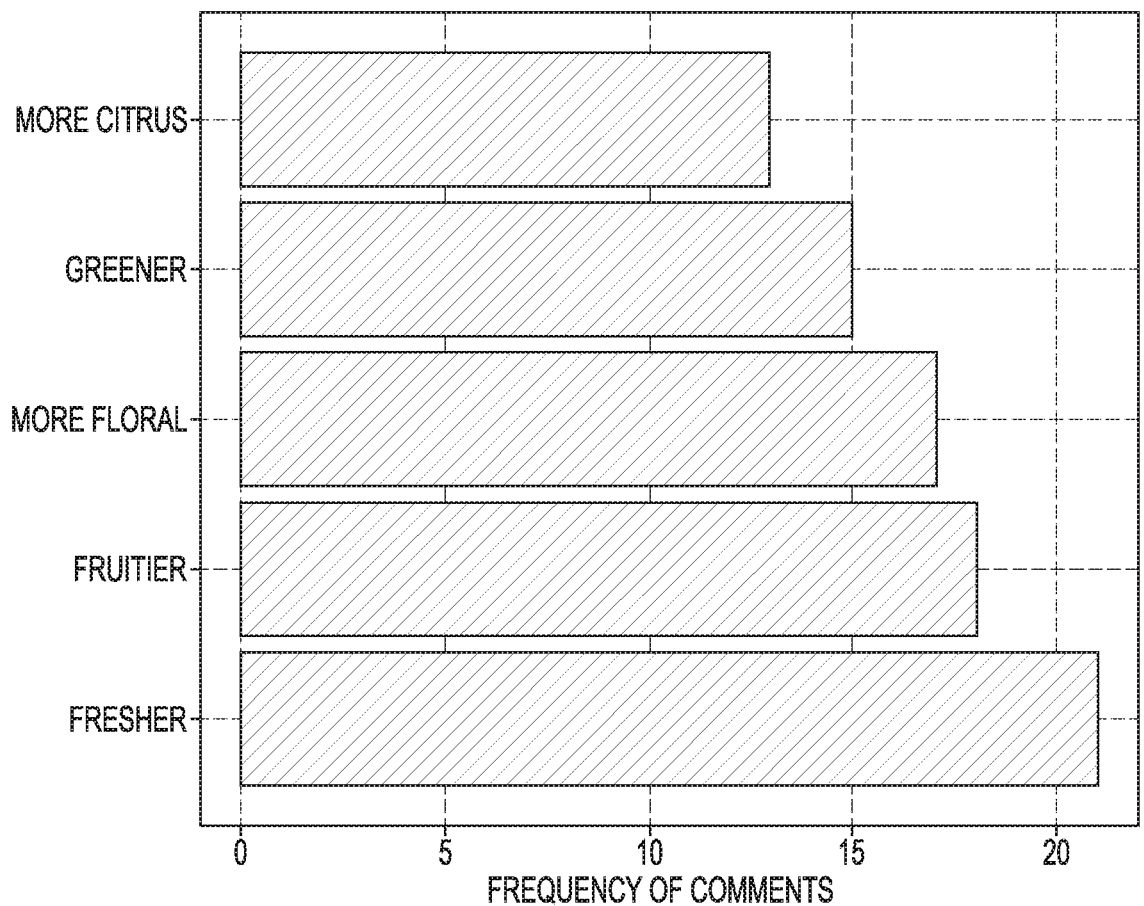

COATING COMPOSITIONS

CROSS-REFERENCE TO RELATED APPLICATION

This application is a U.S. National Stage Filing under 35 U.S.C. 371 from International Application No. PCT/US2020/036393, filed on Jun. 5, 2020, and published as WO 2020/247799 on Dec. 10, 2020, which application claims the benefit of priority to U.S. Provisional Patent Application Ser. No. 62/858,174 entitled "COATING COMPOSITIONS," filed Jun. 6, 2019, the disclosure of which is incorporated herein in its entirety by reference.

BACKGROUND

Fragrances can include fragrance components that can be classified, in part, by their volatility. Accordingly, these fragrance components may be referred to as a high-, middle-, or low-volatility fragrance components. Different fragrances may be dominated by any one or more of these components such that the fragrance may be associated with different perceptions by a user.

SUMMARY OF THE DISCLOSURE

Various embodiments according to the present disclosure provide a coating composition. The coating composition includes a carrier. The coating composition further includes a substantially non-odorous fragrance modulator present in the amount of from about 0.1 wt % to about 20 wt %, relative to the total weight of the composition.

Various embodiments according to the present disclosure provide a multi-component fragrance composition. The multi-component fragrance composition includes a coating composition. The coating composition includes a carrier. The coating composition further includes a substantially non-odorous fragrance modulator present in the amount of from about 0.1 wt % to about 20 wt %, relative to the total weight of the composition. The multi-component fragrance composition further includes a fragrance composition in contact with the coating composition.

Various embodiments according to the present disclosure further provide a method of using a coating composition. The coating composition includes a carrier. The coating composition further includes a substantially non-odorous fragrance modulator present in the amount of from about 0.1 wt % to about 20 wt %, relative to the total weight of the composition. The method includes contacting a fragrance composition with the coating composition.

BRIEF DESCRIPTION OF THE FIGURES

The drawings illustrate generally, by way of example, but not by way of limitation, various embodiments discussed in the present document.

FIG. 1 is a set of graphs identifying the most frequent comments by experts comparing a sample with coating vs. control (without coating) at t=3 h, in accordance with various embodiments.

DETAILED DESCRIPTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

As used herein, articles such as "a" and "an" when used in a claim, are understood to mean one or more of what is claimed or described.

As used herein, the terms "include", "includes" and "including" are meant to be non-limiting.

As used herein, the term "body splash" means a body care formulation that is applied to the body. Typically, the body splash is applied to the body after bathing and provides a subtle hint of scent to the body. Body splashes are commonly used by consumers who prefer less strong fragrance compositions. A body splash may comprise an ethanol-free composition according to the present invention which comprises from 0.2-8 wt %, relative to the total weight of the composition, of a fragrance component. The body splash may further comprise alkyl polyglucosides as non-ionic surfactants.

As used herein, the term "body spray" means a formulation comprising fragrance materials intended to be applied to the body to prevent or mask body odor caused by the bacterial breakdown of perspiration on the body (e.g., armpits, feet, and other areas of the body). The body spray may also provide a fragrance expression to the consumers. Typically, body spray compositions are applied as an aerosol spray in an effective amount on the skin of a consumer.

As used herein, the term "composition" includes a fine fragrance composition intended for application to a body surface, such as for example, skin or hair, e.g., to impart a pleasant odor thereto, or cover a malodour thereof. They are generally in the form of perfume concentrates, perfumes, eau de parfums, eau de toilettes, aftershaves, or colognes. The fine fragrance compositions may be an ethanol-based composition. The term "composition" may also include a cosmetic composition, which comprises a fragrance material for the purposes of delivering a pleasant smell to drive consumer acceptance of the cosmetic composition. The term "composition" may also include body splashes or body sprays. The term "composition" may also include cleaning compositions, such as fabric care composition or home care compositions, including air care compositions (e.g., air fresheners), for use on clothing or other substrates such as hard surfaces (e.g., dishes, floors, countertops). Additional non-limiting examples of "composition" may also include facial or body powder, deodorant, foundation, body/facial oil, mousse, creams (e.g., cold creams), waxes, sunscreens and blocks, bath and shower gels, lip balms, self-tanning compositions, masks and patches.

As used herein, the term "consumer" means both the user of the composition and the observer nearby or around the user.

As used herein, the term "fragrance material" and "fragrance materials" relates to a perfume raw material ("PRM"), or a mixture of perfume raw materials ("PRMs"), that are used to impart an overall pleasant odor or fragrance profile to a composition. "Fragrance materials" can encompass any suitable perfume raw materials for fragrance uses, including materials such as, for example, alcohols, aldehydes, ketones, esters, ethers, acetates, nitriles, terpene hydrocarbons, nitrogenous or sulfurous heterocyclic compounds and essential oils. However, naturally occurring plant and animal oils and exudates comprising complex mixtures of various chemical components are also known for use as "fragrance materials". The individual perfume raw materials which comprise a known natural oil can be found by reference to Journals commonly used by those skilled in the art such as "Perfume and Flavourist" or "Journal of Essential Oil Research", or listed in reference texts such as the book by S. Arctander, *Perfume and Flavor Chemicals*, 1969, Montclair, New Jersey, USA and more recently republished by Allured Publishing Corporation Illinois (1994). Additionally, some perfume raw materials are supplied by the fragrance houses (Firmenich, International Flavors & Fragrances, Givaudan, Symrise) as mixtures in the form of proprietary specialty accords. Non-limiting examples of the fragrance materials useful herein include pro-fragrances such as acetal pro-fragrances, ketal pro-fragrances, ester pro-fragrances, hydrolyzable inorganic-organic pro-fragrances, and mixtures thereof. The fragrance materials may be released from the pro-fragrances in a number of ways. For example, the fragrance may be released as a result of simple hydrolysis, or by a shift in an equilibrium reaction, or by a pH-change, or by enzymatic release.

As used herein, the term "fragrance profile" means the description of how the fragrance is perceived by the human nose at any moment in time. The fragrance profile may change over time. It is a result of the combination of the low, moderate and high volatile fragrance materials, if present, of a fragrance. A fragrance profile is composed of 2 characteristics: 'intensity' and 'character'. The 'intensity' relates to the perceived strength whilst 'character' refers to the odor impression or quality of the perfume, e.g., fruity, floral, woody, etc.

As used herein, the terms "modulator", and "fragrance modulator" are used interchangeably to designate an agent having the capacity to affect the fragrance profile, such as for example, by impacting the fragrance materials' evaporation rate. The modulator may mediate its effect by lowering the vapor pressure of the fragrance materials and increasing their adherence to the substrate (skin and/or hair) thus ensuring a less harsh impression of the overdosed fragrance.

By incorporating the modulator, it is desired that the fragrance profile, preferably the fragrance components composition attributable to the moderate and low volatile fragrance materials, alone or individually, of the composition can be perceived by a panel of experts or professional evaluators or individual experts or professional evaluators, without the perceived harshness of overdosing (e.g., greater than about 30 wt % of the composition) of the low and moderate fragrance materials is mitigated or absent, as compared to the same perception in the absence of the modulator. Suitable examples of the modulator are provided herein below. However, as discovered by the inventors, simply adding a primer containing modulators to a traditionally constructed fragrance composition (e.g., classical fragrance pyramid construction without overdose) that is commercially available in the market will enhance the perception of medium and high volatile materials and preserve them overtime. It is necessary that fragrance construction has a predominantly green, fruity, floral and citrus character to achieve best results. Nonetheless desired character change is achieved with any commercial fragrance as described by experts or professional evaluators or individual experts or professional evaluators experience. Without intending to be limited to any theory, the inventors believe that the modulator increases solubility of at least one hydrophobic perfume raw material fragrance materials relative to a fragrance composition lacking the modulator. This can be accomplished via van der walls and hydrogen bonding between the modulator and the hydrophobic perfume raw materials.

As used herein, the term "substantially non-odorous" means an agent that does not impart an odor of its own when added into a composition of the present invention. For example, a "substantially non-odorous fragrance modulator" does not impart a new odor that alters the character of the fragrance profile of the composition to which it is added. The term "substantially non-odorous" also encompasses an agent that may impart a minimal or slight odor of its own when added into a composition of the present invention. However, the odor imparted by the "substantially non-odorous fragrance modulator" is generally undetectable or tends to not substantively alter the character of the fragrance profile of the composition to which it is added initially or preferably over time. Furthermore, the term "substantially non-odorous" also includes materials that are perceivable only by a minority of people or those materials deemed "anosmic" to the majority of people. Furthermore, the term "substantially non-odorous" also includes materials that may, from particular suppliers, contain an odor due to impurities, such as when the materials contain the impurities at not more than about 5 wt %, preferably not more than 1 wt %, often even not more than 1 part per million (ppm). These impurities maybe removed by purification techniques known in the art as required to make them suitable for use in fragrance compositions of the present invention.

As used herein, the term "vapor pressure" means the partial pressure in air at a defined temperature (e.g., 25° C.) and standard atmospheric pressure (760 mmHg) for a given chemical species. It defines a chemical species' desire to be in the gas phase rather than the liquid or solid state. The higher the vapor pressure the greater the proportion of the material that will, at equilibrium, be found in a closed headspace. It is also related to the rate of evaporation of a fragrance material which is defined in an open environment where material is leaving the system. The vapor pressure is determined according to the reference program Advanced Chemistry Development (ACD/Labs) Software Version 14.02, or preferably the latest version update).

It is understood that the test methods that are disclosed in the Test Methods Section of the present application must be used to determine the respective values of the parameters of Applicants' inventions as described and claimed herein.

In all embodiments of the present invention, all percentages are by weight of the total composition, as evident by the context, unless specifically stated otherwise. All ratios are weight ratios, unless specifically stated otherwise, and all measurements are made at 25° C., unless otherwise designated.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SOR, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing three or more ring members, of which one or more is a heteroatom such as, but not limited to, N, O, and S.

The term "heteroaryl" as used herein refers to aromatic ring compounds containing 5 or more ring members, of which, one or more is a heteroatom such as, but not limited to, N, O, and S; for instance, heteroaryl rings can have 5 to about 8-12 ring members. A heteroaryl group is a variety of a heterocyclyl group that possesses an aromatic electronic structure.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof. Hydrocarbyl groups can be shown as $(C_a\text{-}C_b)$hydrocarbyl, wherein a and b are integers and mean having any of a to b number of carbon atoms. For example, $(C_1\text{-}C_4)$hydrocarbyl means the hydrocarbyl group can be methyl ($C_1$), ethyl ($C_2$), propyl ($C_3$), or butyl ($C_4$), and $(C_0\text{-}C_b)$hydrocarbyl means in certain embodiments there is no hydrocarbyl group.

Compositions

Compositions described herein can relate to a coating composition such as a primer or topcoat that includes a substantially non-odorous fragrance modulator. The coating composition can further include a carrier in which the substantially non-odorous fragrance modulator is dispersed.

Fragrance Modulators

The coating composition comprises at least one substantially non-odorous fragrance modulator as described herein below. Suitable examples of the substantially non-odorous fragrance modulators are provided in Table 1 below.

The substantially non-odorous fragrance modulator can be present in an amount of from about 0.1 wt % to about 50 wt % relative to the total weight of the coating composition or the composition, about 0.5 wt % to about 40 wt %, about 2.5 wt % to about 15 wt %, or less than, equal to, or greater than about 0.1 wt %, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, 50 wt %. If there are more than one substantially non-odorous fragrance modulators, then the ranges provided herein above cover the total of all of the substantially non-odorous fragrance modulators in the composition. According to various embodiments, the modulator can be present exclusively in a primer as opposed to being in a fragrance composition.

The substantially non-odorous fragrance modulator can be a liquid at temperatures lower than 100° C., such as at ambient temperature. The substantially non-odorous fragrance modulators may be fully miscible with a fragrance material(s) to form a single-phase liquid. However, if the fragrance materials are not entirely miscible, or are immiscible, then co-solvents (e.g., dipropylene glycol (DPG), triethyl citrate, or others well known to those skilled in the art) can be added to aid in the solubility of the fragrance materials.

The coating can be used in conjunction with a fragrance composition. For example, the fragrance composition can be applied to the coating and the substantially non-odorous fragrance modulator can permeate to the fragrance component. The coating can be left to dry or be a liquid when a fragrance component is brought into contact with the coating. The effect of the substantially non-odorous fragrance modulator on the fragrance profile, particularly the characters of the fragrance profile which is attributable to the medium and high volatile fragrance materials, can be improved. By "improved" it is meant that the fragrance profile of the composition, particularly the components contributed by at least one of the medium and high volatile fragrance materials, can be perceived by the panel of experts or professional evaluators or individual experts or professional evaluators at later time points such as, for example, 1 hour, 2 hours, 3 hours, 4 hours, 5 hours, 6 hours, 7 hours, 8 hours, 10 hours, and possibly all the way up to 24 hrs after application as compared to controls, e.g., lacking any of the disclosed non-odorous fragrance modulators such as Glucam.

Suitable examples of non-odorous modulators can include methyl glucoside polyol, ethyl glucoside polyol, propyl glucoside polyol, or mixtures thereof. Further examples can include from polypropylene glycol-10 methyl glucose ether, ethoxylated methyl glucose ether, polypropylene glycol-20 methyl glucose ether, caprylyl/capryl glucoside, undecyl glucoside, and mixtures thereof. In some examples, the composition can be substantially free of isocetyl alcohol, diisobutyl adipate, diisoamyl adipate, polypropylene glycol-3 myristyl ether, and neopentyl glycol diethyl hexanoate, neopentyl glycol diisononanoate, cetearyl ethyl hexanoate, and their mixtures, or a mixture thereof, although the composition can optionally include these.

Further examples of non-odorous modulators include: a compound of formula (I):

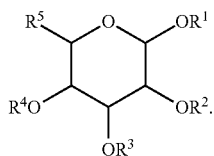

(I)

wherein:
R$^1$ is hydrogen, alkyl, alkenyl or alkynyl;
R$^2$ is selected from hydrogen, (C$_2$-C$_{20}$)alkyl, (C$_2$-C$_{20}$)alkenyl, (C$_2$-C$_{20}$)alkynyl, —[R$^6$R$^7$(R$^8$)O]$_w$R$^9$, wherein w is from 1 to 10, preferably 2 to 9;
R$^3$ is selected from hydrogen, alkyl, alkenyl, alkynyl, —[R$^6$R\R$^8$)O]yR$^9$, wherein y is from 1 to 10 or 2 to 9;
R$^4$ is selected from hydrogen, alkyl, alkenyl, alkynyl, —[R$^6$R\R$^8$)O]xR$^9$, wherein x is from 1 to 10, preferably 2 to 9;
R$^5$ is selected from hydrogen, alkyl, alkenyl, alkynyl, —R$^6$OR$^9$, —R$^6$O [R$^6$R$^7$(R$^8$)O]zR$^9$,
wherein z is from 1 to 10, preferably 2 to 9;
each R$^6$ and R$^7$ are independently selected from (C$_2$-C$_{20}$)alkylene, (C$_2$-C$_{20}$)alkenylene, or (C$_2$-C$_{20}$)alkynylene; and
each R$^8$ and R$^9$ is independently selected from hydrogen or alkyl, a compound of formula (II):

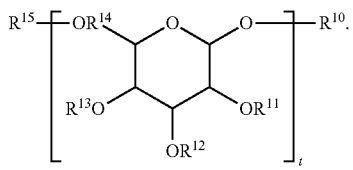

(II)

wherein:
R$^{10}$ is hydrogen, (C$_2$-C$_{20}$)alkyl, (C$_2$-C$_{20}$)alkenyl or (C$_2$-C$_{20}$)alkynyl;
each R$^{11}$ is independently selected from hydrogen, (C$_2$-C$_{20}$)alkyl, (C$_2$-C$_{20}$)alkenyl, (C$_2$-C$_{20}$)alkynyl;
each R$^{12}$ is independently selected from hydrogen, (C$_2$-C$_2$))alkyl, (C$_2$-C$_{20}$)alkenyl, or (C$_2$-C$_{20}$)alkynyl;
each R$^{13}$ is independently selected from hydrogen, (C$_2$-C$_{20}$)alkyl, (C$_2$-C$_{20}$)alkenyl, or (C$_2$-C$_{20}$)alkynyl;
each R$^{14}$ is selected from (C$_2$-C$_{20}$)alkylene, (C$_2$-C$_{20}$)alkenylene, or (C$_2$-C$_{20}$)alkynylene; and
R$^{15}$ is hydrogen, (C$_2$-C$_{20}$)alkyl, (C$_2$-C$_{20}$)alkenyl or (C$_2$-C$_{20}$) alkynyl;
wherein t is 5 or less, preferably 1, 2 or 3;
Sucrose Laurate, Sucrose Dilaurate, Sucrose Myristate, Sucrose Palmitate, Sucrose Stearate, Sucrose Distearate, Sucrose Tristearate, and their mixtures;

Trimethylcyclohexane derivatives having the formula (III):

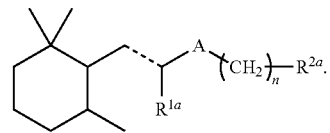

(III)

wherein:
n is 0, 1 or 2;
A is C═O or CH—OH;
R$^{1a}$ is hydrogen or methyl;
R$^{2a}$ is a C$_2$-C$_{10}$ hydrocarbon group; and
is a saturated or unsaturated carbon-carbon bond:
L-methoxy ether derivatives having the formula (IV):

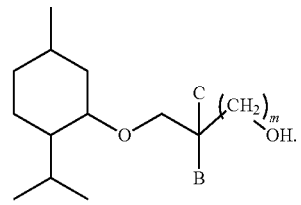

(IV)

wherein:
m is 0, 1 or 2;
B is hydrogen or OH;
and C is hydrogen or methyl;
Tetra-hydronaphthalene derivatives having the formula (V):

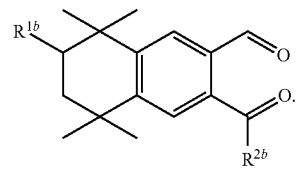

(V)

wherein:
R$^{1b}$ is hydrogen or methyl; and
R$^{2b}$ is alkyl;
140
Hyaluronic acid disaccharide sodium salt, sodium hyaluronate and their mixtures;
Ether derivatives having the formula (VI) or formula (VII):

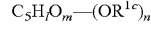

(VI).

wherein:
C$_5$H$_l$O$_m$ is a pentose residue, wherein l is an integer from 6 to 9, and m is an integer from 1 to 4;
n is an integer from 1 to 4; and
R$^{1c}$ is C$_4$-C$_{20}$ hydrocarbon group; and

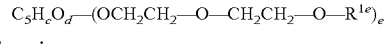

(VII).

wherein:
C$_6$H$_x$O$_y$ is a hexose residue, wherein x is an integer from 7 to 11, and y is an integer from 1 to 5;

z is an integer from 1 to 5; and
R$^{1d}$ is C$_4$-C$_{20}$ hydrocarbon group; and
Diethylene Glycol Ether derivatives having the formula (VIII) or formula (IX):

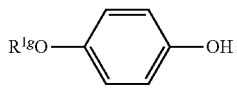 (VIII)

wherein:
C$_5$H$_c$O$_d$ is a pentose residue, wherein c is an integer from 6 to 8,
and d is an integer from 1 to 3;
e is an integer from 2 to 4;
and R$^{1e}$ is C$_1$-C$_6$ alkyl
group; and

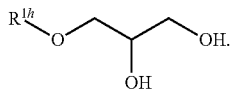 (IX)

wherein:
C$_6$H$_f$O$_g$ is a hexose residue, wherein f is an integer from 7 to 10, and g is an integer from 1 to 4;
h is an integer from 2 to 5;
and R$^{1f}$ is C$_1$-C$_6$ alkyl
group;
Hydroquinone Glycoside derivatives having the formula (X):

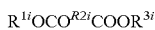 (X).

wherein:
R$^{1g}$ is selected from the group consisting of: (i) pentose residue, hexose residue, aminosaccharide residue, uronic acid residue and their mixtures; (ii) methylated versions of group (i); and (iii) mixtures of groups (i) and (ii); and Propylene Glycol Propyl Ether; Dicetyl Ether; Polyglycerin-4 Ethers; Isoceteth-5; Isoceteth-7, Isoceteth-10; Isoceteth-12; Isoceteth-15; Isoceteth-20; Isoceteth-25; Isoceteth-30; Disodium Lauroamphodipropionate; Hexaethylene glycol monododecyl ether; and their mixtures;
Glyceryl Ether derivatives having the formula (XI):

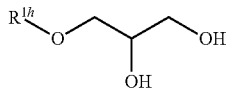 (XI)

wherein:
R$^{1h}$ is C$_4$-C$_{12}$ aliphatic hydrocarbon group;
Panthenol Ethyl Ether, DL-Panthenol and their mixtures;
Aliphatic Dibasic Acid Diester derivatives having the formula (XII):

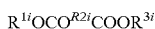 (XII).

wherein:
R$^{1i}$ is C$_4$-C$_5$ alkyl;
R$^{2i}$ is C$_4$ alkylene;
and R$^{3i}$ is C$_4$-C$_5$ alkyl; and Aliphatic Ether derivatives having the formula (XIII):

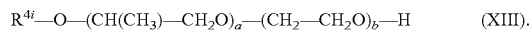 (XIII).

wherein:
a and b are integers such that the sum of a and b is from 1 to 4;
and R$^{4i}$ is an aliphatic chain comprising from 8 to 18 carbons; N-hexadecyl n-nonanoate, Noctadecyl n-nonanoate and their mixtures; Tricyclodecane Amide derivatives selected from the group consisting of:
the compounds of formula (XIV):

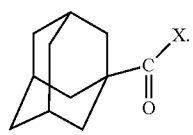 (XIV)

wherein:
X is selected from:

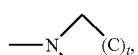 (Xa)

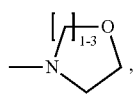 (Xb)

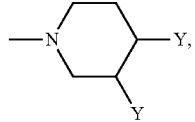 (Xc)

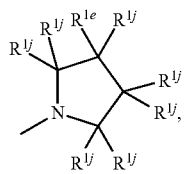 (Xd)

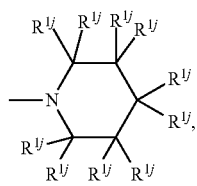 (Xe)

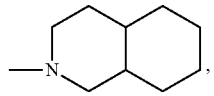 (Xf)

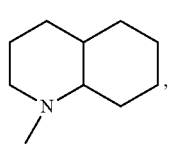 (Xg)

-continued

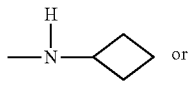 or

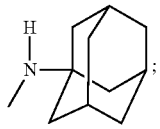;

t is 1 to 8;

Y is hydrogen, or a halogen; and each $R^{1j}$ is independently selected from a hydrogen, or $C_1$-$C_4$ alkyl;

the compounds of formula (XV):

(Xh)

(Xi)

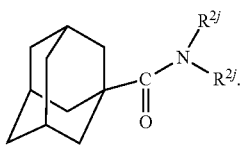

(XV)

wherein:
each $R^{2j}$ is independently selected from a hydrogen, methyl, ethyl or $C_3$-$C_{18}$ alkyl, cycloalkyl or cycloheteroalkyl with the proviso that both $R^{2e}$ groups are not hydrogen; and mixtures of the compounds of formulae (XII) and (XIII); and mixtures thereof.

Tables 1(a) and 1(b) provide lists of suitable non-odorous fragrance modulators.

TABLE 1(a)

Substantially Non-Odorous Fragrance Modulators

| No. | Group | Chemical Name | CAS Number | Supplier |
|---|---|---|---|---|
| 1. | (a) | PPG-10 Methyl Glucose Ether | 61849-72-7 | Lubrizol |
| 2. | | PPG-20 Methyl Glucose Ether [1] | 61849-72-7 | |
| 3. | | Ethoxylated Methyl Glucose Ether [2] | 68239-42-9 | |
| 4. | | Caprylyl/Capryl Glucoside [3] | 68515-73-1 | BASF |
| 5. | | Undecyl Glucoside [3a] | — | SEPPIC (France) |
| 6. | (b) | Isocetyl Alcohol [4] | 36653-82-4 | Ashland Speciality Ingredients |
| 7. | (c) | PPG-3 Myristyl Ether [5] | — | Evonik |
| 8. | | Neopentyl Glycol Diethylhexanoate [6] | 28510-23-8 | Lubrizol |
| 9. | (d) | Sucrose Laurate | 25339-99-5 | Alfa Chemicals Ltd. (UK) |
| 10. | | Sucrose dilaurate | 25915-57-5 | Alfa Chemicals Ltd. (UK) |
| 11. | | Sucrose Myristate | 27216-47-3 | Mitsubishi Chemicals |
| 12. | | Sucrose Palmitate | 26446-38-8 | Alfa Chemicals Ltd. (UK) |
| 13. | | Sucrose Stearate | 25168-73-4 | |
| 14. | | Sucrose Distearate | 27195-16-0 | Mitsubishi Chemicals (JP) |
| 15. | | Sucrose Tristearate | 27923063-3 | Mitsubishi Chemicals (JP) |
| 16. | (e) | (E)-1-(2,2,6-trimethylcyclohexyl)oct-1-en-3-one [8] | — | Takasago (Japan) |
| 17. | (f) | 2-(1-menthoxy)ethane-1-ol [9] | — | Takasago (Japan) |
| 18. | | 1-(1-menthoxy)propane-2-ol [9] | — | |
| 19. | | 3-(1-menthoxy)propane-1-ol [9] | — | |
| 20. | | 3-(1-menthoxy)propane-1,2-diol [9] | — | |
| 21. | | 2-methyl-3-(1-menthoxy)propane-1,2-diol [9] | — | |
| 22. | | 4-(1-menthoxy) butane-1-ol [9] | — | |
| 23. | (g) | 1,1,4,4-tetramethyl-6-acetyl-7-formyl-1,2,3,4-tetrahydronaphthalene [10] | — | Givaudan (Switzerland) |
| 24. | | 1,1,2,4,4-pentamethyl-6-acetyl-7-formyl-1,2,3,4-tetrahydronaphthalene [10] | — | |
| 25. | (h) | Hyaluronic acid disaccharide sodium salt [11] | 9004-61-9 | Sigma Aldrich (UK) |
| 26. | | Sodium Hyaluronate [11] | 9067-32-7 | |
| 27. | (i) | Mono-o-(linalyl)-glucopyranose [12] | — | Kanebo (Japan) |
| 28. | | Di-o-(linalyl)-glucopyranose [12] | — | |
| 29. | | Tri-o-(linalyl)-glucopyranose [12] | — | |
| 30. | | Tretra-o-(linalyl)-glucopyranose [12] | — | |
| 31. | | Penta-o-(linayl)-glucopyranose [12] | — | |
| 32. | | Mono-o-(cis-3-hexenyl)-glactopyranose [12] | — | |
| 33. | | Di-o-(cis-3-hexenyl)-glactopyranose [12] | — | |
| 34. | | Tri-o-(cis-3-hexenyl)-glactopyranose [12] | — | |
| 35. | | Tetra-o-(cis-3-hexenyl)-glactopyranose [12] | — | |

TABLE 1(a)-continued

Substantially Non-Odorous Fragrance Modulators

| No. | Group | Chemical Name | CAS Number | Supplier |
|---|---|---|---|---|
| 36. | | Penta-o-(cis-3-hexenyl)-glactopyranose [12] | — | |
| 37. | (j) | Bis-O-(3,6-dioxadecanyl)-glucopyranose [13] | — | |
| 38. | | Tris-O-(3,6-dioxadecanyl)-glucopyranose [13] | — | |
| 39. | | Tetrakis-O-(3,6-dioxadecanyl)-glucopyranose [13] | — | |
| 40. | | Pentakis-O-(3,6-dioxadecanyl)-glucopyranose [13] | — | |
| 41. | | Bis-O-(3,6-dioxaoctanyl)-galactopyranose [13] | — | |
| 42. | | Tris-O-(3,6-dioxaoctanyl)-galactopyranose [13] | — | |
| 43. | | Tetrakis-O-(3,6-dioxaoctanyl)-galactopyranose [13] | — | |
| 44. | | Pentakis-O-(3,6-dioxaoctanyl)-galactopyranose [13] | — | |
| 45. | | Bis-O-(3,6-dioxaheptanyl)-xylopyranose [13] | — | |
| 46. | | Tris-O-(3,6-dioxaheptanyl)-xylopyranose [13] | — | |
| 47. | | Tetrakis-O-(3,6-dioxaheptanyl)-xylopyranose [13] | — | |
| 48. | | Bis-O-(3,6-dioxadodecanyl)-glucopyranose [13] | — | |
| 49. | | Tris-O-(3,6-dioxadodecanyl)-glucopyranose [13] | — | |
| 50. | | Tetrakis-O-(3,6-dioxadodecanyl)-glucopyranose [13] | — | |
| 51. | | Pentakis-O-(3,6-dioxadodecanyl)-glucopyranose [13] | — | |
| 52. | (k) | Hydroquinone beta-D-glycoside [14] | 497-76-7 | Shiseido |
| 53. | (l) | Propylene Glycol Propyl Ether | 1569-01-3 | Sigma Aldrich (UK) |
| 54. | | Dicetyl Ether | 4113-12-6 | |
| 55. | | Propyglycerin-4 Ethers | 25618-55-7 | Solvay Chemicals |
| 56. | | Isoceteth-5 | 69364-63-2 | Nihon Emulsion |
| 57. | | Isoceteth-7 | 69364-63-2 | Company Ltd. |
| 58. | | Isoceteth-10 | 69364-63-2 | |
| 59. | | Isoceteth-12 | 69364-63-2 | |
| 60. | | Isoceteth-15 | 69364-63-2 | |
| 61. | | Isoceteth-20 | 69364-63-2 | |
| 62. | | Isoceteth-25 | 69364-63-2 | |
| 63. | | Isoceteth-30 | 69364-63-2 | |
| 64. | | Disodium Lauroamphodipropionate | 68929-04-4 | Rhodia |
| 65. | | Hexaethylene glycol monododecyl ether [14b] | 3055-96-7 | Sigma Aldrich (UK) |
| 66. | (m) | Neopentyl Glycol Diisononanoate [15] | 27841-07-2 | Symrise (Germany) |
| 67. | | Cetearyl Ethylhexnoate [16] | 90411-68-0 | |
| 68. | (n) | 2-ethylhexyloxypropanediol [17] | 70455-33-9 | Takasago (JP) |
| 69. | (o) | Panthenol Ethyl Ether [18] | 667-83-4 | DSM Nutritional Products, Inc. (USA) |
| 70. | | DL-Panthenol | 16485-10-2 | Roche Inc. (USA) |
| 71. | (p) | Diisobutyl Adipate [19] | 141-04-8 | Sigma Aldrich (UK) |
| 72. | | Diisoamyl Adipate [19] | 6624-70-0 | |
| 73. | (q) | PPG-11 Stearyl Ether [19a] | 25231-21-4 | Kao (JP) |
| 74. | (r) | N-hexadecyl n-nonanoate [19b] (e.g., cetyl nonanoate) | 72934-15-7 | Symrise (Germany) |
| 75. | | Noctadecyl n-nonanoate [19b] (e.g., stearyl nonanoate) | 107647-13-2 | |
| 76. | (s) | methanone, (morphonyl) tricyclo[3.3.1.1$^{3,7}$]dec-1-yl- [20] | — | Unilever (UK) |
| 77. | | methanone, (piperidinyl) tricyclo[3.3.1.1$^{3,7}$]dec-1-yl- [20] | — | |
| 78. | | methanone, (pyrrolidinyl) tricyclo[3.3.1.1$^{3,7}$]dec-1-yl [20] | — | |
| 79. | | methanone, (azetidinyl) tricyclo[3.3.1.1$^{3,7}$]dec-1-yl- [20] | — | |

TABLE 1(a)-continued

Substantially Non-Odorous Fragrance Modulators

| No. | Group | Chemical Name | CAS Number | Supplier |
|---|---|---|---|---|
| 80. | | methanone, (hexahydroazepinyl)tricyclo[3.3.1.1$^{3,7}$]dec-1-yl- [20] | — | |
| 81. | | methanone, (4-cyano-piperidinyl)tricyclo[3.3.1.1$^{3,7}$]dec-1-yl- [20] | — | |
| 82. | | methanone, 4-amido-piperidinyl)tricyclo[3.3.1.1$^{3,7}$]dec-1-yl- [20] | — | |
| 83. | | methanone, (Tricyclo[3.3.1.1$^{3,7}$]decanyl)-N-tricyclo[3.3.1.1$^{3,7}$]dec-1-yl- [20] | — | |
| 84. | | methanone, (decahydroisoquinolinyl)tri-cyclo[3.3.1.1$^{3,7}$]dec-1-yl- [20] | — | |
| 85. | | methanone, (decahydroisoquinolinyl)tri-cyclo[3.3.1.1$^{3,7}$]dec-1-yl- [20] | — | |
| 86. | | methanone, (decahydroquinolinyl)tri-cyclo[3.3.1.1$^{3,7}$]dec-1-yl- [20] | — | |
| 87. | | methanone, (3,3-dimethyl-1-piperidinyl)tricyclo[3.3.1.1$^{3,7}$]dec-1-yl- [20] | — | |
| 88. | | methanone, (2-methyl-1-piperidinyl)tricyclo[3.3.1.1$^{3,7}$]dec-1-yl- [20] | — | |
| 89. | | methanone, (4-methyl-1-piperidinyl)tricyclo[3.3.1.1$^{3,7}$]dec-1-yl- [20] | — | |
| 90. | | methanone, (3-methyl-1-piperidinyl)tricyclo[3.3.1.1$^{3,7}$]dec-1-yl- [20] | — | |
| 91. | | methanone, (3,5-dimethyl-1-piperidinyl)tricyclo[3.3.1.1$^{3,7}$]dec-1-yl- [20] | — | |
| 92. | | methanone, (4-methyl-4-ethy-piperidinyl)tricyclo[3.3.1.1$^{3,7}$]dec-1-yl- [20] | — | |
| 93. | | methanone, (3,3-diethyl-1-pyrrolidinyl)tricyclo[3.3.1.1$^{3,7}$]dec-1-yl- [20] | — | |
| 94. | | methanone, (N,N-diisopropyl)tricyclo[3.3.1.1$^{3,7}$]dec-1-yl- [20] | — | |
| 95. | | methanone, (3,3-dimethylbutylaminyl)tricyclo[3.3,1.1$^{3,7}$]dec-1-yl- [20] | — | |
| 96. | | methanone, (2,2-dimethylpropylaminyl)tricyclo[3.3.1.1$^{3,7}$]dec-1-yl- [20] | — | |
| 97. | | methanone, (1,1-dimethy1-3,3-dimethylbutylaminyl)tricyclo[3.3.1.1$^{3,7}$]dec-1-yl- [20] | — | |
| 98. | | methanone, (1,3-dimethyl-butylaminyl)tricycle[3.3.1.1$^{3,7}$]dec-1-yl- [20] | — | |
| 99. | (t) | Bis-methoxy PEG-13 PEG-438/PPG-110 SMDI Copolymer [21] | 936645-35-1 | PolymerExpert S.A. (Pessac, France) |
| 100. | (u) | propyl {4-[2-(diethylamino)-2-oxoethoxy]-3-methoxyphenyl}acetate [22] | 61791-12-6 | Sigma Aldrich (US) |
| 101. | (v) | 3-((2-ethylhexyl)oxy)propane-1,2-diol [23] | 70445-33-9 | — |

TABLE 1(a)-continued

Substantially Non-Odorous Fragrance Modulators

| No. | Group | Chemical Name | CAS Number | Supplier |
|---|---|---|---|---|
| 102. | | 3-((2-propylheptyl)oxy)propane-1,2-diol [23] | — | — |
| 103. | | 1-amino-3-((2-ethylhexyl)oxy)propan-2-ol [23] | 99509-00-9 | — |

[1] available as GLUCAM ™ P-20.
[2] available as Glucam ™ E-20.
[3] available as Plantacare ® 810 UP.
[3a] available as Simulsol ® SL 11W.
[4] available as CERAPHYL ® ICA.
[5] available as Tegosoft ® APM.
[6] available as Schercemol ™ NGDO.
[7] disclosed in U.S. Pat. No. 6,737,396B2 (Firmenich), column 1, lines 43-47.
[8] diclosed as compound 1'i in U.S. Pat. No. 6,440,400B1 (Takasago Int. Corp.), col. 5.
[8a] diclosed in U.S. Pat. No. 4,313,855 (Dragoco Gerberding & Co. GmbH), col. 1, lines 12-13.
[9] disclosed in U.S. Pat. No. 7,538,081B2 (Takasago Int. Corp.), column 7, lines 50-53.
[10] disclosed in U.S. Pat. No. 6,147,049 (Givaudan Roure), col. 5, line 24, to col. 6, line 17.
[11] disclosed in PCT Publication No. WO85/04803 (Diagnostic), pg. 2, line 1 to pg. 4, line 2.
[12] disclosed in JP Patent No. 61-083114 (Kanebo).
[13] disclosed in JP Patent No. 61-063612 (Kanebo).
[14] disclosed in JP Patent No. 62-084010 (Shiseido).
[14b] available as: Laureth-6.
[15] disclosed in U.S. Pat. Publication No. 2011/0104089A1 (Symrise), para. [0001].
[16] available as PCL-Liquid ® 100.
[17] disclosed in U.S. Pat. No. 7,196,052 (Takasago Int. Corp.), col. 4, lines 34-35.
[18] disclosed in EP Patent Publication No. 616800A2 (Givaudan), pg. 2, lines 12-25.
[19] disclosed in U.S. Pat. No. 4,110,626 (Shiseido), column 3, lines 54-56.
[19a] disclosed in PCT Publication No. WO2014/155019 (LVMH).
[19b] disclosed in U.S. Pat. No. 9,050,261 (Symrise).
[20] disclosed as compounds C1-C22 in WO2014/139952 (Unilever).
[21] available as Expert Gel ® EG56.
[22] available as Kolliphor ® EL.
[23] disclosed in U.S. Pat. No. 9,050,261 (Symrise).

Further examples of non-odorous fragrance modulator is selected from the group of materials disclosed in Table 1(b).

TABLE 1(b)

Substantially Non-Odorous Fragrance Modulators

| No. | Chemical or INCI Name | Trade Name | CAS Number | Supplier |
|---|---|---|---|---|
| 1. | C12-14 Sec-Pareth-3 | Tergitol ® 15-S-7 | 68131-40-8 | Sigma Aldrich (UK) |
| 2. | Poly(ethylene glycol-ran-propylene glycol) monobutyl ether | PPG-7-Buteth-10 | 9038-95-3 | Sigma Aldrich (UK) |
| 3. | PPG-4-Ceteth-10 | Nikkol PBC-33 | 37311-01-6 | Chemical Navi |
| 4. | Deceth-4 | Ethal DA-4 | 5703-94-6 | Ethox Chemicals, Inc. |
| 5. | PPG-5-Ceteth-20 | AEC PPG-5-Ceteth-20 | 9087-53-0 | A & E Connock (Perfumery & Cosmetics) Ltd. |
| 6. | C14-15 Pareth-7 | Neodol 45-7 alcohol ethoxylate | 68951-67-7 | Shell Chemical Company |
| 7. | Linear alcohol (C12-15) Pareth-3ethoxylate, POE-7 | Bio-soft N25-7 | 68131-39-5 | Stephan Company (USA) |
| 8. | Linear alcohol (C12-13) Pareth-3ethoxylated, POE-6.5) | Bio-soft N23-6.5 | 66455-14-9 | |
| 9. | Polyethylene glycol 1100 mono(hexadecyl/octadecyl) ether | Cremophor ® A 25 | 68439-49-6 | Sigma Aldrich (UK) |

TABLE 1(b)-continued

Substantially Non-Odorous Fragrance Modulators

| No. | Chemical or INCI Name | Trade Name | CAS Number | Supplier |
|---|---|---|---|---|
| 10. | Linear alcohol (C9-11) ethoxylated POE -8 Pareth-3 | Bio-soft N91-8 | 68439-46-3 | Stephan Company (USA) |
| 11. | Coceth-10 or Polyoxyethylene (10) dodecyl ether | Genapol ® C-100 | 61791-13-7 | Sigma Aldrich (UK) |
| 12. | Alcohols, C12-14, ethoxylated | Rhodasurf ® LA 30 | 68439-50-9 | Solvay Solutions Italia S.p.A. |
| 13. | Poly(ethylene glycol) methyl ether | Poly(ethylene glycol) methyl ether | 9004-74-4 | Sigma Aldrich (UK) |
| 14. | C10-16 Pareth-1 | Neodol ® PC 110 | 68002-97-1 | Shell Chemical Company |
| 15. | PPG-11 Stearyl Ether | Arlamol ™ PS11E | 25231-21-4 | Croda (UK) |
| 16. | Steareth-100 | Brij ® S100 | 9005-00-9 | Sigma Aldrich (UK) |
| 17. | Polyethylene glycol hexadecyl ether | Brij ® C-58 | 9004-95-9 | Sigma Aldrich (UK) |
| 18. | Pluronic ® F-127 | Pluronic ® F-127 | 9003-11-6 | Sigma Aldrich (UK) |
| 19. | Linear Alcohol (C11) Ethoxylate, POE-5 | Bio-soft N1-5 | 34398-01-1 | Stepan Canada Inc. |
| 20. | Laureth-10 | Intrasol FA 12/18/10 | 6540-99-4 | Evonik Industries AG |
| 21. | Decaethylene glycol mono-dodecyl ether | Polyoxyethylene (10) lauryl ether | 9002-92-0 | Sigma Aldrich (UK) |
| 22. | Ethylene glycol monomethyl ether | 2-Methoxyethanol | 109-86-4 | Sigma Aldrich (UK) |
| 23. | Myreth-4 | Homulgator 920 G | 27306-79-2 | Grau Aromatics GmbH & Company KG |
| 24. | Oleth-16 Alkoxylated Alcohols | Pegnol O-16A | 25190-05-0 | Toho Chemical Industry Co., Ltd. |
| 25. | Isosteareth-5 | Emalex 1805 | 52292-17-8 | Nihon Emulsion Company, Ltd. |
| 26. | PPG-10 Cetyl Ether | Arlamol ™ PC10 | 9035-85-2 | Croda (UK) |
| 27. | Polyoxy(ethylene glycol) (18) tridecyl ether | Poly(ethylene glycol) (18) tridecyl ether | 24938-91-8 | Sigma-Aldrich (UK) |
| 28. | Poly(oxy-1,2-ethanediyl), a-decyl-w-hydroxy- | ALFONIC ® 10-8 Ethoxylate | 26183-52-8 | Sasol Chemicals (USA) LLC |
| 29. | Laureth-1 | Mackam ™ 2LSF | 4536-30-5 | Rhodia (DE) |
| 30. | PEG-5 Hydrogenated Tallow Amine | Ethox HTAM-5 | 61791-26-2 | Ethox Chemicals, Inc. |
| 31. | PEG-15 Oleamine | Nikkol TAMNO-15 | 26635-93-8 | Nikko Chemicals Co., Ltd. |
| 32. | Polyoxyethylene (20) oleyl ether | Brij ® O20-SS | 9004-98-2 | Sigma Aldrich (UK) |
| 33. | Cetoleth-10 | Brij ® CO10 | 8065-81-4 | Croda, Inc. |
| 34. | Talloweth-7 | Emulmin 70 | 61791-28-4 | Sanyo Chemical Industries Ltd. |
| 35. | Isobutoxypropanol Alcohols | Isobutoxypropanol | 34150-35-1 | MolPort |
| 36. | Isobutoxypropanol Alcohols | Isobutoxypropanol | 23436-19-3 | AKos Consulting & Solutions |
| 37. | Diethylene Glycol | Twincide EDG | 111-46-6 | Roda |
| 38. | Methoxyethanol | Hisolve MC | 109-86-4 | Tolio Chemical Industry Co., Ltd. |
| 39. | Ethoxyethanol Alcohols | 2-Ethoxyethanol | 110-80-5 | Sigma-Aldrich (UK) |
| 40. | Methoxyisopropanol Alcohols | Dowanol ™ PM | 107-98-2 | The Dow Chemical Company |
| 41. | Methoxyethanol | Hisolve MC | 32718-54-0 | Toho Chemical Industry Co., Ltd. |

TABLE 1(b)-continued

Substantially Non-Odorous Fragrance Modulators

| No. | Chemical or INCI Name | Trade Name | CAS Number | Supplier |
|---|---|---|---|---|
| 42. | Methylal Ethers | Dimethoxymethane | 109-87-5 | Sigma-Aldrich (UK) |
| 43. | 3-Methoxybutanol | Methoxybutanol | 2517-43-3 | Hans Schwarzkopf GmbH/Co. KG |
| 44. | Butoxyethanol | Butyl OXITOL | 111-76-2 | Shell Chemical Company |
| 45. | Propylene Glycol n-Butyl Ether | Dowanol ™ PnB | 5131-66-8/29387-86-8 | The Dow Chemical Company |
| 46. | Propylene Glycol Butyl Ether | Propylene Glycol Butyl Ether | 15821-83-7 | Sigma Aldrich (UK) |
| 47. | 2-(2-butoxyethoxy)ethanol | Diethylene glycol butyl ether | 112-34-5 | Sigma Aldrich (UK) |
| 48. | Deceth-4 Phosphate | Crodafos ™ D4A | 52019-36-0 | Croda, Inc. |
| 49. | 2-(Hexadecyloxy)ethanol | Ethylene glycol monohexadecyl ether | 2136-71-2 | Sigma-Aldrich (UK) |
| 50. | Poly(propylene glycol) monobutyl ether | Poly(propylene glycol) monobutyl ether | 9003-13-8 | Sigma-Aldrich (UK) |
| 51. | Propylene Glycol Propyl Ether | Dowanol ™ PnP | 30136-13-1 | The Dow Chemical Company |
| 52. | Propylene Glycol n-Butyl Ether | Dowanol ™ PnB | 29387-86-8/5131-66-8 | The Dow Chemical Company |
| 53. | Dipropylene glycol monomethyl ether | Di(propylene glycol) methyl ether, mixture of isomers | 34590-94-8 | Sigma-Aldrich (UK) |
| 54. | Dipropylene Glycol Dimethyl Ether | Proglyde ™ DMM | 111109-77-4 | The Dow Chemical Company |
| 55. | PPG-2 Methyl Ether | Dowanol ™ DPM | 13429-07-7 | The Dow Chemical Company |
| 56. | Methoxydiglycol Ethers | OriStar DEGME | 111-77-3 | Orient Stars LLC |
| 57. | Diethylene glycol ethyl ether | Di(ethylene glycol) ethyl ether | 111-90-0 | Sigma Aldrich (UK) |
| 58. | Dimethoxydiglycol Ethers | Dimethyldiglycol | 111-96-6 | H & V Chemicals |
| 59. | PPG-3 Methyl Ether | Dowanol ™ TPM | 37286-64-9 | The Dow Chemical Company |
| 60. | Methyl Morpholine Oxide Amine Oxides | 224286 ALDRICH 4-Methylmorpholine N-oxide | 7529-22-8 | Sigma-Aldrich (UK) |
| 61. | Oleth-3 | Brij ® O3 | 5274-66-8 | Croda Europe, Ltd. |
| 62. | Tri(propylene glycol) n-butyl ether | Dowanol ™ TPnB | 55934-93-5 | Sigma-Aldrich (UK) |
| 63. | Tripropylene Glycol | Tripropylene Glycol | 24800-44-0 | Sigma-Aldrich (UK) |
| 64. | PPG-3 Methyl Ether Alkoxylated Alcohols | Dowanol ™ TPM | 25498-49-1 | The Dow Chemical Company |
| 65. | Triethylene glycol | Triglycol | 112-27-6 | Sigma-Aldrich (UK) |
| 66. | PEG-3 Methyl Ether | Hymol ™ | 112-35-6 | Toho Chemical Industry Co., Ltd. |
| 67. | Laureth-3 | AEC Laureth-3 | 3055-94-5 | A & E Connock (Perfumery & Cosmetics) Ltd. |
| 68. | Ethylhexylglycerin | AG-G-75008 | 70445-33-9 | Angene Chemical |
| 69. | Tetra(ethylene glycol) | Tetraethylene glycol | 112-60-7 | Sigma Aldrich (UK) |
| 70. | Steareth-3 | Isoxal 5 | 4439-32-1 | Vevy Europe SpA |
| 71. | Ceteth-3 | Emalex 103 | 4484-59-7 | Nihon Emulsion Company, Ltd. |
| 72. | Myreth-3 | Isoxal 5 | 26826-30-2 | Vevy Europe SpA |
| 73. | Trideceth-3 | Alfonic ® TDA-3 Ethoxylate | — | Sasol North America, Inc. |

TABLE 1(b)-continued

Substantially Non-Odorous Fragrance Modulators

| No. | Chemical or INCI Name | Trade Name | CAS Number | Supplier |
|---|---|---|---|---|
| 74. | Ceteth-2 | Brij ® C2 | 5274-61-3 | Croda Europe, Ltd. |
| 75. | Oleth-2 | Brij ® O2 | 5274-65-7 | Croda, Inc. |
| 76. | Steareth-2 | Brij ® S2 | 16057-43-5 | Croda, Inc. |
| 77. | Cetoleth-10 | Brij ® CO10 | 8065-81-4 | Croda, Inc. |
| 78. | Trimethyl Pentanol Hydroxyethyl Ether Alcohols | Trimethyl Pentanol Hydroxyethyl Ether | 68959-25-1 | Angene Chemical |
| 79. | Steareth-10 Allyl Ether | Salcare ® SC80 | 109292-17-3 | BASF |
| 80. | TEA-Lauryl Ether | material ID-AG-J-99109 | 1733-93-3 | Angene Chemical |
| 81. | Polyglyceryl-2 Oleyl Ether | Chimexane NB | 71032-90-1 | Chimex |
| 82. | Batyl Alcohol | B402 ALDRICH | 544-62-7 | Sigma-Aldrich (UK) |
| 83. | Octaethylene Glycol | 15879 ALDRICH | 5117-19-1 | Sigma-Aldrich (UK) |
| 84. | Triglycerol diisostearate | Cithrol ™ | 66082-42-6 | Croda (UK) |
| 85. | Diglycerin | Diglycerin 801 | 59113-36-9 | Sakamoto Yakuhin Kogyo Co., Ltd. |
| 86. | Polyglycerin #310 | Polyglycerin #310 | 25618-55-7 | Sakamoto Yakuhin Kogyo Co., Ltd. |
| 87. | Distearyl Ether | Cosmacol ® SE | 6297-03-6 | Sasol Germany GmbH |
| 88. | Caprylyl Glyceryl Ether | Caprylyl Glyceryl Ether | 10438-94-5 | AKos Consulting & Solutions |
| 89. | Chimyl Alcohol | Chimyl Alcohol | 506-03-6 | Nikko Chemicals Co., Ltd. |
| 90. | Dipentaerythrityl Hexacaprylate/Hexacap rate | Liponate ® DPC-6 | 68130-24-5 | Lipo Chemicals, Inc. |
| 91. | Morpholine | 394467 ALDRICH | 110-91-8 | Sigma-Aldrich (UK) |
| 92. | Dimethyl Oxazolidine | OXABAN ™-A | 51200-87-4 | The Dow Chemical Company |
| 93. | Ethyl Hydroxymethyl Oleyl Oxazoline | 4-Oxazolemethanol | 68140-98-7 | Angene Chemical |
| 94. | Methyl Hydroxymethyl Oleyl Oxazoline | Adeka Nol GE-RF | 14408-42-5 | Adeka Corporation |
| 95. | Pramoxine HCl | OriStar PMHCL | 637-58-1 | Orient Stars LLC |
| 96. | Allantoin Ascorbate | Allantoin Ascorbate | 57448-83-6 | ABI Chem |
| 97. | Stearamidopropyl Morpholine Lactate | Mackalene ™ 326 | 55852-14-7 | Rhodia Inc. |
| 98. | Dioxolane | Elcotal DX | 646-06-0 | Lambiotte & CIE S.A. |
| 99. | Glycerol Formal | Glycerol Formal | 5464-28-8 | Sigma Aldrich (UK) |
| 100. | Stearamidopropyl Morpholine | Mackine 321 | 55852-13-6 | Rhodia Inc. |
| 101. | 2,4,6-Tris[bis(methoxy-methyl)amino]-1,3,5-triazine | Poly(melamine-co-formaldehyde) methylated | 68002-20-0 | Sigma-Aldrich (UK) |
| 102. | Poloxamine 1307 | Pluracare ® 1307 | 11111-34-5 | BASF |
| 103. | Nonoxynol-8 | Igepal ® CO-610 | 27177-05-5 | Rhodia Inc. |
| 104. | Nonoxynol-10 | Igepal ® CO-710 | 27177-08-8 | Rhodia Inc. |
| 105. | Octoxynol-10 | Nikkol OP-10 | 2315-66-4 | Nikko Chemicals Co., Ltd. |
| 106. | Nonoxynol-9 | Igepal ® CO-630 | 68987-90-6 | Rhodia Inc. |
| 107. | Nonoxynol-9 Iodine | Nonoxynol-9 iodine | 94349-40-3 | Angene Chemical |
| 108. | Octylphenoxy poly(ethyleneoxy)ethanol, branched | Igepal ® CA-630 | 68987-90-6 | Rhodia Inc. |
| 109. | Sodium Octoxynol-2 Ethane Sulfonate | Triton ™ X-200 | 55837-16-6 | The Dow Chemical Company |
| 110. | Benzylhemiformal | Preventol D2 | 14548-60-8 | Lanxess Corporation |

TABLE 1(b)-continued

Substantially Non-Odorous Fragrance Modulators

| No. | Chemical or INCI Name | Trade Name | CAS Number | Supplier |
|---|---|---|---|---|
| 111. | Nonoxynol-2 | Igepal ® CO-210 | 27176-93-8 | Rhodia Inc. |
| 112. | Octoxynol-3 | Igepal ® CA-420 | 2315-62-0 | The Dow Chemical Company |
| 113. | Nonoxynol-3 | Marlophen NP 3 | 27176-95-0 | Sasol Germany GmbH |
| 114. | Alkoxylated Alcohols | Alkasurf NP-4 | 7311-27-5 | Rhodia Inc. |
| 115. | Nonoxynol-3 | Triethylene Glycol Mono(p-nonylphenyl) Ether | 51437-95-7 | Santa Cruz Biotechnology |
| 116. | Nonoxynol-7 | Lowenol 2689 | 27177-03-3 | Jos. H Lowenstein & Sons, Inc. |
| 117. | Nonoxynol-6 | Igepal ® CO-530 | 27177-01-1 | Rhodia Inc. |
| 118. | Nonoxynol-5 | Igepal ® CO-520 | 20636-48-0 | Rhodia Inc. |
| 119. | Nonoxynol-5 | Igepal ® CO-520 | 26264-02-8 | Rhodia Inc. |
| 120. | Nonoxynol-5 | Alkasurf NP-4 | 27176-97-2 | Rhodia Inc. |
| 121. | Polyglyceryl-10 Trioleate | Nikkol Decaglyn 3-OV | 102051-00-3 | Nikko Chemicals Co., Ltd. |
| 122. | Polyglyceryl-10 Dioleate | Nikkol Decaglyn 2-O | 33940-99-7 | Nikko Chemicals Co., Ltd. |
| 123. | Polyglyceryl-10 Tetraoleate | Caprol 10G40 | 34424-98-1 | Abitec Corporation |
| 124. | Polyglyceryl-10 Stearate | Nikkol Decaglyn 1-SVEX | 79777-30-3 | Nikko Chemicals Co., Ltd. |
| 125. | Polyglyceryl-10 Oleate | S-Face O-1001 P | 79665-93-3 | Sakamoto Yakuhin Kogyo Co., Ltd. |
| 126. | Polyglyceryl-10 Myristate | Nikkol Decaglyn 1-MVEX | 87390-32-7 | Nikko Chemicals Co., Ltd. |
| 127. | Dermofeel ® G 10 L | Dermofeel ® G 10 L | 34406-66-1 | Dr. Straetmans |
| 128. | Polyglyceryl-6 Laurate | NIKKOL Hexaglyn 1-L | 51033-38-6 | Chemical Navi |
| 129. | Polyglyceryl-6 Isostearate | S-Face IS-601 P | 126928-07-2 | Sakamoto Yakuhin Kogyo Co., Ltd. |
| 130. | Choleth-10 | Emalex CS-10 | 27321-96-6 | Nihon Emulsion Company, Ltd. |
| 131. | Steareth-10 Allyl Ether/Acrylates Copolymer | Salcare ® SC80 | 109292-17-3 | BASF |
| 132. | Polyvinyl Stearyl Ether | Giovarez ®1800 | 9003-96-7 | Phoenix Chemical, Inc. |
| 133. | Dicetyl Ether | Cosmacol Ether 16 | — | Sasol Germany GmbH |
| 134. | PPG-23-Steareth-34 | Unisafe 34S-23 | 9038-43-1 | Pola Chemical Industries, Inc. |
| 135. | Stearoxypropyl Dimethylamine | Farmin DM E-80 | 17517-01-0 | Kao Corp. |
| 136. | Distearyl Ether | Cosmacol SE | 6297-03-6 | Sasol Germany GmbH |
| 137. | Polyquaternium-10 | AEC Polyquaternium-10 | 55353-19-0 | A & E Connock (Perfumery & Cosmetics) Ltd. |
| 138. | Octyl ether | Dioctyl ether | 629-82-3 | Sigma Adirich (UK) |
| 139. | Ethyl Ether | Diethyl Ether | 60-29-7 | EMD Chemicals |
| 140. | Methyl Hexyl Ether Ethers | methyl hexyl ether | 4747-07-3 | TCI AMERICA |
| 141. | Ceteth-12 | Emalex 112 | 94159-75-8 | Nihon Emulsion Company, Ltd. |
| 142. | Ceteth-10 or cetyl alcohol POE-10 | Jeecol CA-10 | 14529-40-9 | Jeen International |
| 143. | Steareth-10 | Jeecol SA-10 | 13149-86-5 | Jeen International |
| 144. | Nonaethylene glycol monododecyl ether | Nonaethylene glycol monododecyl ether | 3055-99-0 | Sigma Aldrich (UK) |
| 145. | Oleth-10 | Brij ® O10 | 71976-00-6 | Croda, Inc. |
| 146. | Oleth-10 | Brij ® O10 | 24871-34-9 | Croda, Inc. |

TABLE 1(b)-continued

Substantially Non-Odorous Fragrance Modulators

| No. | Chemical or INCI Name | Trade Name | CAS Number | Supplier |
|---|---|---|---|---|
| 147. | PEG-12 | Carbowax ™ PEG 600 | 6790-09-6 | The Dow Chemical Company |
| 148. | PEG-9 | Sabopeg 400 | 3386-18-3 | Sabo s.p.a. |
| 149. | PEG-10 | DECAETHYLENE GLYCOL | 5579-66-8 | MolPort |
| 150. | PEG-6 | Carbowax ™ PEG 300 | 2615-15-8 | The Dow Chemical Company |
| 151. | Glycerol propoxylate | Glycerol propoxylate | 25791-96-2 | Sigma Aldrich (UK) |
| 152. | Glycerol ethoxylate | Glycerol ethoxylate | 31694-55-0 | Sigma Aldrich (UK) |
| 153. | Laureth-8 | AEC Laureth-8 | 3055-98-9 | A & E Connock (Perfumery & Cosmetics) Ltd. |
| 154. | Oleth-8 | Emalex 508 | 27040-03-5 | Nihon Emulsion Company, Ltd. |
| 155. | Laureth-7 | Alfonic 1216CO-7 Ethoxylate | 3055-97-8 | Sasol North America, Inc. |
| 156. | Steareth-7 | Polyoxyethylene (7) stearyl ether | 66146-84-7 | Sigma Aldrich |
| 157. | Deceth-6 | Alfonic 1012-6.0 Ethoxylate | 5168-89-8 | Sasol North America, Inc. |
| 158. | Steareth-6 | Emalex 606 | 2420-29-3 | Nihon Emulsion Company, Ltd. |
| 159. | Hexaethylene glycol monododecyl ether | Hexaethylene glycol monododecyl ether | 3055-96-7 | Sigma-Aldrich (UK) |
| 160. | Hexaethylene glycol monohexadecyl ether | Hexaethylene glycol monohexadecyl ether | 5168-91-2 | Sigma-Aldrich (UK) |
| 161. | Beheneth-5 | Nikkol BB-5 | 136207-49-3 | Nikko Chemicals Co., Ltd. |
| 162. | Myreth-5 | Isoxal 12 | 92669-01-7 | Vevy Europe SpA |
| 163. | Steareth-5 | Jeecol SA-5 | 71093-13-5 | Jeen International Corporation |
| 164. | Ceteth-5 | Emalex 105 | 4478-97-1 | Nihon Emulsion Company, Ltd. |
| 165. | Oleth-5 | Brij ® O5 | 5353-27-5 | Croda, Inc. |
| 166. | Laureth-5 | Safol ® 23E5 Ethoxylate | 3055-95-6 | Sasol North America, Inc. |
| 167. | Steareth-4 | Jeecol SA-4 | 59970-10-4 | Jeen International Corporation |
| 168. | Laureth-4 | Brij ® L4 | 5274-68-0 | Croda, Inc. |
| 169. | Myreth-4 | Homulgator 920 G | 39034-24-7 | Grau Aromatics GmbH & Company KG |
| 170. | Ceteth-4 | Procol CA-4 | 5274-63-5 | Protameen Chemicals |
| 171. | Oleth-4 | Chemal OA-4 | 5353-26-4 | Chemax, Inc. |
| 172. | Oleth-4 | Chemal OA-4 | 103622-85-1 | Chemax, Inc. |
| 173. | Polyimide-1 | Aquaflex ™ XL-30 | 497926-97-3 | Chemwill |
| 174. | Polymethoxy Bicyclic Oxazolidine | Caswell No. 494CA | 56709-13-8 | Angene Chemical |
| 175. | Hydroxymethyl Dioxoazabicyclooctane | Zoldine ™ ZT | 6542-37-6 | Angus Chemical Company |
| 176. | Dihydro-7a-ethyloxazolo[3,4-c]oxazole | 5-Ethyl-1-aza-3,7-dioxabicyclo[3.3.0]octane | 7747-35-5 | Sigma Aldrich (UK) |
| 177. | Dibenzylidene Sorbitol | Disorbene ® | 32647-67-9 | Roquette America, Inc. |
| 178. | Dimethyldibenzylidene Sorbitol | Millad ® 3988 | 135861-56-2 | Milliken Chemicals |
| 179. | Laureth-2 | Alfonic 1216CO-2 Ethoxylate | 3055-93-4 | Sasol North America, Inc. |
| 180. | 2-(2-Butoxyethoxy)ethyl (6-propylpiperonyl) ether | Piperonyl Butoxide | 51-03-6 | Sigma-Aldrich (UK) |
| 181. | Menthone Glycerin Acetal | Frescolat ® MGA | 63187-91-7 | Symrise |

TABLE 1(b)-continued

Substantially Non-Odorous Fragrance Modulators

| No. | Chemical or INCI Name | Trade Name | CAS Number | Supplier |
|---|---|---|---|---|
| 182. | Propylene Glycol Caprylate | Mackaderm PGC | 68332-79-6 | Rhodia Inc. |
| 183. | Diethoxynonadiene | SBB016951 | 67674-36-6 | Ambinter |
| 184. | Menthoxypropanediol Alcohols | Coolact ® 10 | 87061-04-9 | Takasago International Corporation |
| 185. | 2-Diphenylmethoxy-N,N-dimethylethylamine hydrochloride | Diphenhydramine HCl | 147-24-0 | Sigma-Aldrich (UK) |
| 186. | 3-((2-ethyl-hexyl)oxy)propane-1,2-diol | — | 70445-33-9 | — |
| 187. | 3-((2-propyl-heptyl)oxy)propane-1,2-diol | — | — | — |
| 188. | 1-amino-3-((2-ethylhexyl)oxy)propan-2-ol | — | 99509-00-9 | — |
| 189. | 1-(1-Methyl-2-propoxyethoxy)-2-propanol | Di(propylene glycol) propyl ether | 29911-27-1 | Sigma Aldrich (UK) |

As described further herein. The compounds, as described above in Tables 1(a) and 1(b), act as a substantially non-odorous fragrance modulator of fragrance materials of the present invention. Without wishing to be bound by theory, it is believed that the substantially non-odorous fragrance modulators associate to fragrance materials to allow for high or overdosed wt % values of the fragrance materials (e.g., greater than 30 wt %) in a composition to which the coating contacts will allow the overdosed fragrance materials to drive the perceived character of the fragrance, while mitigating or eliminating a perceived harshness of the composition by the user. The non-odorous fragrance modulators can also be used in materials that do not include overdosed fragrance materials.

The composition including the substantially non-odorous fragrance modulator according to the present invention, can include a volatile solvent, a non-volatile solvent, or a mixture thereof. The solvent can be organic or aqueous. Where present, the volatile solvent can be present in the amount of from about 20 wt % to about 99 wt % c relative to the total weight of the composition, about 30 wt % to about 80 wt %, about 55 wt % to about 75 wt %, or less than, equal to, or greater than about 20 wt %, 25, 30, 35, 40, 45, 50, 55, 60, 65, 70, 75, 80, 85, 90, 95, or about 99 wt %, and wherein the solvent is a branch or unbranched $C_1$ to $C_{10}$ alkyl, alkenyl or alkynyl group having at least one alcohol moiety, preferably ethanol, or isopropanol, or other alcohols (e.g., methanol, propanol, isopropanol, butanol, and mixtures thereof) commonly found in commercial fine fragrance products.

Accordingly, ethanol may be present in any of the compositions of the present invention, and more specifically, it will form from about 5 wt % to about 95 wt %, or even from about 10 wt % to about 80 wt %, 25 wt % to about 75 wt % of the composition, or combinations thereof, relative to the total weight of the composition. Alternatively, ethanol may be present in an amount of from about 10 wt % or 25 wt % to about 75 wt % or 80 wt %, relative to the total weight of the composition. The ethanol useful in the present invention may be any acceptable quality of ethanol, compatible and safe for the specific intended use of the composition such as, for example, topical applications of fine fragrance or cosmetic compositions.

The composition may comprise a non-volatile solvent or a mixture of non-volatile solvents. Non-limiting examples of non-volatile solvents include benzyl benzoate, diethyl phthalate, isopropyl myristate, propylene glycol, dipropylene glycol, triethyl citrate, and mixtures thereof. Where non-volatile solvents are present, introduced either with the perfume materials or separately, then for the purposes of calculating the proportion of fragrance component having a vapor pressure of less than 0.001 Torr (0.000133 kPa) at 25° C. the total fragrance components does not include non-volatile solvents. Where non-volatile solvents are present, introduced either with the perfume materials or separately, then for the purposes of calculating the total level of fragrance component this does not include non-volatile solvents. In addition, if present with cyclic oligosaccharides, the non-volatile solvent may be included at a weight ratio of the non-volatile solvent to the cyclic oligosaccharide of less than 1:1, less than 1:2, less than 1:10, or less than 1:100.

In some examples (e.g., those including a volatile solvent), water may be present in any of the compositions of the present invention, and more specifically, it may not exceed about 95 wt % relative to the total weight of the composition, about 90 wt % or less, about 85 wt % or less, about 80 wt % or less, about 75 wt % or less, about 70 wt % or less, about 65 wt % or less, about 60 wt % or less, about 55 wt % or less, about 50 wt % or less, about 45 wt % or less, about 40 wt % or less, about 35 wt % or less, about 30 wt % or less, about 20 wt % or less, about 10 wt %, or less than, equal to, or greater than about 95 wt %, 90, 85, 80, 75, 70, 65, 60, 55, 50, 45, 40, 30, 35, 30, 25, 20, 15, 10, or 5 wt %. Alternatively, water may be present in an amount of from about 5 wt % or about 95 wt % When the composition is a cosmetic composition the level of water should not be so high that the product becomes cloudy thus negatively impacting the product aesthetics. It is understood that the amount of water present in the composition may be from the water present in the volatile solvent (e.g., ethanol) used in the composition, as the case may be. In some examples, the coating composition contains only substantially non-odorous components.

The coating compositions described herein can be used in conjunction with a fragrance composition. The fragrance composition can include one or more fragrance components that can be characterized by their respective volatilities. For example, fragrance components can be low volatility, moderate volatility, or high volatility fragrance components. According to various embodiments, a fragrance composition can be overdosed with one or more of the fragrance components such that fragrance composition can be considered to be a bottom-heavy fragrance, a middle-heavy fragrance, a top-heavy fragrance composition, or a composition where fragrance components are evenly distributed.

Each group of materials can be associated with various perceptions by a panel of experts or professional evaluators or individual experts or professional evaluators. While not so limited, a high volatile fragrance may be associated with a citrus character; a moderate volatile fragrance may be associated with a spicy character; and a low volatile fragrance may be associated with a woody character. Each group of fragrance materials can include synthetic materials or natural materials. The volatility of the fragrance materials can be in reference to an individual fragrance material. Alternatively, in cases where a combination of materials produce a fragrance the volatility may be in reference to that aggregation.

With respect to a fragrance composition, the fragrance component can be present in an amount of from about 0.04 wt % to 30 wt %, 1 wt % to about 30 wt %, about 5 wt % to about 30 wt %, or less than, equal to, or greater than about 0.04 wt %, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, or about 30 wt % relative to the composition. Additional components in the fragrance composition can include a carrier such as the organic, inorganic, or aqueous carriers described herein with respect to the coating composition.

Additionally, according to various embodiments, it is possible for the fragrance composition to include any one or more of the modulators described herein with respect to the coating composition. Where present in the coating composition, the modulator can be present in an amount of from about 0.1 wt % to about 20 wt %, about 0.5 wt % to about 20 wt %, or less than, equal to, or greater than about 0.1 wt %, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or about 20 wt % relative to the coating composition.

As described herein, the "fragrance materials" have been classified as low, moderate or high volatile fragrance materials according to their volatility by their vapor pressure. This method of classifying fragrance materials by their vapor pressure avoids the problem of different classifications for the same fragrance material according to the traditional approach that relies on their subjective characteristic character. In the case that the fragrance materials are a natural oil, extract or absolute, which comprises a mixture of several compounds, the vapor pressure of the complete oil should be treated a mixture of the individual perfume raw material components using the reference program cited above. The individual components and their level, in any given natural oil or extract, can be determined by direct injection of the oil into a GC-MS column for analysis as known by one skilled in the art. In the scenario that the fragrance materials are a proprietary specialty accord, so called 'bases', the vapor pressure, using the reference program cited above, should preferably be obtained from the supplier. However, it is understood by one skilled in the art that they can physically analyze the composition of a full fragrance oil available commercially to identity the fragrance raw materials and their levels using standard GC-MS techniques. This would be irrespective of whether they had been added to the fragrance oil as individual chemicals, as components of naturals or from proprietary bases. Although proprietary bases and naturals are included in our examples, when analyzing a commercially available fragrance via GC-MS one could simply identify the components of the base or natural oil as part of the overall fragrance mixture and their levels, without being able to identify which proprietary base or natural oil the fragrance had come from.

Low Volatile Fragrance Materials

The fragrance component comprises at least one low volatile fragrance material. Individual low volatile fragrance materials or aggregate low volatile fragrance materials are those having a vapor pressure less than 0.001 Torr (0.000133 kPa) at 25° C. According to some examples, the composition can include at least 3 low volatile fragrance materials, or at least 4 low volatile fragrance materials, or at least 5 low volatile fragrance materials, or at least 7 low volatile fragrance materials. The amount of the low volatile fragrance material present in the fragrance component can vary depending on the specific application. In some embodiments, the low volatile fragrance component can be in a range of from about 0 wt % to about 100 wt % of the fragrance component, about 10 wt % to about 90 wt %, about 20 wt % to about 80 wt %, about 30 wt % to about 70 wt %, or about 40 wt % to about 60 wt %. The exact wt % of the low volatile fragrance component can vary greatly based on the fragrance's construction, for example, in a bottom-heavy embodiment, the low volatile fragrance material can be greater than about 30 wt % of the fragrance component, greater than about 40 wt %, greater than about 50 wt %, greater than about 60 wt %, about 31 wt % to about 60 wt %, about 40 wt % to about 50 wt %, or less than, equal to, or greater than about 30 wt %, 31, 35, 40, 45, 50, 55, 60, 65, 70, or 75 wt %. In embodiments that are top- or middle-heavy the low volatile fragrances can be can be present in an amount ranging from about 0 wt % to about 30 wt % of the fragrance component, about 1 wt % to about 30 wt %, about 1 wt % to about 29 wt %, or less than, equal to, or greater than about 0 wt %, 0.1, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.25, 27, 27.5, 28, 28.5, 29, 29.5, or about 30 wt %. In still further embodiments, the low volatile fragrance material can be in an amount ranging from about 30 wt % to about 40 wt % of the fragrance component, about 32 wt % to about 35 wt %, less than, equal to, or greater than about 30 wt % 31, 32, 33, 34, 35, 36, 37, 38, 39, or 40 wt %. In some embodiments, the low-volatile fragrance material can be the only fragrance material present. Relative to any other fragrance materials, the low volatile fragrance component can be present in a ratio ranging from about 20:1 to about 1:20, about 10:1 to about 1:10, about 5:1 to about 1:5, or about 1:1.

If there are more than one low volatile fragrance materials, then the ranges provided hereinabove cover the total of all the low volatile fragrance materials. Examples of suitable low volatile fragrances materials are provided in Table 2A and 2B below.

Preferably, the low volatile fragrance material is selected from at least 1 material, or at least 2 materials, or at least 3 materials, or at least 5 materials, at least 7, at least 8, at least 10, or at least 12 low volatile fragrance materials as disclosed in Table 2A. Natural fragrance materials or oils having an aggregate vapor pressure less than 0.001 Torr (0.000133 kPa) at 25° C. are provided in Table 2B. Low Volatile Natural Oils.

TABLE 2A

Low Volatile Fragrance Materials

| No. | CAS Number | IUPAC Name | Common Name** | Vapor Pressure (Torr at 25° C.)* |
|---|---|---|---|---|
| 1. | 1211-29-6 | Cyclopentaneacetic acid, 3-oxo-2-(2Z)-2-penten-1-yl-, methyl ester, (1R,2R)- | Methyl jasmonate | 0.00096500 |
| 2. | 28219-60-5 | 2-Buten-1-ol, 2-methyl-4-(2,2,3-trimethyl-3-cyclopenten-1-yl)- | Hindinol | 0.00096100 |
| 3. | 93-08-3 | Ethanone, 1-(2-naphthalenyl)- | Methyl beta-naphthyl ketone | 0.00095700 |
| 4 | 67633-95-8 | 3-Decanone, 1-hydroxy- | Methyl Lavender Ketone | 0.00095100 |
| 5. | 198404-98-7 | Cyclopropanemethanol, 1-methyl-2-[(1,2,2-trimethylbicyclo[3.1.0]hex-3-yl)methyl]- | Javanol ® | 0.00090200 |
| 6. | 121-32-4 | Benzaldehyde, 3-ethoxy-4-hydroxy- | Ethyl vanillin | 0.00088400 |
| 7. | 72403-67-9 | 3-Cyclohexene-1-methanol, 4-(4-methyl-3-penten-1-yl)-, 1-acetate | Myraldylacetate | 0.00087900 |
| 8. | 28940-11-6 | 2H-1,5-Benzodioxepin-3(4H)-one, 7-methyl- | Calone | 0.00083100 |
| 9. | 139504-68-0 | 2-Butanol, 1-[[2-(1,1-dimethylethyl)cyclohexyl]oxy]- | Amber core | 0.00080300 |
| 10. | 502847-01-0 | Spiro[5.5]undec-8-en-1-one, 2,2,7,9-tetramethyl- | Spiro[5.5]undec-8-en-1-one, 2,2,7,9-tetramethyl- | 0.00073100 |
| 11. | 2570-03-8 | Cyclopentaneacetic acid, 3-oxo-2-pentyl-, methyl ester, (1R,2R)-rel- | trans-Hedione | 0.00071000 |
| 12. | 24851-98-7 | Cyclopentaneacetic acid, 3-oxo-2-pentyl-, methyl ester | Methyl dihydrojasmonate or alternatives [1] | 0.00071000 |
| 13. | 101-86-0 | Octanal, 2-(phenylmethylene)- | Hexyl cinnamic aldehyde | 0.00069700 |
| 14. | 365411-50-3 | Indeno[4,5-d]-1,3-dioxin, 4,4a,5,6,7,8,9,9b-octahydro-7,7,8,9,9-pentamethyl- | Nebulone | 0.00069200 |
| 15. | 37172-53-5 | Cyclopentanecarboxylic acid, 2-hexyl-3-oxo-, methyl ester | Dihydro Iso Jasmonate | 0.00067500 |
| 16. | 65113-99-7 | 3-Cyclopentene-1-butanol, α,β,3,2,2,3-pentamethyl- | Sandalore ® | 0.00062500 |
| 17. | 68133-79-9 | Cyclopentanone, 2-(3,7-dimethyl-2,6-octadien-1-yl)- | Apritone | 0.00062000 |
| 18. | 7212-44-4 | 1,6,10-Dodecatrien-3-ol, 3,7,11-trimethyl- | Nerolidol | 0.00061600 |
| 19. | 53243-59-7 | 2-Pentenenitrile, 3-methyl-5-phenyl-, (2Z)- | Citronitril | 0.00061500 |
| 20. | 134123-93-6 | Benzenepropanenitrile, 4-ethyl-α,α-dimethyl- | Fleuranil | 0.00057600 |
| 21. | 77-53-2 | 1H-3a,7-Methanoazulen-6-ol, octahydro-3,6,8,8-tetramethyl-, (3R,3aS,6R,7R,8aS)- | Cedrol Crude | 0.00056900 |
| 22. | 68155-66-8 | Ethanone, 1-(1,2,3,5,6,7,8,8a-octahydro-2,3,8,8-tetramethyl-2-naphthalenyl)- | Iso Gamma Super | 0.00056500 |

TABLE 2A-continued

Low Volatile Fragrance Materials

| No. | CAS Number | IUPAC Name | Common Name** | Vapor Pressure (Torr at 25° C.)* |
|---|---|---|---|---|
| 23. | 54464-57-2 | Ethanone, 1-(1,2,3,4,5,6,7,8-octahydro-2,3,8,8-tetramethyl-2-naphthalenyl)- | Iso-E Super ® | 0.00053800 |
| 24. | 774-55-0 | Ethanone, 1-(5,6,7,8-tetrahydro-2-naphthalenyl)- | Florantone | 0.00053000 |
| 25. | 141-92-4 | 2-Octanol, 8,8-dimethoxy-2,6-dimethyl- | Hydroxycitronellal Dimethyl Acetal | 0.00052000 |
| 26. | 20665-85-4 | Propanoic acid, 2-methyl-, 4-formyl-2-methoxyphenyl ester | Vanillin isobutyrate | 0.00051200 |
| 27. | 79-78-7 | 1,6-Heptadien-3-one, 1-(2,6,6-trimethyl-2-cyclohexen-1-yl)- | Hexalon | 0.00049800 |
| 28. | 6259-76-3 | Benzoic acid, 2-hydroxy-, hexyl ester | Hexyl Salicylate | 0.00049100 |
| 29. | 93-99-2 | Benzoic acid, phenyl ester | Phenyl Benzoate | 0.00047900 |
| 30. | 153859-23-5 | Cyclohexanepropanol, 2,2,6-trimethyl-α-propyl-, (1R,6S)- | Norlimbanol | 0.00046900 |
| 31. | 70788-30-6 | Cyclohexanepropanol, 2,2,6-trimethyl-α-propyl- | Timberol/ Norlimbanol | 0.00046900 |
| 32. | 68555-58-8 | Benzoic acid, 2-hydroxy-, 3-methyl-2-buten-1-yl ester | Prenyl Salicylate | 0.00045700 |
| 33. | 950919-28-5 | 2H-1,5-Benzodioxepin-3(4H)-one, 7-(1-methylethyl)- | Cascalone | 0.00045500 |
| 34. | 30168-23-1 | Butanal, 4-(octahydro-4,7-methano-5H-inden-5-ylidene)- | Dupical | 0.00044100 |
| 35. | 1222-05-5 | Cyclopenta[g]-2-, benzopyran, 1,3,4,7,8-hexahydro-4,6,6,7,8,8-hexamethyl- | Galaxolide ® | 0.00041400 |
| 36. | 4602-84-0 | 2,6,10-Dodecatrien-1-ol, 3,7,11-trimethyl- | Farnesol | 0.00037000 |
| 37. | 95962-14-4 | Cyclopentanone, 2-[2-(4-methyl-3-cyclohexen-1-yl)propyl]- | Nectaryl | 0.00036700 |
| 38. | 4674-50-4 | 2(3H)-Naphthalenone, 4,4a,5,6,7,8-hexahydro-4,4a-dimethyl-6-(1-methylethenyl)-, (4R,4aS,6R)- | Nootkatone | 0.00035800 |
| 39. | 3487-99-8 | 2-Propenoic acid, 3-phenyl-, pentyl ester | Amyl Cinnamate | 0.00035200 |
| 40. | 10522-41-5 | 2-hydroxy-2-phenylethyl acetate | Styrolyl Acetate | 0.00033900 |
| 41. | 118-71-8 | 4H-Pyran-4-one, 3-hydroxy-2-methyl- | Maltol | 0.00033700 |
| 42. | 128119-70-0 | 1-Propanol, 2-methyl-3-[(1,7,7-tri-methylbicyclo[2.2.1]hept-2-yl)oxy]- | Bornafix | 0.00033400 |
| 43. | 103614-86-4 | 1-Naphthalenol, 1,2,3,4,4a,5,8,8a-octahydro-2,2,6,8-tetramethyl- | Octalynol | 0.00033200 |
| 44. | 7785-33-3 | 2-Butenoic acid, 2-methyl-, (2E)-3,7-dimethyl-2,6-octadien-1-yl ester, (2E)- | Geranyl Tiglate | 0.00033200 |
| 45. | 117933-89-8 | 1,3-Dioxane, 2-(2,4-dimethyl-3-cyclohexen-1-yl)-5-methyl-5-(1-methylpropyl)- | Karanal | 0.00033100 |
| 46. | 629-92-5 | Nonadecane | Nonadecane | 0.00032500 |
| 47. | 67801-20-1 | 4-Penten-2-ol, 3-methyl-5-(2,2,3-trimethyl-3-cyclopenten-1-yl)- | Ebanol | 0.00028100 |

TABLE 2A-continued

Low Volatile Fragrance Materials

| No. | CAS Number | IUPAC Name | Common Name** | Vapor Pressure (Torr at 25° C.)* |
|---|---|---|---|---|
| 48. | 65416-14-0 | Propanoic acid, 2-methyl-, 2-methyl-4-oxo-4H-pyran-3-yl ester | Maltol Isobutyrate | 0.00028000 |
| 49. | 28219-61-6 | 2-Buten-1-ol, 2-ethyl-4-(2,2,3-trimethyl-3-cyclopenten-1-yl)- | Laevo Trisandol | 0.00028000 |
| 50. | 5986-55-0 | 1,6-Methanonaphthalen-1(2H)-ol, octahydro-4,8a,9,9-tetramethyl-, (1R,4S,4aS,6R,8aS)- | Healingwood | 0.00027800 |
| 51. | 195251-91-3 | 2H-1,5-Benzodioxepin-3(4H)-one, 7-(1,1-dimethylethyl)- | Transluzone | 0.00026500 |
| 52. | 3100-36-5 | 8-Cyclohexadecen-1-one | Cyclohexadecenone | 0.00025300 |
| 53. | 65405-77-8 | Benzoic acid, 2-hydroxy-, (3Z)-3-hexen-1-yl ester | cis-3-Hexenyl salicylate | 0.00024600 |
| 54. | 4940-11-8 | 4H-Pyran-4-one, 2-ethyl-3-hydroxy- | Ethyl Maltol | 0.00022800 |
| 55. | 541-91-3 | Cyclopentadecanone, 3-methyl- | Muskone | 0.00017600 |
| 56. | 118-58-1 | Benzoic acid, 2-hydroxy-, phenylmethyl ester | Benzyl salicylate | 0.00017500 |
| 57. | 81783-01-9 | 6,8-Nonadien-3-one, 2,4,4,7-tetramethyl-, oxime | Labienoxime | 0.00017300 |
| 58. | 25485-88-5 | Benzoic acid, 2-hydroxy-, cyclohexyl ester | Cyclohexyl Salicylate | 0.00017300 |
| 59. | 91-87-2 | Benzene, [2-(dimethoxymethyl)-1-hepten-1-yl]- | Amyl Cinnamic Aldehyde Dimethyl Acetal | 0.00016300 |
| 60. | 104864-90-6 | 3-Cyclopentene-1-butanol, β,2,2,3-tetramethyl-δ-methylene- | Firsantol | 0.00016000 |
| 61. | 224031-70-3 | 4-Penten-1-one, 1-spiro[4.5]dec-7-en-7-yl- | Spirogalbanone | 0.00015300 |
| 62. | 134-28-1 | 5-Azulenemethanol, 1,2,3,4,5,6,7,8-octahydro-α,α,3,8-tetramethyl-, 5-acetate, (3S,5R,8S)- | Guaiyl Acetate | 0.00013400 |
| 63. | 236391-76-7 | Acetic acid, 2-(1-oxopropoxy)-, 1-(3,3-dimethylcyclohexy)ethyl ester | Romandolide ® | 0.00012400 |
| 64. | 115-71-9 | 2-Penten-1-ol, 5-[(1R,3R,6S)-2,3-dimethyltricy-clo[2.2.1.02,6]hept-3-yl]-2-methyl-, (2Z)- | cis-alpha-Santalol | 0.00011800 |
| 65. | 107898-54-4 | 4-Penten-2-ol, 3,3-dimethyl-5-(2,2,3-trimethyl-3-cyclopenten-1-yl)- | Polysantol ® | 0.00011700 |
| 66. | 69486-14-2 | 5,8-Methano-2H-1-benzopyran-2-one, 6-ethylideneoctahydro- | Florex ® | 0.00011000 |
| 67. | 84697-09-6 | Heptanal, 2-[(4-methylphenyl)methylene]- | Acalea | 0.00010100 |
| 68. | 14595-54-1 | 4-Cyclopentadecen-1-one, (4Z)- | Exaltenone | 0.00009640 |
| 69. | 32388-55-9 | Ethanone, 1-[(3R,3aR,7R,8aS)-2,3,4,7,8,8a-hexahydro-3,6,8,8-tetramethyl-1H-3a,7-methanoazulen-5-yl]- | Vertofix ® | 0.00008490 |
| 70. | 131812-67-4 | 1,3-Dioxolane, 2,4-dimethyl-2-(5,6,7,8-tetrahydro-5,5,8,8-tetramethyl-2-naphthalenyl)- | Okoumal ® | 0.00007600 |

TABLE 2A-continued

Low Volatile Fragrance Materials

| No. | CAS Number | IUPAC Name | Common Name** | Vapor Pressure (Torr at 25° C.)* |
|---|---|---|---|---|
| 71. | 106-02-5 | Oxacyclohexadecan-2-one | Exaltolide ® | 0.00006430 |
| 72. | 141773-73-1 | 1-Propanol, 2-[1-(3,3-dimethylcyclohexyl)ethoxy]-2-methyl-, 1-propanoate | Helvetolide ® | 0.00005790 |
| 73. | 63314-79-4 | 5-Cyclopentadecen-1-one, 3-methyl- | Delta Muscenone | 0.00005650 |
| 74. | 77-42-9 | 2-Penten-1-ol, 2-methyl-5-[(1S,2R,4R)-2-methyl-3-methylenebicyclo[2.2.1]hept-2-yl]-, (2Z)- | cis-beta-Santalol | 0.00004810 |
| 75. | 362467-67-2 | 2H-1,5-Benzodioxepin-3(4H)-one, 7-(3-methylbutyl)- | Azurone | 0.00004770 |
| 76. | 28371-99-5 | Ethanone, 1-(2,6,10-trimethyl-2,5,9-cyclododecatrien-1-yl)- | Trimofix O | 0.00004580 |
| 77. | 16223-63-5 | 1H-3a,6-Methanoazulene-3-methanol, octahydro-7,7-dimethyl-8-methylene-, (3S,3aR,6R,8aS)- | Khusimol | 0.00004400 |
| 78. | 10461-98-0 | Benzeneacetonitrile, α-cyclohexylidene- | Peonile | 0.00004290 |
| 79. | 90-17-5 | Benzenemethanol, α-(trichloromethyl)-, 1-acetate | Rosacetol | 0.00004240 |
| 80. | 50607-64-2 | Benzoic acid, 2-[(2-methylpentylidene)amino]-, methyl ester | Mevantraal | 0.00004070 |
| 81. | 29895-73-6 | 5-Hydroxy-2-benzyl-1,3-dioxane | Acetal CD | 0.00004050 |
| 82. | 94-47-3 | Benzoic acid, 2-phenylethyl ester | Phenyl Ethyl Benzoate | 0.00003480 |
| 83. | 3100-36-5 | Cyclohexadec-8-en-1-one | Globanone ® | 0.00003310 |
| 84. | 37609-25-9 | 5-Cyclohexadecen-1-One | Ambretone | 0.00003310 |
| 85. | 66072-32-0 | Cyclohexanol, 4-(1,7,7-trimethylbicyclo[2.2.1]hept-2-yl)- | Iso Bornyl Cyclohexanol | 0.00003010 |
| 86. | 31906-04-4 | 3-Cyclohexene-1-carboxaldehyde, 4-(4-hydroxy-4-methylpentyl)- | Lyral ® | 0.00002940 |
| 87. | 21145-77-7 | Ethanone, 1-(5,6,7,8-tetrahydro-3,5,5,6,8,8-hexamethyl-2-naphthalenyl)- | Musk Plus | 0.00002860 |
| 88. | 21145-77-7 | Ethanone, 1-(5,6,7,8-tetrahydro-3,5,5,6,8,8-hexamethyl-2-naphthalenyl)- | Fixolide | 0.00002860 |
| 89. | 22442-01-9 | 2-Cyclopentadecen-1-one, 3-methyl- | Muscenone | 0.00002770 |
| 90. | 109-29-5 | Oxacycloheptadecan-2-one | Silvanone Ci | 0.00002600 |
| 91. | 101-94-0 | Benzeneacetic acid, 4-methylphenyl ester | Para Cresyl Phenyl Acetate | 0.00002330 |
| 92. | 102-20-5 | Benzeneacetic acid, 2-phenylethyl ester | Phenyl Ethyl Phenyl Acetate | 0.00002300 |
| 93. | 118562-73-5 | Cyclododecaneethanol, β-methyl- | Hydroxyambran | 0.00001800 |
| 94. | 103-41-3 | 2-Propenoic acid, 3-phenyl-, phenylmethyl ester | Benzyl Cinnamate | 0.00001050 |
| 95. | 4707-47-5 | Benzoic acid, 2,4-dihydroxy-3,6-dimethyl-, methyl ester | Veramoss/ LRG201/ Evernyl | 0.00001050 |
| 96. | 183551-83-9 | Naphtho[2,1-b]furan-6(7H)-one, 8,9-dihydro-1,5,8-trimethyl-, (8R)- | Myrrhone | 0.00000977 |
| 97. | 102-17-0 | Benzeneacetic acid, (4-methoxyphenyl)methyl ester | Para Anisyl Phenyl Acetate | 0.00000813 |

TABLE 2A-continued

Low Volatile Fragrance Materials

| No. | CAS Number | IUPAC Name | Common Name** | Vapor Pressure (Torr at 25° C.)* |
|---|---|---|---|---|
| 98. | 120-11-6 | Benzene, 2-methoxy-1-(phenylmethoxy)-4-(1-propen-1-yl)- | Benzyl Iso Eugenol | 0.00000676 |
| 99. | 102-22-7 | Benzeneacetic acid, (2E)-3,7-dimethyl-2,6-octadien-1-yl ester | Geranyl Phenylacetate | 0.00000645 |
| 100. | 111879-80-2 | Oxacyclohexadec-12-en-2-one, (12E)- | Habanolide 100% | 0.00000431 |
| 101. | 87-22-9 | Benzoic acid, 2-hydroxy-, 2-phenylethyl ester | Phenyl Ethyl Salicylate | 0.00000299 |
| 102. | 78-37-5 | 2-Propenoic acid, 3-phenyl -, 1-ethenyl-1,5-dimethyl-4-hexen-1-yl ester | Linalyl Cinnamate | 0.00000174 |
| 103. | 28645-51-4 | Oxacycloheptadec-10-en-2-one | Ambrettolide | 0.00000139 |
| 104. | 123-69-3 | Oxacycloheptadec-8-en-2-one, (8Z)- | Ambrettolide | 0.00000136 |
| 105. | 3391-83-1 | 1,7-Dioxacycloheptadecan-8-one | Musk RI | 0.00000057 |
| 106. | 68527-79-7 | 7-Octen-2-ol, 8-(1H-indol-1-yl)-2,6-dimethyl- | Indolene | 0.000000445 |
| 107. | 89-43-0 | Methyl 2-[(7-hydroxy-3,7-dimethyloc-tylidene)amino]benzoate | Aurantinol | 0.0000000100 |
| 108. | 54982-83-1 | 1,4-Dioxacyclohexadecane-5,16-dione | Zenolide | 0.00000000834 |
| 109. | 105-95-3 | 1,4-Dioxacycloheptadecane-5,17-dione | Ethylene Brassylate | 0.00000000313 |
| 110. | 3681-73-0 | Hexadecanoic acid, (2E)-3,7-dimethyl-2,6-octadien-1-yl ester | Hexarose | 0.00000000300 |
| 111. | 4159-29-9 | Phenol, 4-[3-(benzoyloxy)-1-propen-1-yl]-2-methoxy- | Coniferyl benzoate | 0.00000000170 |
| 112. | 144761-91-1 | Benzoic acid, 2-[(1-hydroxy-3-phenylbutyl)amino]-, methyl ester | Trifone DIPG | 0.00000000093 |

[1] Non-limiting examples of alternative qualities from various suppliers can be purchased under the following tradenames: Kharismal ® Super (IFF), Kharismal ® (IFF), Hedione ® (Firmenich), Hedione ® HC (Firmenich), Paradisone (Firmenich), Cepionate (Zenon), Super cepionate (Zenon), Claigeon ® (Zenon).
*Vapor Pressures are acquired as described in the Test Methods Section.
**Origin: The low volatile fragrance materials may be obtained from one or more of the following companies: Firmenich (Geneva, Switzerland), Symrise AG (Holzminden, Germany), Givaudan (Argenteuil, France), IFF (Hazlet, New Jersey), Bedoukian (Danbury, Connecticut), Sigma Aldrich (St. Louis, Missouri), Millennium Specialty Chemicals (Olympia Fields, Illinois), Polarone International (Jersey City, New Jersey), and Aroma & Flavor Specialties (Danbury, Connecticut).

TABLE 2B

Low Volatile Natural Oils.

| No. | Natural oil | Supplier |
|---|---|---|
| 1. | Beeswax Absolute | Robertet |
| 2. | Cedarwood Sawdust SFE | Firmenich |
| 3. | Cedarwood Oil Rect | Firmenich |
| 4. | Cedarwood Texas Light | H. Reynaud & Fils |
| 5. | Ciste Absolute | IFF |
| 6. | Cocoa Colorless Oil | Robertet |
| 7. | Cypriol Coeur Essence | Robertet |
| 8.. | Guaiacwood Oil | Global Essence Inc |
| 9. | Incense Wood Natural | Robertet |
| 10. | Orris CO2 Extract | Mane |
| 11. | Patchouli Oil | IFF |
| 12. | Tolu Baume Res | Robertet |
| 13. | Vanilla Absolute | Robertet |
| 14. | Vanilla CO2 Absolute | Robertet |
| 15. | Vetivert Oil | IFF |
| 16. | Vetyvert Acetate | Robertet |

Suppliers:

Firmenich, Geneva, Switzerland

Global Essence Inc, New Jersey, USA

H. Reynaud & Fils, Montbrun-les-Bains, France

IFF, Hazlet, New Jersey, USA

Mane, Le Bar-sur-Loup, France

Robertet, Grasse, France

Exemplary low volatile fragrance materials selected from the group of Tables 2A or 2B Low Volatile Fragrance Materials are preferred. However, it is understood by one skilled in the art that other low volatile fragrance materials, not recited in Tables 2A or 2B, would also fall within the scope of the present invention, so long as they have a vapor pressure less than 0.001 Torr (0.000133 kPa) at 25° C.

Moderate Volatile Fragrance Materials

The fragrance component includes at least one moderate volatile fragrance material or aggregate of volatile fragrance materials having a vapor pressure in the range of 0.1 Torr to 0.001 Torr (0.0133 kPa to 0.000133 kPa) at 25° C. In some examples, the composition according to the present disclosure can include at least 3 moderate volatile fragrance materials, or at least 5 moderate volatile fragrance materials, or at least 7 moderate volatile fragrance materials. Compositions of the present invention can include any suitable amount of the moderate volatile fragrance materials. For example, in some embodiments, the moderate volatile fragrance component can be in a range of from about 0 wt % to about 100 wt % of the fragrance component, about 10 wt % to about 90 wt %, about 20 wt % to about 80 wt %, about 30 wt % to about 70 wt %, or about 40 wt % to about 60 wt %. The exact wt % of the moderate volatile fragrance component can vary greatly based on the fragrance's construction. The exact wt % of various moderate volatile fragrance components can depend on the fragrance's construction. For example, in some constructions, high levels of the moderate volatile fragrance materials present in an amount of from about 30 wt % to about 75 wt %, about 35 wt % to about 60 wt %, or less than equal to, or greater than about 30 wt %, 35, 40, 45, 50, 55, 60, 65, 70, or 75 wt % of the fragrance component. If there are more than one moderate volatile fragrance materials, then the ranges provided hereinabove cover the total of all of the moderate volatile fragrance materials. Suitable examples of moderate volatile fragrances materials are provided in Table 3A and 3B below. Alternatively, in further embodiments, the moderate volatile fragrance material can be present in an amount ranging from about 0 wt % to about 30 wt % of the fragrance component, about 1 wt % to about 30 wt %, about 1 wt % to about 29 wt %, or less than, equal to, or greater than about 0 wt %, 0.1, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.25, 27, 27.5, 28, 28.5, 29, 29.5, or about 30 wt %. In still further embodiments, the moderate volatile fragrance material can be in an amount ranging from about 30 wt % to about 40 wt % of the fragrance component, about 32 wt % to about 35 wt %, less than, equal to, or greater than about 30 wt % 31, 32, 33, 34, 35, 36, 37, 38, 39, or 40 wt %. In some embodiments, the moderate volatile fragrance material can be the only fragrance material present. Relative to any other fragrance materials, the moderate volatile fragrance component can be present in a ratio ranging from about 20:1 to about 1:20, about 10:1 to about 1:10, about 5:1 to about 1:5, or about 1:1.

Preferable examples of moderate volatile fragrance materials having a vapor pressure in the range of 0.1 Torr to 0.001 Torr (0.0133 kPa to 0.000133 kPa) at 25° C. are provided in Table 3 Moderate Volatile Fragrance Materials. Preferably, the moderate volatile fragrance material is selected from at least 1 material, or at least 2 materials, or at least 3 materials, or at least 5 materials, or at least 7 moderate volatile fragrance materials as disclosed in Table 3A. Natural fragrance materials or oils having an aggregate vapor pressure between 0.1 Torr to 0.001 Torr (0.0133 kPa to 0.000133 kPa) at 25° C. are provided in Table 3B. Moderate Volatile Natural Oils.

TABLE 3A

Moderate Volatile Fragrance Materials

| No. | CAS Number | IUPAC Name | Common Name** | Vaporat Pressure (Torr at 25° C.)* |
|---|---|---|---|---|
| 1. | 24168-70-5 | Pyrazine, 2-methoxy-3-(1-methylpropyl)- | Methoxyisobutyl-pyrazine | 0.09950000 |
| 2. | 89-79-2 | Cyclohexanol, 5-methyl-2-(1-methylethenyl)-, (1R,2S,5R)- | Iso-Pulegol | 0.09930000 |
| 3. | 112-12-9 | 2-Undecanone | Methyl Nonyl Ketone | 0.09780000 |
| 4. | 103-05-9 | Benzenepropanol, α,α-dimethyl- | Phenyl Ethyl Dimethyl Carbinol | 0.09770000 |
| 5. | 125-12-2 | Bicyclo[2.2.1]heptan-2-ol, 1,7,7-trimethyl-, 2-acetate, (1R,2R,4R)-rel- | Iso Bornyl Acetate | 0.09590000 |
| 6. | 78-70-6 | 1,6-Octadien-3-ol, 3,7-dimethyl- | Linalool | 0.09050000 |
| 7. | 101-97-3 | Benzeneacetic acid, ethyl ester | Ethyl Phenyl Acetate | 0.08970000 |
| 8. | 100-86-7 | Benzeneethanol, α,α-dimethyl- | Dimethyl Benzyl Carbinol | 0.08880000 |
| 9. | 188570-78-7 | Cyclopropanecarboxylic acid, (3Z)-3-hexen-1-yl ester | Montaverdi | 0.08640000 |
| 10. | 67634-25-7 | 3-Cyclohexene-1-methanol, 3,5-dimethyl-, 1-acetate | Floralate | 0.08500000 |
| 11. | 112-44-7 | Undecanal | Undecyl Aldehyde | 0.08320000 |

TABLE 3A-continued

Moderate Volatile Fragrance Materials

| No. | CAS Number | IUPAC Name | Common Name** | Vaporat Pressure (Torr at 25° C.)* |
|---|---|---|---|---|
| 12. | 32669-00-4 | Ethanone, 1-(3-cycloocten-1-yl)- | Tanaisone ® | 0.08150000 |
| 13. | 98-53-3 | Cyclohexanone, 4-(1,1-dimethylethyl)- | Patchi | 0.07780000 |
| 14. | 35854-86-5 | 6-Nonen-1-ol, (6Z)- | cis-6-None-1-ol | 0.07770000 |
| 15. | 5331-14-6 | Benzene, (2-butoxyethyl)- | Butyl phenethyl ether | 0.07760000 |
| 16. | 80-57-9 | Bicyclo[3.1.1]hept-3-en-2-one, 4,6,6-trimethyl- | Verbenone | 0.07730000 |
| 17. | 22471-55-2 | Cyclohexanecarboxylic acid, 2,2,6-trimethyl-, ethyl ester, (1R,6S)-rel- | Thesaron | 0.07670000 |
| 18. | 60-12-8 | Benzeneethanol | Phenethyl alcohol | 0.07410000 |
| 19. | 106-26-3 | 2,6-Octadienal, 3,7-dimethyl-, (2Z)- | Neral | 0.07120000 |
| 20. | 5392-40-5 | 2,6-Octadienal, 3,7-dimethyl- | Citral | 0.07120000 |
| 21. | 89-48-5 | Cyclohexanol, 5-methyl-2-(1-methylethyl)-, 1-acetate, (1R,2S,5R)-rel- | Menthyl Acetate | 0.07070000 |
| 22. | 119-36-8 | Benzoic acid, 2-hydroxy-, methyl ester | Methyl salicylate | 0.07000000 |
| 23. | 104-46-1 | Benzene, 1-methoxy-4-(1E)-1-propen-1-yl- | Anethol | 0.06870000 |
| 24. | 7549-37-3 | 2,6-Octadiene, 1,1-dimethoxy-3,7-dimethyl- | Citral Dimethyl Acetal | 0.06780000 |
| 25. | 25225-08-5 | Cyclohexanemethanol α,3,3-trimethyl-, 1-formate | Aphermate | 0.06780000 |
| 26. | 3913-81-3 | 2-Decenal, (2E)- | 2-Decene-1-al | 0.06740000 |
| 27. | 15373-31-6 | 3-Cyclopentene-1-acetonitrile, 2,2,3-trimethyl- | Cantryl ® | 0.06700000 |
| 28. | 6485-40-1 | 2-Cyclohexen-1-one, 2-methyl-5-(1-methylethenyl)-, (5R)- | Laevo carvone | 0.06560000 |
| 29. | 16587-71-6 | Cyclohexanone, 4-(1,1-dimethylpropyl)- | Orivone | 0.06490000 |
| 30. | 62406-73-9 | 6,10-Dioxaspiro[4.5]decane, 8,8-dimethyl-7-(1-methylethyl)- | Opalal CI | 0.06290000 |
| 31. | 3720-16-9 | 2-Cyclohexen-1-one, 3-methyl-5-propyl- | Livescone | 0.06270000 |
| 32. | 13816-33-6 | Benzonitrile, 4-(1-methylethyl)- | Cumin Nitrile | 0.06230000 |
| 33. | 67019-89-0 | 2,6-Nonadienenitrile | Violet Nitrile | 0.06200000 |
| 34. | 53398-85-9 | Butanoic acid, 2-methyl-, (3Z)-3-hexen-1-yl ester | cis-3-Hexenyl Alpha Methyl Butyrate | 0.06130000 |
| 35. | 208041-98-9 | n/a | Jasmonitrile | 0.05920000 |
| 36. | 16510-27-3 | Benzene, 1-(cyclopropylmethyl)-4-methoxy- | Toscanol | 0.05870000 |
| 37. | 111-80-8 | 2-Nonynoic acid, methyl ester | Methyl Octine Carbonate | 0.05680000 |
| 38. | 103-45-7 | Acetic acid, 2-phenylethyl ester | Phenyl Ethyl Acetate | 0.05640000 |
| 39. | 2550-26-7 | 2-Butanone, 4-phenyl- | Benzyl Acetone | 0.05570000 |
| 40. | 13491-79-7 | Cyclohexanol, 2-(1,1-dimethylethyl)- | Verdol | 0.05430000 |
| 41. | 7786-44-9 | 2,6-Nonadien-1-ol | 2,6-Nonadien-1-ol | 0.05370000 |
| 42. | 103-28-6 | Propanoic acid, 2-methyl-, phenylmethyl ester | Benzyl Iso Butyrate | 0.05130000 |

TABLE 3A-continued

Moderate Volatile Fragrance Materials

| No. | CAS Number | IUPAC Name | Common Name** | Vaporat Pressure (Torr at 25° C.)* |
|---|---|---|---|---|
| 43. | 104-62-1 | Formic acid, 2-phenylethyl ester | Phenyl Ethyl Formate | 0.05050000 |
| 44. | 28462-85-3 | Bicyclo[2.2.1]heptan-2-ol, 1,2,3,3-tetramethyl-, (1R,2R,4S)-rel- | Humus Ether | 0.04870000 |
| 45. | 122-03-2 | Benzaldehyde, 4-(1-methylethyl)- | Cuminic Aldehyde | 0.04820000 |
| 46. | 358331-95-0 | 2,5-Octadien-4-one, 5,6,7-trimethyl-, (2E)- | Pomarose | 0.04810000 |
| 47. | 562-74-3 | 3-Cyclohexen-1-ol, 4-methyl-1-(1-methylethyl)- | Terpinenol-4 | 0.04780000 |
| 48. | 68527-77-5 | 3-Cyclohexene-1-methanol, 2,4,6-trimethyl- | Isocyclogeraniol | 0.04640000 |
| 49. | 35852-46-1 | Pentanoic acid, (3Z)-3-hexen-1-yl ester | Cis-3-Hexenyl Valerate | 0.04580000 |
| 50. | 2756-56-1 | Bicyclo[2.2.1]heptan-2-ol, 1,7,7-trimethyl-, 2-propanoate, (1R,2R,4R)-rel- | Iso Bornyl Propionate | 0.04540000 |
| 51. | 14374-92-6 | Benzene, 1-methyl-4-(1-methylethyl)-2-(1-propen-1-yl)- | Verdoracine | 0.04460000 |
| 52. | 6784-13-0 | 3-Cyclohexene-1-propanal, β,4-dimethyl- | Limonenal | 0.04380000 |
| 53. | 8000-41-7 | 2-(4-methyl-1-cyclohex-3-enyl)propan-2-ol | Alpha Terpineol | 0.04320000 |
| 54. | 41884-28-0 | 1-Hexanol, 5-methyl-2-(1-methylethyl)-, (2R)- | Tetrahydro Lavandulol | 0.04230000 |
| 55. | 22457-23-4 | 3-Heptanone, 5-methyl-, oxime | Stemone ® | 0.04140000 |
| 56. | 104-50-7 | 2(3H)-Furanone, 5-butyldihydro- | Gamma Octalactone | 0.04080000 |
| 57. | 143-08-8 | 1-Nonanol | Nonyl Alcohol | 0.04070000 |
| 58. | 3613-30-7 | Octanal, 7-methoxy-3,7-dimethyl- | Methoxycitronellal | 0.04020000 |
| 59. | 67634-00-8 | Acetic acid, 2-(3-methylbutoxy)-, 2-propen-1-yl ester | Ally Amyl Glycolate | 0.04000000 |
| 60. | 464-45-9 | Bicyclo[2.2.1]heptan-2-ol, 1,7,7-trimethyl-, (1S,2R,4S)- | 1-Borneol | 0.03980000 |
| 61. | 124-76-5 | Bicyclo[2.2.1]heptan-2-ol, 1,7,7-trimethyl-, (1R,2R,4R)-rel- | 1.7.7-Trimethyl-Bicyclo-1.2.2-Heptanol-2 | 0.03980000 |
| 62. | 67874-72-0 | Cyclohexanol, 2-(1,1-dimethylpropyl)-, 1-acetate | Coniferan | 0.03980000 |
| 63. | 80-26-2 | 3-Cyclohexene-1-methanol, α,α,4-trimethyl-, 1-acetate | Terpinyl Acetate | 0.03920000 |
| 64. | 498-81-7 | Cyclohexanemethanol, α,α,4-trimethyl- | Dihydro Terpineol | 0.03920000 |
| 65. | 112-45-8 | 10-Undecenal | Undecylenic aldehyde | 0.03900000 |
| 66. | 35044-57-6 | 2,4-Cyclohexadiene-1-carboxylic acid, 2,6,6-trimethyl-, ethyl ester | Ethyl Safranate | 0.03880000 |
| 67. | 106-21-8 | 1-Octanol, 3,7-dimethyl- | Dimethyl Octanol | 0.03860000 |
| 68. | 84560-00-9 | Cyclopentanol, 2-pentyl- | Cyclopentol | 0.03790000 |
| 69. | 82461-14-1 | Furan, tetrahydro-2,4-dimethyl-4-phenyl- | Rhubafuran ® | 0.03780000 |

TABLE 3A-continued

Moderate Volatile Fragrance Materials

| No. | CAS Number | IUPAC Name | Common Name** | Vaporat Pressure (Torr at 25° C.)* |
|---|---|---|---|---|
| 70. | 56011-02-0 | Benzene, [2-(3-methylbutoxy)ethyl]- | Phenyl Ethyl Isoamyl Ether | 0.03690000 |
| 71. | 103-37-7 | Butanoic acid, phenylmethyl ester | Benzyl Butyrate | 0.03660000 |
| 72. | 6378-65-0 | Hexyl hexanoate | Hexyl hexanoate | 0.03490000 |
| 73. | 118-61-6 | Benzoic acid, 2-hydroxy-, ethyl ester | Ethyl salicylate | 0.03480000 |
| 74. | 98-52-2 | Cyclohexanol, 4-(1,1-dimethylethyl)- | Patchon | 0.03480000 |
| 75. | 115-99-1 | 1,6-Octadien-3-ol, 3,7-dimethyl-, 3-formate | Linalyl Formate | 0.03440000 |
| 76. | 112-54-9 | Dodecanal | Lauric Aldehyde | 0.03440000 |
| 77. | 53046-97-2 | 3,6-Nonadien-1-ol, (3Z,6Z)- | 3,6-Nonadien-1-ol | 0.03360000 |
| 78. | 76649-25-7 | 3,6-Nonadien-1-ol | 3,6-Nonadien-1-ol | 0.03360000 |
| 79. | 141-25-3 | 3,7-Dimethyloct-6-en-1-ol | Rhodinol | 0.03290000 |
| 80. | 1975-78-6 | Decanenitrile | Decanonitrile | 0.03250000 |
| 81. | 2216-51-5 | Cyclohexanol, 5-methyl-2-(1-methylethyl)-, (1R,2S,5R)- | L-Menthol | 0.03230000 |
| 82. | 3658-77-3 | 4-hydroxy-2,5-dimethylfuran-3-one | Pineapple Ketone | 0.03200000 |
| 83. | 103-93-5 | Propanoic acid, 2-methyl-, 4-methylphenyl ester | Para Cresyl iso-Butyrate | 0.03120000 |
| 84. | 24717-86-0 | Propanoic acid, 2-methyl-, (1R,2S,4R)-1,7,7-trimethylbicyclo[2.2.1]hept-2-yl ester, rel- | Abierate | 0.03110000 |
| 85. | 67845-46-9 | Acetaldehyde, 2-(4-methylphenoxy)- | Aldehyde XI | 0.03090000 |
| 86. | 67883-79-8 | 2-Butenoic acid, 2-methyl-, (3Z)-3-hexen-1-yl ester, (2E)- | Cis-3-Hexenyl Tiglate | 0.03060000 |
| 87. | 33885-51-7 | Bicyclo[3.1.1]hept-2-ene-2-propanal, 6,6-dimethyl- | Pino Acetaldehyde | 0.03040000 |
| 88. | 105-85-1 | 6-Octen-1-ol, 3,7-dimethyl-, 1-formate | Citronellyl Formate | 0.03000000 |
| 89. | 70214-77-6 | 2-Nonanol, 6,8-dimethyl- | Nonadyl | 0.03010000 |
| 90. | 215231-33-7 | Cyclohexanol, 1-methyl-3-(2-methylpropyl)- | Rossitol | 0.02990000 |
| 91. | 120-72-9 | 1H-Indole | Indole | 0.02980000 |
| 92. | 2463-77-6 | 2-Undecenal | 2-Undecene-1-al | 0.02970000 |
| 93. | 675-09-2 | 2H-Pyran-2-one, 4,6-dimethyl- | Levistamel | 0.02940000 |
| 94. | 98-55-5 | 3-Cyclohexene-1-methanol, α,α,4-trimethyl- | Alpha-Terpineol | 0.02830000 |
| 95. | 81786-73-4 | 3-Hepten-2-one, 3,4,5,6,6-pentamethyl-, (3Z- | Koavone | 0.02750000 |
| 96. | 122-97-4 | Benzenepropanol | Phenyl Propyl Alcohol | 0.02710000 |
| 97. | 39212-23-2 | 2(3H)-Furanone, 5-butyldihydro-4-methyl- | Methyl Octalactone | 0.02700000 |
| 98. | 53767-93-4 | 7-Octen-2-ol, 2,6-dimethyl-, 2-acetate | Dihydro Terpinyl Acetate | 0.02690000 |
| 99. | 35044-59-8 | 1,3-Cyclohexadiene-1-carboxylic acid, 2,6,6-trimethyl-, ethyl ester | Ethyl Safranate | 0.02660000 |
| 100. | 104-55-2 | 2-Propenal, 3-phenyl- | Cinnamic Aldehyde | 0.02650000 |
| 101. | 144-39-8 | 1,6-Octadien-3-ol, 3,7-dimethyl-, 3-propanoate | Linalyl Propionate | 0.02630000 |

TABLE 3A-continued

Moderate Volatile Fragrance Materials

| No. | CAS Number | IUPAC Name | Common Name** | Vaporat Pressure (Torr at 25° C.)* |
|---|---|---|---|---|
| 102. | 61931-80-4 | 1,6-Nonadien-3-ol, 3,7-dimethyl-, 3-acetate | 3,7-Dimethyl-1,6-nonadien-3-yl acetate | 0.02630000 |
| 103. | 102-13-6 | Benzeneacetic acid, 2-methylpropyl ester | Iso Butyl Phenylacetate | 0.02630000 |
| 104. | 65443-14-3 | Cyclopentanone, 2,2,5-trimethyl-5-pentyl- | Veloutone | 0.02610000 |
| 105. | 141-12-8 | 2,6-Octadien-1-ol, 3,7-dimethyl-, 1-acetate, (2Z)- | Neryl Acetate | 0.02560000 |
| 106. | 105-87-3 | 2,6-Octadien-1-ol, 3,7-dimethyl-, 1-acetate, (2E)- | Geranyl acetate | 0.02560000 |
| 107. | 68141-17-3 | Undecane, 1,1-dimethoxy-2-methyl- | Methyl Nonyl Acetaldehyde Dimethyl Acetal | 0.02550000 |
| 108. | 2206-94-2 | Benzenemethanol, α-methylene-, 1-acetate | Indocolore | 0.02550000 |
| 109. | 10528-67-3 | Cyclohexanepropanol, α-methyl- | Cyclohexylmagnol | 0.02550000 |
| 110. | 123-11-5 | Benzaldehyde, 4-methoxy- | Anisic Aldehyde | 0.02490000 |
| 111. | 57576-09-7 | Cyclohexanol, 5-methyl-2-(1-methylethenyl)-, 1-acetate, (1R,2S,5R)- | Iso Pulegol Acetate | 0.02480000 |
| 112. | 51566-62-2 | 6-Octenenitrile, 3,7-dimethyl- | Citronellyl Nitrile | 0.02470000 |
| 113. | 60335-71-9 | 2H-Pyran, 3,6-dihydro-4-methyl-2-phenyl- | Rosyrane Super | 0.02470000 |
| 114. | 30385-25-2 | 6-Octen-2-ol, 2,6-dimethyl- | Dihydromyrcenol | 0.02440000 |
| 115. | 101-84-8 | Benzene, 1,1'-oxybis- | Diphenyl Oxide | 0.02230000 |
| 116. | 136-60-7 | Benzoic acid, butyl ester | Butyl Benzoate | 0.02170000 |
| 117. | 93939-86-7 | 5,8-Methano-2H-1-benzopyran, 6-ethylideneoctahydro- | Rhuboflor | 0.02120000 |
| 118. | 83926-73-2 | Cyclohexanepropanol, α,α-dimethyl- | Coranol | 0.02100000 |
| 119. | 125109-85-5 | Benzenepropanal, β-methyl-3-(1-methylethyl)- | Florhydral | 0.02070000 |
| 120. | 104-21-2 | Benzenemethanol, 4-methoxy-, 1-acetate | Anisyl Acetate | 0.02050000 |
| 121. | 1365-19-1 | 2-Furanmethanol, 5-ethenyltetrahydro-α,α,5-trimethyl- | Linalool Oxide | 0.02050000 |
| 122. | 137-03-1 | Cyclopentanone, 2-heptyl- | Frutalone | 0.02040000 |
| 123. | 2563-07-7 | Phenol, 2-ethoxy-4-methyl- | Ultravanil | 0.02030000 |
| 124. | 1128-08-1 | 2-Cyclopenten-1-one, 3-methyl-2-pentyl- | Dihydrojasmone | 0.02020000 |
| 125. | 7493-57-4 | Benzene, [2-(1-propoxyethoxy)ethyl]- | Acetaldehyde | 0.01990000 |
| 126. | 141-25-3 | 7-Octen-1-ol, 3,7-dimethyl- | Rhodinol | 0.01970000 |
| 127. | 216970-21-7 | Bicyclo[4.3.1]decane, 3-methoxy-7,7-dimethyl-10-methylene- | 3-Methoxy-7,7-dimethyl-10-methylenebicyclo[4.3.1.]decane | 0.01960000 |
| 128. | 319002-92-1 | Propanoic acid, 2-(1,1-dimethylpropoxy)-, propyl ester, (2S)- | Sclareolate ® | 0.01960000 |
| 129. | 85-91-6 | Benzoic acid, 2-(methylamino)-, methyl | Dimethyl anthranilate | 0.01930000 |

TABLE 3A-continued

Moderate Volatile Fragrance Materials

| No. | CAS Number | IUPAC Name | Common Name** | Vaporat Pressure (Torr at 25° C.)* |
|---|---|---|---|---|
| 130. | 13828-37-0 | Cyclohexanemethanol, 4-(1-methylethyl)-, cis- | Mayol | 0.01920000 |
| 131. | 26330-65-4 | (E)-6-ethyl-3-methyloct-6-en-1-ol | Super Muguet | 0.01850000 |
| 132. | 7540-51-4 | 6-Octen-1-ol, 3,7-dimethyl-, (3S)- | L-Citronellol | 0.01830000 |
| 133. | 106-22-9 | 6-Octen-1-ol, 3,7-dimethyl- | Citronellol | 0.01830000 |
| 134. | 543-39-5 | 7-Octen-2-ol, 2-methyl-6-methylene- | Myrcenol | 0.01820000 |
| 135. | 7775-00-0 | Benzenepropanal, 4-(1-methylethyl)- | Cyclemax | 0.01820000 |
| 136. | 18479-54-4 | 4,6-Octadien-3-ol, 3,7-dimethyl- | Muguol | 0.01800000 |
| 137. | 29214-60-6 | Octanoic acid, 2-acetyl-, ethyl ester | Gelsone | 0.01790000 |
| 138. | 1209-61-6 | 5-Oxatricyclo[8.2.0.04,6]dodecane, 4,9,12,12-tetramethyl- | Tobacarol | 0.01730000 |
| 139. | 57934-97-1 | 2-Cyclohexene-1-carboxylic acid, 2-ethyl-6,6-dimethyl-, ethyl ester | Givescone | 0.01710000 |
| 140. | 14901-07-6 | 3-Buten-2-one, 4-(2,6,6-trimethyl-1-cyclohexen-1-yl)-, (3E)- | Beta-Ionone | 0.01690000 |
| 141. | 64001-15-6 | 4,7-Methano-1H-inden-5-ol, octahydro-, 5-acetate | Dihydro Cyclacet | 0.01630000 |
| 142. | 95-41-0 | 2-Cyclopenten-1-one, 2-hexyl- | Iso Jasmone T | 0.01600000 |
| 143. | 134-20-3 | Benzoic acid, 2-amino-, methyl ester | Methyl Anthranilate | 0.01580000 |
| 144. | 100-06-1 | Ethanone, 1-(4-methoxyphenyl)- | Para Methoxy Acetophenone | 0.01550000 |
| 145. | 105-86-2 | 2,6-Octadien-1-ol, 3,7-dimethyl-, 1-formate, (2E)- | Geranyl Formate | 0.01540000 |
| 146. | 154171-77-4 | Spiro[1,3-dioxolane-2,8'(5'H)-[2H-2,4a]methanonaphthalene], hexahydro-1',1',5',5'-tetramethyl, (2'S,4'aS,8'aS)-(9CI) | Ysamber K ® | 0.01470000 |
| 147. | 154171-76-3 | Spiro[1,3-dioxolane-2,8'(5'H)-[2H-2,4a]methanonaphthalene], | Ysamber | 0.01470000 |
| 148. | 127-41-3 | 3-Buten-2-one, 4-(2,6,6-trimethyl-2-cyclohexen-1-yl)-, (3E)- | Alpha-Ionone | 0.01440000 |
| 149. | 151-05-3 | Benzeneethanol, α,α-dimethyl-, 1-acetate | Dimethyl Benzyl Carbinyl Acetate | 0.01390000 |
| 150. | 2500-83-6 | 4,7-Methano-1H-inden-5-ol, 3a,4,5,6,7,7a-hexahydro-, 5-acetate | Flor Acetate | 0.01370000 |
| 151. | 150-84-5 | 6-Octen-1-ol, 3,7-dimethyl-, 1-acetate | Citronellyl acetate | 0.01370000 |
| 152. | 30310-41-9 | 2H-Pyran, tetrahydro-2-methyl-4-methylene-6-phenyl- | Pelargene | 0.01350000 |
| 153. | 68845-00-1 | Bicyclo[3.3.1]nonane, 2-ethoxy-2,6,6-trimethyl-9-methylene- | Boisiris | 0.01350000 |

TABLE 3A-continued

Moderate Volatile Fragrance Materials

| No. | CAS Number | IUPAC Name | Common Name** | Vaporat Pressure (Torr at 25° C.)* |
|---|---|---|---|---|
| 154. | 106-24-1 | 2,6-Octadien-1-ol, 3,7-dimethyl-, (2E)- | Geraniol | 0.01330000 |
| 155. | 106-25-2 | 2,6-Octadien-1-ol, 3,7-dimethyl-, (2Z)- | Nerol | 0.01330000 |
| 156. | 75975-83-6 | Bicyclo[7.2.0]undec-4-ene, 4,11,11-trimethyl-8-methylene-, (1R,4E,9S)- | Vetyvenal | 0.01280000 |
| 157. | 19870-74-7 | 1H-3a,7-Methanoazulene, octahydro-6-methoxy-3,6,8,8-tetramethyl-, (3R,3aS,6S,7R,8aS)- | Cedryl methyl ether | 0.01280000 |
| 158. | 87-44-5 | Bicyclo[7.2.0]undec-4-ene, 4,11,11-trimethyl-8-methylene-, (1R,4E,9S)- | Caryophyllene Extra | 0.01280000 |
| 159. | 54440-17-4 | 1H-Inden-1-one, 2,3-dihydro-2,3,3-trimethyl- | Safraleine | 0.01260000 |
| 160. | 110-98-5 | 2-Propanol, 1,1'-oxybis- | Dipropylene Glycol | 0.01250000 |
| 161. | 41890-92-0 | 2-Octanol, 7-methoxy-3,7-dimethyl- | Osyrol ® | 0.01250000 |
| 162. | 71077-31-1 | 4,9-Decadienal, 4,8-dimethyl- | Floral Super | 0.01230000 |
| 163. | 65-85-0 | Benzoic Acid | Benzoic Acid | 0.01220000 |
| 164. | 61444-38-0 | 3-Hexenoic acid, (3Z)-3-hexen-1-yl ester, (3Z)- | cis-3-hexenyl-cis-3-hexenoate | 0.01220000 |
| 165. | 116044-44-1 | Bicyclo[2.2.1]hept-5-ene-2-carboxylic acid, 3-(1- | Herbanate | 0.01210000 |
| 166. | 104-54-1 | 2-Propen-1-ol, 3-phenyl- | Cinnamic Alcohol | 0.01170000 |
| 167. | 78-35-3 | Propanoic acid, 2-methyl-, 1-ethenyl-1,5-dimethyl-4-hexen-1-yl ester | Linalyl Isobutyrate | 0.01170000 |
| 168. | 23495-12-7 | Ethanol, 2-phenoxy-, 1-propanoate | Phenoxy Ethyl Propionate | 0.01300000 |
| 169. | 103-26-4 | 2-Propenoic acid, 3-phenyl-, methyl ester | Methyl Cinnamate | 0.01120000 |
| 170. | 67634-14-4 | Benzenepropanal, 2-ethyl-α,α-dimethyl- | Florazon (ortho-isomer) | 0.01110000 |
| 171. | 5454-19-3 | Propanoic acid, decyl ester | N-Decyl Propionate | 0.01100000 |
| 172. | 93-16-3 | Benzene, 1,2-dimethoxy-4-(1-propen-1-yl)- | Methyl Iso Eugenol | 0.01100000 |
| 173. | 81782-77-6 | 3-Decen-5-ol, 4-methyl- | 4-Methyl-3-decen-5-ol | 0.01070000 |
| 174. | 67845-30-1 | Bicyclo[2.2.2]oct-5-ene-2-carboxaldehyde, 6-methyl-8-(1-methylethyl)- | Maceal | 0.01060000 |
| 175. | 97-53-0 | Phenol, 2-methoxy-4-(2-propen-1-yl)- | Eugenol | 0.01040000 |
| 176. | 120-57-0 | 1,3-Benzodioxole-5-carboxaldehyde | Heliotropin | 0.01040000 |
| 177. | 93-04-9 | Naphthalene, 2-methoxy- | Beta Naphthyl Methyl Ether Extra 99 | 0.01040000 |
| 178. | 4826-62-4 | 2-Dodecenal | 2 Dodecene-1-al | 0.01020000 |
| 179. | 20407-84-5 | 2-Dodecenal, (2E)- | Aldehyde Mandarin | 0.01020000 |

TABLE 3A-continued

Moderate Volatile Fragrance Materials

| No. | CAS Number | IUPAC Name | Common Name** | Vaporat Pressure (Torr at 25° C.)* |
|---|---|---|---|---|
| 180. | 5462-06-6 | Benzenepropanal, 4-methoxy-α-methyl- | Canthoxal | 0.01020000 |
| 181. | 94-60-0 | 1,4-Cyclohexanedicarboxylic acid, 1,4-dimethyl ester | Dimethyl 1,4-cyclohexanedicarboxylate | 0.01020000 |
| 182. | 57378-68-4 | 2-Buten-1-one, 1-(2,6,6-trimethyl-3-cyclohexen-1-yl)- | delta-Damascone | 0.01020000 |
| 183. | 17283-81-7 | 2-Butanone, 4-(2,6,6-trimethyl-1-cyclohexen-1-yl)- | Dihydro Beta Ionone | 0.01020000 |
| 184. | 1885-38-7 | 2-Propenenitrile, 3-phenyl-, (2E)- | Cinnamalva | 0.01010000 |
| 185. | 103-48-0 | Propanoic acid, 2-methyl-, 2-phenylethyl ester | Phenyl Ethyl Iso Butyrate | 0.00994000 |
| 186. | 488-10-8 | 2-Cyclopenten-1-one, 3-methyl-2-(2Z)-2-penten-1-yl- | Cis Jasmone | 0.00982000 |
| 187. | 7492-67-3 | Acetaldehyde, 2-[(3,7-dimethyl-6-octen-1-yl)oxy]- | Citronellyloxy-acetaldehyde | 0.00967000 |
| 188. | 68683-20-5 | 1-Cyclohexene-1-ethanol, 4-(1-methylethyl)-, 1-formate | Iso Bergamate | 0.00965000 |
| 189. | 3025-30-7 | 2,4-Decadienoic acid, ethyl ester, (2E,4Z)- | Ethyl 2,4-Decadienoate | 0.00954000 |
| 190. | 103-54-8 | 2-Propen-1-ol, 3-phenyl-, 1-acetate | Cinnamyl Acetate | 0.00940000 |
| 191. | 18127-01-0 | Benzenepropanal, 4-(1,1-dimethylethyl)- | Bourgeonal | 0.00934000 |
| 192. | 3738-00-9 | Naphtho[2,1-b]furan, dodecahydro-3a,6,6,9a-tetramethyl- | Ambrox ® or Cetalox ® or Synambran | 0.00934000 |
| 193. | 51519-65-4 | 1,4-Methanonaphthalen-5(1H)-one, 4,4a,7,8,8a-hexahydro- | Tamisone | 0.00932000 |
| 194. | 148-05-1 | Dodecanoic acid, 12-hydroxy-, λ-lactone (6CI,7CI); 1,12- | Dodecalactone | 0.00931000 |
| 195. | 6790-58-5 | (3aR,5aS,9aS,9bR)-3a,6,6,9a-tetramethyl-2,4,5,5a,7,8,9,9b-octahydro-1H-benzo[e][1]benzofuran | Ambronat ® or Ambroxan ® | 0.00930000 |
| 196. | 86-26-0 | 1,1'-Biphenyl, 2-methoxy- | Methyl Diphenyl Ether | 0.00928000 |
| 197. | 68738-94-3 | 2-Naphthalenecarbox-aldehyde, octahydro-8,8-dimethyl | Cyclomyral ® | 0.00920000 |
| 198. | 2705-87-5 | Cyclohexanepropanoic acid, 2-propen-1-yl ester | Allyl Cyclohexane Propionate | 0.00925000 |
| 199. | 7011-83-8 | 2(3H)-Furanone, 5-hexyldihydro-5-methyl- | Lactojasmone ® | 0.00885000 |
| 200. | 61792-11-8 | 2,6-Nonadienenitrile, 3,7-dimethyl- | Lemonile ® | 0.00884000 |
| 201. | 692-86-4 | 10-Undecenoic acid, ethyl ester | Ethyl Undecylenate | 0.00882000 |

TABLE 3A-continued

Moderate Volatile Fragrance Materials

| No. | CAS Number | IUPAC Name | Common Name** | Vaporat Pressure (Torr at 25° C.)* |
|---|---|---|---|---|
| 202. | 103-95-7 | Benzenepropanal, α-methyl-4-(1-methylethyl)- | Cymal | 0.00881000 |
| 203. | 13019-22-2 | 9-Decen-1-ol | Rosalva | 0.00879000 |
| 204. | 94201-19-1 | 1-Oxaspiro[4.5]decan-2-one, 8-methyl- | Methyl Laitone 10% TEC | 0.00872000 |
| 205. | 104-61-0 | 2(3H)-Furanone, dihydro-5-pentyl- | γ-Nonalactone | 0.00858000 |
| 206. | 706-14-9 | 2(3H)-Furanone, 5-hexyldihydro- | γ-Decalactone | 0.00852000 |
| 207. | 24720-09-0 | 2-Buten-1-one, 1-(2,6,6-trimethyl-2-cyclohexen-1-yl)-, (2E)- | α-Damascone | 0.00830000 |
| 208. | 39872-57-6 | 2-Buten-1-one, 1-(2,4,4-trimethyl-2-cyclohexen-1-yl)-, (2E)- | Isodamascone | 0.00830000 |
| 209. | 705-86-2 | 2H-Pyran-2-one, tetrahydro-6-pentyl- | Decalactone | 0.00825000 |
| 210. | 67634-15-5 | Benzenepropanal, 4-ethyl-α,α-dimethyl - | Floralozone | 0.00808000 |
| 211. | 40527-42-2 | 1,3-Benzodioxole, 5-(diethoxymethyl)- | Heliotropin Diethyl Acetal | 0.00796000 |
| 212. | 56973-85-4 | 4-Penten-1-one, 1-(5,5-dimethyl-1-cyclohexen-1-yl) | Neobutenone α | 0.00763000 |
| 213. | 128-51-8 | Bicyclo[3.1.1]hept-2-ene-2-ethanol, 6,6-dimethyl-, 2-acetate | Nopyl Acetate | 0.00751000 |
| 214. | 103-36-6 | 2-Propenoic acid, 3-phenyl-, ethyl ester | Ethyl Cinnamate | 0.00729000 |
| 215. | 5182-36-5 | 1,3-Dioxane, 2,4,6-trimethyl-4-phenyl- | Floropal ® | 0.00709000 |
| 216. | 42604-12-6 | Cyclododecane, (methoxymethoxy)- | Boisambrene | 0.00686000 |
| 217. | 33885-52-8 | Bicyclo[3.1,1]hept-2-ene-2-propanal, α,α,6,6-tetramethyl- | Pinyl Iso Butyrate Alpha | 0.00685000 |
| 218. | 92015-65-1 | 2(3H)-Benzofuranone, hexahydro-3,6-dimethyl- | Natactone | 0.00680000 |
| 219. | 63767-86-2 | Cyclohexanemethanol α-methyl-4-(1-methylethyl)- | Mugetanol | 0.00678000 |
| 220. | 3288-99-1 | Benzeneacetonitrille, 4-(1,1-dimethylethyl)- | Marenil CI | 0.00665000 |
| 221. | 35044-68-9 | 2-Buten-1-one, 1-(2,6,6-trimethyl-1-cyclohexen-1-yl)- | beta-Damascone | 0.00655000 |
| 222. | 41724-19-0 | 1,4-Methanonaphthalen-6(2H)-one, octahydro-7-methyl | Plicatone | 0.00652000 |
| 223. | 75147-23-8 | Bicyclo[3.2,1]octan-8-one, 1,5-dimethyl-, oxime | Buccoxime ® | 0.00647000 |
| 224. | 25634-93-9 | 2-Methyl-5-phenylpentan-1-ol | Rosaphen ® 600064 | 0.00637000 |
| 225. | 55066-48-3 | 3-Methyl-5-phenylpentanol | Phenyl Hexanol | 0.00637000 |
| 226. | 495-62-5 | Cyclohexene, 4-(1,5-dimethyl-4-hexen-1-ylidene)-1-methyl- | Bisabolene | 0.00630000 |
| 227. | 2785-87-7 | Phenol, 2-methoxy-4-propyl- | Dihydro Eugenol | 0.00624000 |
| 228. | 87-19-4 | Benzoic acid, 2-hydroxy-, 2-methylpropyl ester | Iso Butyl Salicylate | 0.00613000 |
| 229. | 4430-31-3 | 2H-1-Benzopyran-2-one, octahydro- | Octahydro Coumarin | 0.00586000 |

TABLE 3A-continued

| | | Moderate Volatile Fragrance Materials | | |
|---|---|---|---|---|
| No. | CAS Number | IUPAC Name | Common Name** | Vaporat Pressure (Torr at 25° C.)* |
| 230. | 38462-22-5 | Cyclohexanone, 2-(1-mercapto-1-methylethyl)-5-methyl- | Ringonol 50 TEC | 0.00585000 |
| 231. | 77-83-8 | 2-Oxiranecarboxylic acid, 3-methyl-3-phenyl-, ethyl ester | Ethyl Methyl Phenyl Glycidate | 0.00571000 |
| 232. | 37677-14-8 | 3-Cyclohexene-1-carboxaldehyde, 4-(4-methyl-3-penten-1-yl)- | Iso Hexenyl Cyclohexenyl Carboxaldehyde | 0.00565000 |
| 233. | 103-60-6 | Propanoic acid, 2-methyl-, 2-phenoxyethyl ester | Phenoxy Ethyl iso-Butyrate | 0.00562000 |
| 234. | 18096-62-3 | Indeno[1,2-d]-1,3-dioxin, 4,4a,5,9b-tetrahydro- | Indoflor ® | 0.00557000 |
| 235. | 63500-71-0 | 2H-Pyran-4-ol, tetrahydro-4-methyl-2-(2-methylpropyl)- | Florosa Q/Florol | 0.00557000 |
| 236. | 65405-84-7 | Cyclohexanebutanal, α,2,6,6-tetramethyl- | Cetonal ® | 0.00533000 |
| 237. | 171102-41-3 | 4,7-Methano-1H-inden-6-ol, 3a,4,5,6,7,7a-hexahydro-8,8-dimethyl-, 6-acetate | Flor Acetate | 0.00530000 |
| 238. | 10339-55-6 | 1,6-Nonadien-3-ol, 3,7-dimethyl- | Ethyl linalool | 0.00520000 |
| 239. | 23267-57-4 | 3-Buten-2-one, 4-(2,2,6-trimethyl-7-oxabicyclo[4.1.0]hept-1-yl)- | Ionone Epoxide Beta | 0.00520000 |
| 240. | 97-54-1 | Phenol, 2-methoxy-4-(1-propen-1-yl)- | Isoeugenol | 0.00519000 |
| 241. | 67663-01-8 | 2(3H)-Furanone, 5-hexyldihydro-4-methyl- | Peacholide | 0.00512000 |
| 242. | 33885-52-8 | Bicyclo[3.1.1]hept-2-ene-2-propanal, α,α,6,6-tetramethyl- | Pinyl Iso Butyrate Alpha | 0.00512000 |
| 243. | 23696-85-7 | 2-Buten-1-one, 1-(2,6,6-trimethyl-1,3-cyclohexadien-1-yl)- | Damascenone | 0.00503000 |
| 244. | 80-71-7 | 2-Cyclopenten-1-one, 2-hydroxy-3-methyl- | Maple Lactone | 0.00484000 |
| 245. | 67662-96-8 | Propanoic acid, 2,2-dimethyl-, 2-phenylethyl ester | Pivarose Q | 0.00484000 |
| 246. | 2437-25-4 | Dodecanenitrile | Clonal | 0.00480000 |
| 247. | 141-14-0 | 6-Octen-1-ol, 3,7-dimethyl-, 1-propanoate | Citronellyl Propionate | 0.00469000 |
| 248. | 54992-90-4 | 3-Buten-2-one, 4-(2,2,3,6-tetramethylcyclohexyl)- | Myrrhone | 0.00460000 |
| 249. | 55066-49-4 | Benzenepentanal, β-methyl- | Mefranal | 0.00455000 |
| 250. | 7493-74-5 | Acetic acid, 2-phenoxy-, 2-propen-1-yl ester | Allyl Phenoxy Acetate | 0.00454000 |
| 251. | 80-54-6 | Benzenepropanal, 4-(1,1-dimethylethyl)-α-methyl- | Lilial ® | 0.00444000 |
| 252. | 86803-90-9 | 4,7-Methano-1H-indene-2-carboxaldehyde, octahydro-5-methoxy- | Scentenal ® | 0.00439000 |
| 253. | 68991-97-9 | 2-Naphthalenecarboxaldehyde, 1,2,3,4,5,6,7,8-octahydro-8,8-dimethyl- | Melafleur | 0.00436000 |

TABLE 3A-continued

Moderate Volatile Fragrance Materials

| No. | CAS Number | IUPAC Name | Common Name** | Vaporat Pressure (Torr at 25° C.)* |
|---|---|---|---|---|
| 254. | 18871-14-2 | Pentitol, 1,5-anhydro-2,4-dideoxy-2-pentyl-, 3-acetate | Jasmal | 0.00434000 |
| 255. | 58567-11-6 | Cyclododecane, (ethoxymethoxy)- | Boisambren Forte | 0.00433000 |
| 256. | 94400-98-3 | Naphth[2,3-b]oxirene, 1a,2,3,4,5,6,7,7a-octahydro-1a,3,3,4,6,6-hexamethyl-, (1aR,4S,7aS)-rel- | Molaxone | 0.00425000 |
| 257. | 79-69-6 | 3-Buten-2-one, 4-(2,5,6,6-tetramethyl-2-cyclohexen-1-yl)- | alpha-Irone | 0.00419000 |
| 258. | 65442-31-1 | Quinoline, 6-(1-methylpropyl)- | Iso Butyl Quinoline | 0.00408000 |
| 259. | 87731-18-8 | Carbonic acid, 4-cycloocten-1-yl methyl ester | Violiff | 0.00401000 |
| 260. | 173445-65-3 | 1H-Indene-5-propanal, 2,3-dihydro-3,3-dimethyl- | Hivernal (A-isomer) | 0.00392000 |
| 261. | 23911-56-0 | Ethanone, 1-(3-methyl-2-benzofuranyl)- | Nerolione | 0.00383000 |
| 262. | 52474-60-9 | 3-Cyclohexene-1-carboxaldehyde, 1-methyl-3-(4-methyl-3-penten-1-yl)- | Precyclemone B | 0.00381000 |
| 263. | 139539-66-5 | 6-Oxabicyclo[3.2.1]octane, 5-methyl-1-(2,2,3-trimethyl-3-cyclopenten-1-yl)- | Cassifix | 0.00381000 |
| 264. | 80858-47-5 | Benzene, [2-(cyclohexyloxy)ethyl]- | Phenafleur | 0.00380000 |
| 265. | 32764-98-0 | 2H-Pyran-2-one, tetrahydro-6-(3-penten-1-yl)- | Jasmolactone | 0.00355000 |
| 266. | 78417-28-4 | 2,4,7-Decatrienoic acid, ethyl ester | Ethyl 2,4,7-decatrienoate | 0.00353000 |
| 267. | 140-26-1 | Butanoic acid, 3-methyl-, 2-phenylethyl ester | Beta Phenyl Ethyl Isovalerate | 0.00347000 |
| 268. | 105-90-8 | 2,6-Octadien-1-ol, 3,7-dimethyl-, 1-propanoate, (2E)- | Geranyl Propionate | 0.003360000 |
| 269. | 41816-03-9 | Spiro[1,4-methanonaphthalene-2(1H),2'-oxirane], 3,4,4a,5,8,8a-hexahydro-3',7-dimethyl- | Rhubofix ® | 0.00332000 |
| 270. | 7070-15-7 | Ethanol, 2-[[(1R,2R,4R)-1,7,7-trimethylbicyclo[2.2.1]hept-2-yl]oxy]-, rel- | Arbanol | 0.00326000 |
| 271. | 93-29-8 | Phenol, 2-methoxy-4-(1-propen-1-yl)-, 1-acetate | Iso Eugenol Acetate | 0.00324000 |
| 272. | 476332-65-7 | 2H-Indeno[4,5-b]furan, decahydro-2,2,6,6,7,8,8-heptamethyl- | Amber Xtreme Compound 1 | 0.00323000 |
| 273. | 68901-15-5 | Acetic acid, 2-(cyclohexyloxy)-, 2-propen-1-yl ester | Cyclogalbanate | 0.00323000 |

TABLE 3A-continued

Moderate Volatile Fragrance Materials

| No. | CAS Number | IUPAC Name | Common Name** | Vaporat Pressure (Torr at 25° C.)* |
|---|---|---|---|---|
| 274. | 107-75-5 | Octanal, 7-hydroxy-3,7-dimethyl- | Hydroxycitronellal | 0.00318000 |
| 275. | 68611-23-4 | Naphtho[2,1-b]furan, 9b-ethyldodecahydro-3a,7,7-trimethyl- | Grisalva | 0.00305000 |
| 276. | 313973-37-4 | 1,6-Heptadien-3-one, 2-cyclohexyl- | Pharaone | 0.00298000 |
| 277. | 137-00-8 | 5-Thiazoleethanol, 4-methyl- | Sulfurol | 0.00297000 |
| 278. | 7779-30-8 | 1-Penten-3-one, 1-(2,6,6-trimethyl-2-cyclohexen-1-yl)- | Methyl Ionone | 0.00286000 |
| 279. | 127-51-5 | 3-Buten-2-one, 3-methyl-4-(2,6,6-trimethyl-2-cyclohexen-1-yl)- | Isoraldeine Pure | 0.00282000 |
| 280. | 72903-27-6 | 1,4-Cyclohexanedicarboxylic acid, 1,4-diethyl ester | Fructalate ™ | 0.00274000 |
| 281. | 7388-22-9 | 3-Buten-2-one, 4-(2,2-dimethyl-6-methylenecyclohexyl)-3-methyl- | Ionone Gamma Methyl | 0.00272000 |
| 282. | 104-67-6 | 2(3H)-Furanone, 5-heptyldihydro- | gamma-Undecalactone (racemic) | 0.00271000 |
| 283. | 1205-17-0 | 1,3-Benzodioxole-5-propanal, α-methyl- | Helional | 0.00270000 |
| 284. | 33704-61-9 | 4H-Inden-4-one, 1,2,3,5,6,7-hexahydro-1,1,2,3,3-pentamethyl- | Cashmeran | 0.00269000 |
| 285. | 36306-87-3 | Cyclohexanone, 4-(1-ethoxyethenyl)-3,3,5,5-tetramethyl- | Kephalis | 0.00269000 |
| 286. | 97384-48-0 | Benzenepropanenitrile, α-ethenyl-α-methyl- | Citrowanil ® B | 0.00265000 |
| 287. | 141-13-9 | 9-Undecenal, 2,6,10-trimethyl- | Adoxal | 0.00257000 |
| 288. | 2110-18-1 | Pyridine, 2-(3-phenylpropyl)- | Corps Racine VS | 0.00257000 |
| 289. | 27606-09-3 | Indeno[1,2-d]-1,3-dioxin, 4,4a,5,9b-tetrahydro-2,4-dimethyl- | Magnolan | 0.00251000 |
| 290. | 67634-20-2 | Propanoic acid, 2-methyl-, 3a,4,5,6,7,7a-hexahydro-4,7-methano-1H-inden-5-yl ester | Cyclabute | 0.00244000 |
| 291. | 65405-72-3 | 1-Naphthalenol, 1,2,3,4,4a,7,8,8a-octahydro-2,4a,5,8a-tetramethyl-, 1-formate | Oxyoctaline Formate | 0.00236000 |
| 292. | 122-40-7 | Heptanal, 2-(phenylmethylene)- | Amyl Cinnamic Aldehyde | 0.00233000 |
| 293. | 103694-68-4 | Benzenepropanol, β,β,3-trimethyl- | Majantol ® | 0.00224000 |
| 294. | 13215-88-8 | 2-Cyclohexene-1-one, 4-(2-buten-1-ylidene)-3,5,5-trimethyl- | Tabanone Coeur | 0.00223000 |
| 295. | 25152-85-6 | 3-Hexen-1-ol, 1-benzoate, (3Z)- | Cis-3-Hexenyl Benzoate | 0.00203000 |
| 296. | 406488-30-0 | 2-Ethyl-N-methyl-N-(m-tolyl)butanamide | Paradisamide | 0.00200000 |

TABLE 3A-continued

Moderate Volatile Fragrance Materials

| No. | CAS Number | IUPAC Name | Common Name** | Vaporat Pressure (Torr at 25° C.)* |
|---|---|---|---|---|
| 297. | 121-33-5 | Benzaldehyde, 4-hydroxy-3-methoxy- | Vanillin | 0.00194000 |
| 298. | 77-54-3 | 1H-3a,7-Methanoazulen-6-ol, octahydro-3,6,8,8-tetramethyl-, 6-acetate, (3R,3aS,6R,7R,8aS)- | Cedac | 0.00192000 |
| 299. | 76842-49-4 | 4,7-Methano-1H-inden-6-ol, 3a,4,5,6,7,7a-hexahydro-8,8-dimethyl-, 6-propanoate | Frutene | 0.00184000 |
| 300. | 121-39-1 | 2-Oxiranecarboxylic acid, 3-phenyl-, ethyl ester | Ethyl Phenyl Glycidate | 0.00184000 |
| 301. | 211299-54-6 | 4H-4a,9-Methanoazuleno[5,6-d]-1,3-dioxole, octahydro-2,2,5,8,8,9a-hexamethyl-, (4aR,5R,7aS,9R)- | Ambrocenide ® | 0.00182000 |
| 302. | 285977-85-7 | (2,5-Dimethyl-1,3-dihydroinden-2-yl)methanol | Lilyflore | 0.00180000 |
| 303. | 10094-34-5 | Butanoic acid, 1,1-dimethyl-2-phenylethyl ester | Dimethyl Benzyl Carbinyl Butyrate | 0.00168000 |
| 304. | 40785-62-4 | Cyclododeca[c]furan, 1,3,3a,4,5,6,7,8,9,10,11,13a-dodecahydro- | Muscogene | 0.00163000 |
| 305. | 75490-39-0 | Benzenebutanenitrile, α,α,γ-trimethyl- | Khusinil | 0.00162000 |
| 306. | 55418-52-5 | 2-Butanone, 4-(1,3-benzodioxol-5-yl)- | Dulcinyl | 0.00161000 |
| 307. | 3943-74-6 | Benzoic acid, 4-hydroxy-3-methoxy-, methyl ester | Carnaline | 0.00157000 |
| 308. | 72089-08-8 | 3-Cyclopentene-1-butanol, β,2,2,3-tetramethyl-2-Methyl-4-(2,2,3-trimethyl-3-cyclopenten-1-yl)butanol | Brahmanol ® | 0.00154000 |
| 309. | 3155-71-3 | 2-Butenal, 2-methyl-4-(2,6,6-trimethyl-1-cyclohexen-1-yl)- | Boronal | 0.00147000 |
| 310. | 2050-08-0 | Benzoic acid, 2-hydroxy-, pentyl ester | Amyl Salicylate | 0.00144000 |
| 311. | 41199-20-6 | 2-Naphthalenol, decahydro-2,5,5-trimethyl- | Ambrinol | 0.00140000 |
| 312. | 12262-03-2 | ndecanoic acid, 3-methylbutyl ester | Iso Amyl Undecylenate | 0.00140000 |
| 313. | 107-74-4 | 1,7-Octanediol, 3,7-dimethyl- | Hydroxyol | 0.00139000 |
| 314. | 91-64-5 | 2H-1-Benzopyran-2-one | Coumarin | 0.00130000 |
| 315. | 68901-32-6 | 1,3-Dioxolane, 2-[6-methyl-8-(1-methylethyl)bicyclo[2.2.2]oct-5-en-2-yl]- | Glycolierral | 0.00121000 |
| 316. | 68039-44-1 | Propanoic acid, 2,2-dimethyl-, 3a,4,5,6,7,7a-hexahydro-4,7-methano-1H-inden-6-yl ester | Pivacyclene | 0.00119000 |

TABLE 3A-continued

Moderate Volatile Fragrance Materials

| No. | CAS Number | IUPAC Name | Common Name** | Vaporat Pressure (Torr at 25° C.)* |
|---|---|---|---|---|
| 317. | 106-29-6 | Butanoic acid, (2E)-3,7-dimethyl-2,6-octadien-1-yl ester | Geranyl Butyrate | 0.00116000 |
| 318. | 5471-51-2 | 2-Butanone, 4-(4-hydroxyphenyl)- | Raspberry ketone | 0.00106000 |
| 319. | 109-42-2 | 10-Undecenoic acid, butyl ester | Butyl Undecylenate | 0.00104000 |
| 320. | 2785-89-9 | 4-Ethyl-2-methoxyphenol | 4-Ethylguaiacol | 0.02000000 |
| 321. | 27538-10-9 | 2-ethyl-4-hydroxy-5-methylfuran-3-one | Homofuronol | 0.01210000 |

*Vapor Pressures are acquired as described in the Test Methods Section.
**Origin: Same as for Table 2 hereinabove.

TABLE 3B

Moderate Volatile Natural Oils.

| No. | Natural oil | Supplier |
|---|---|---|
| 1. | Bay Oil Terpeneless | IFF |
| 2. | Cade Oil | H. Reynaud & Fils |
| 3. | Cedar Atlas Oil | Robertet |
| 4. | Cinnamon Bark Oil | Robertet |
| 5. | Cinnamon Oleoresin | Citrus & Allied Essences |
| 6. | Clove Bud Oil | Robertet |
| 7. | Clove Leaf Oil Rectified | H. Reynaud & Fils |
| 8. | Clove Stem Oil | H. Reynaud & Fils |
| 9. | Davana Oil | Robertet |
| 10. | Geranium Bourbon | Robertet |
| 11. | Ginger Oil Fresh Madagascar | IFF |
| 12. | Hay Absolute MD 50 PCT | IFF |
| 13. | Juniperberry Oil T'less | Robertet |
| 14. | Papyrus Oil | Robertet |
| 15. | Rose Absolute Oil | Robertet |
| 16. | Tonka Bean Absolute | Robertet |
| 17. | Wormwood Oil | Robertet |

Suppliers:
  Citrus & Allied Essences, New York, USAH. Reynaud & Fils, Montbrun-les-Bains, France IFF, Hazlet, New Jersey, USA
  Robertet, Grasse, France Moderate volatile fragrance materials can be selected from the group of Tables 3A or 3B. However, it is understood by one skilled in the art that other moderate volatile fragrance materials, not recited in Tables 3A or 3B, would also fall within the scope of the present invention, so long as they have a vapor pressure of 0.1 to 0.001 Torr at 25° C.

High Volatile Fragrance Materials

The fragrance component includes at least one high volatile fragrance material having a vapor pressure greater than 0.1 Torr (0.0133 kPa) at 25° C. In some examples, the high volatile fragrance material can include at least 2 high volatile fragrance materials, 3 high volatile fragrance materials, or at least 5 high volatile fragrance materials, or at least 7 high volatile fragrance materials. In some embodiments, the high volatile fragrance component can be in a range of from about 0 wt % to about 100 wt % of the fragrance component, about 10 wt % to about 90 wt %, about 20 wt % to about 80 wt %, about 30 wt % to about 70 wt %, or about 40 wt % to about 60 wt %. The exact wt % of the high volatile fragrance component can vary greatly based on the fragrance's construction. For example, in some examples, where the high volatile fragrance material is present in a top-heavy construction, the high volatile fragrance material can be greater than about 30 wt % of the fragrance component, greater than about 40 wt %, greater than about 50 wt %, greater than about 60 wt %, about 31 wt % to about 60 wt %, about 40 wt % to about 50 wt %, or less than, equal to, or greater than about 30 wt %, 31, 35, 40, 45, 50, 55, 60, 65, 70, or 75 wt %. In some other examples, the high volatile fragrance material can be present in an amount ranging from about 0 wt % to about 30 wt % of the fragrance component, about 1 wt % to about 30 wt %, about 5 wt % to about 30 wt %, or less than, equal to, or greater than about 0 wt %, 0.1, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.25, 27, 27.5, 28, 28.5, 29, 29.5, or about 30 wt %. In still further embodiments, the high volatile fragrance material can be in an amount ranging from about 30 wt % to about 40 wt % of the fragrance component, about 32 wt % to about 35 wt %, less than, equal to, or greater than about 30 wt % 31, 32, 33, 34, 35, 36, 37, 38, 39, or 40 wt %. In some embodiments, the low-volatile fragrance material can be the only fragrance material present. If there are more than one high volatile fragrance materials, then the ranges provided hereinabove cover the total of all of the high volatile fragrance materials. Suitable examples of high volatile fragrances materials are provided in Tables 4A and 4B below. Relative to any other fragrance materials, the high volatile fragrance component can be present in a ratio ranging from about 20:1 to about 1:20, about 10:1 to about 1:10, about 5:1 to about 1:5, or about 1:1.

Preferably, the high volatile fragrance material is selected from at least 1 material, or at least 2 materials, or at least 3 materials, or at least 5 materials, at least 7 materials, or at least 9 high volatile fragrance materials as disclosed in Table 4A. Natural fragrance materials or oils having an aggregate vapor pressure greater than 0.1 Torr (0.0133 kPa) at 25° C. are provided in Table 4B. High Volatile Natural Oils.

TABLE 4A

| | | High Volatile Fragrance Materials | | |
|---|---|---|---|---|
| No. | CAS Number | IUPAC Name | Common Name** | Vapor Pressure (Torr at 25° C.)* |
| 1. | 107-31-3 | Formic acid, methyl ester | Methyl Formate | 732.00000000 |
| 2. | 75-18-3 | Methane, 1,1'-thiobis- | Dimethyl Sulfide 1.0% In DEP | 647.00000000 |
| 3. | 141-78-6 | Acetic acid ethyl ester | Ethyl Acetate | 112.00000000 |
| 4. | 105-37-3 | Propanoic acid, ethyl ester | Ethyl Propionate | 44.50000000 |
| 5. | 110-19-0 | Acetic acid, 2-methylpropyl ester | Isobutyl Acetate | 18.00000000 |
| 6. | 105-54-4 | Butanoic acid, ethyl ester | Ethyl Butyrate | 13.90000000 |
| 7. | 14765-30-1 | 1-Butanol | Butyl Alcohol | 8.52000000 |
| 8. | 7452-79-1 | Butanoic acid, 2-methyl-, ethyl ester | Ethyl-2-Methyl Butyrate | 7.85000000 |
| 9. | 123-92-2 | 1-Butanol, 3-methyl-, 1-acetate | Iso Amyl Acetate | 5.68000000 |
| 10. | 66576-71-4 | Butanoic acid, 2-methyl-, 1-methylethyl ester | Iso Propyl 2-Methylbutyrate | 5.10000000 |
| 11. | 110-43-0 | 2-Heptanone | Methyl Amyl Ketone | 4.73000000 |
| 12. | 6728-26-3 | 2-Hexenal, (2E)- | Trans-2 Hexenal | 4.62000000 |
| 13. | 123-51-3 | 1-Butanol, 3-methyl- | Isoamyl Alcohol | 4.16000000 |
| 14. | 1191-16-8 | 2-Buten-1-ol, 3-methyl-, 1-acetate | Prenyl acetate | 3.99000000 |
| 15. | 57366-77-5 | 1,3-Dioxolane-2-methanamine, N-methyl- | Methyl Dioxolan | 3.88000000 |
| 16. | 7785-70-8 | Bicyclo[3.1.1]hept-2-ene, 2,6,6-trimethyl-, (1R,5R)- | Alpha Pinene | 3.49000000 |
| 17. | 79-92-5 | Bicyclo[2.2.1]heptane, 2,2-dimethyl-3-methylene- | Camphene | 3.38000000 |
| 18. | 94087-83-9 | 2-Butanethiol, 4-methoxy-2-methyl- | 4-Methoxy-2-Methyl-2-Butanenthiol | 3.31000000 |
| 19. | 39255-32-8 | Pentanoic acid, 2-methyl-, ethyl ester | Manzanate | 2.91000000 |
| 20. | 3387-41-5 | Bicyclo[3.1.0]hexane, 4-methylene-1-(1-methylethyl)- | Sabinene | 2.63000000 |
| 21. | 127-91-3 | Bicyclo[3.1.1]heptane, 6,6-dimethyl-2-methylene- | Beta Pinene | 2.40000000 |
| 22. | 105-68-0 | 1-Butanol, 3-methyl-, 1-propanoate | Amyl Propionate | 2.36000000 |
| 23. | 123-35-3 | 1,6-Octadiene, 7-methyl-3-methylene- | Myrcene | 2.29000000 |
| 24. | 124-13-0 | Octanal | Octyl Aldehyde | 2.07000000 |
| 25. | 7392-19-0 | 2H-Pyran, 2-ethenyltetrahydro-2,6,6-trimethyl- | Limetol | 1.90000000 |
| 26. | 111-13-7 | 2-Octanone | Methyl Hexyl Ketone | 1.72000000 |
| 27. | 123-66-0 | Hexanoic acid, ethyl ester | Ethyl Caproate | 1.66000000 |
| 28. | 470-82-6 | 2-Oxabicyclo[2.2.2]octane, 1,3,3-trimethyl- | Eucalyptol | 1.65000000 |
| 29. | 99-87-6 | Benzene, 1-methyl-4-(1-methylethyl)- | Para Cymene | 1.65000000 |

TABLE 4A-continued

High Volatile Fragrance Materials

| No. | CAS Number | IUPAC Name | Common Name** | Vapor Pressure (Torr at 25° C.)* |
|---|---|---|---|---|
| 30. | 104-93-8 | Benzene, 1-methoxy-4-methyl- | Para Cresyl Methyl Ether | 1.65000000 |
| 31. | 13877-91-3 | 1,3,6-Octatriene, 3,7-dimethyl- | Ocimene | 1.56000000 |
| 32. | 138-86-3 | Cyclohexene, 1-methyl-4-(1-methylethenyl)- | dl-Limonene | 1.54000000 |
| 33. | 5989-27-5 | Cyclohexene, 1-methyl-4-(1-methylethenyl)-, (4R)- | d-limonene | 1.54000000 |
| 34. | 106-68-3 | 3-Octanone | Ethyl Amyl Ketone | 1.50000000 |
| 35. | 110-41-8 | Undecanal, 2-methyl- | Methyl Nonyl Acetaldehyde | 1.43000000 |
| 36. | 142-92-7 | Acetic acid, hexyl ester | Hexyl acetate | 1.39000000 |
| 37. | 110-93-0 | 5-Hepten-2-one, 6-methyl- | Methyl Heptenone | 1.28000000 |
| 38. | 81925-81-7 | 2-Hepten-4-one, 5-methyl- | Filbertone 1% in TEC | 1.25000000 |
| 39. | 3681-71-8 | 3-Hexen-1-ol, 1-acetate, (3Z)- | cis-3-Hexenyl acetate | 1.22000000 |
| 40. | 97-64-3 | Propanoic acid, 2-hydroxy-, ethyl ester | Ethyl Lactate | 1.16000000 |
| 41. | 586-62-9 | Cyclohexene, 1-methyl-4-(1-methylethylidene)- | Terpineolene | 1.13000000 |
| 42. | 51115-64-1 | Butanoic acid, 2-methylbutyl ester | Amyl butyrate | 1.09000000 |
| 43. | 106-27-4 | Butanoic acid, 3-methylbutyl ester | Amyl Butyrate | 1.09000000 |
| 44. | 99-85-4 | 1,4-Cyclohexadiene, 1-methyl-4-(1-methylethyl)- | Gamma Terpinene | 1.08000000 |
| 45. | 18640-74-9 | Thiazole, 2-(2-methylpropyl)- | 2-Isobutylthiazole | 1.07000000 |
| 46. | 928-96-1 | 3-Hexen-1-ol, (3Z)- | cis-3-Hexenol | 1.04000000 |
| 47. | 100-52-7 | Benzaldehyde | Benzaldehyde | 0.97400000 |
| 48. | 141-97-9 | Butanoic acid, 3-oxo-, ethyl ester | Ethyl Acetoacetate | 0.89000000 |
| 49. | 928-95-0 | 2-Hexen-1-ol, (2E)- | Trans-2-Hexenol | 0.87300000 |
| 50. | 928-94-9 | 2-Hexen-1-ol, (2Z)- | Beta Gamma Hexenol | 0.87300000 |
| 51. | 24691-15-4 | Cyclohexane, 3-ethoxy-1,1,5-trimethyl-, cis- (9CI) | Herbavert | 0.85200000 |
| 52. | 19872-52-7 | 2-Pentanone, 4-mercapto-4-methyl- | 4-Methyl-4-Mercaptopentan-2-one 1 ppm TEC | 0.84300000 |
| 53. | 3016-19-1 | 2,4,6-Octatriene, 2,6-dimethyl-, (4E,6E)- | Allo-Ocimene | 0.81600000 |
| 54. | 69103-20-4 | Oxirane, 2,2-dimethyl-3-(3-methyl-2,4-pentadien-1-yl)- | Myroxide | 0.80600000 |
| 55. | 189440-77-5 | 4,7-Octadienoic acid, methyl ester, (4E)- | Anapear | 0.77700000 |
| 56. | 67633-96-9 | Carbonic acid, (3Z)-3-hexen-1-yl methyl ester | Liffarome ™ | 0.72100000 |
| 57. | 123-68-2 | Hexanoic acid, 2-propen-1-yl ester | Allyl Caproate | 0.67800000 |
| 58. | 106-72-9 | 5-Heptenal, 2,6-dimethyl- | Melonal | 0.62200000 |
| 59. | 106-30-9 | Heptanoic acid, ethyl ester | Ethyl Oenanthate | 0.60200000 |

TABLE 4A-continued

High Volatile Fragrance Materials

| No. | CAS Number | IUPAC Name | Common Name** | Vapor Pressure (Torr at 25° C.)* |
|---|---|---|---|---|
| 60. | 68039-49-6 | 3-Cyclohexene-1-carboxaldehyde, 2,4-dimethyl- | Ligustral or Triplal | 0.57800000 |
| 61. | 101-48-4 | Benzene, (2,2-dimethoxyethyl)- | Phenyl Acetaldehyde Dimethyl Acetal | 0.55600000 |
| 62. | 16409-43-1 | 2H-Pyran, tetrahydro-4-methyl-2-(2-methyl-1-propen-1-yl)- | Rose Oxide | 0.55100000 |
| 63. | 925-78-0 | 3-Nonanone | Ethyl Hexyl Ketone | 0.55100000 |
| 64. | 100-47-0 | Benzonitrile | Benzyl Nitrile | 0.52400000 |
| 65. | 589-98-0 | 3-Octanol | Octanol-3 | 0.51200000 |
| 66. | 58430-94-7 | 1-Hexanol, 3,5,5-trimethyl-, 1-acetate | Iso Nonyl Acetate | 0.47000000 |
| 67. | 10250-45-0 | 4-Heptanol, 2,6-dimethyl-, 4-acetate | Alicate | 0.45400000 |
| 68. | 105-79-3 | Hexanoic acid, 2-methylpropyl ester | Iso Butyl Caproate | 0.41300000 |
| 69. | 2349-07-7 | Propanoic acid, 2-methyl-, hexyl ester | Hexyl isobutyrate | 0.41300000 |
| 70. | 23250-42-2 | Cyclohexanecarboxylic acid, 1,4-dimethyl-, methyl ester, trans- | Cyprissate | 0.40500000 |
| 71. | 122-78-1 | Benzeneacetaldehyde | Phenyl acetaldehyde | 0.36800000 |
| 72. | 5405-41-4 | Butanoic acid, 3-hydroxy-, ethyl ester | Ethyl-3-Hydroxy Butyrate | 0.36200000 |
| 73. | 105-51-3 | Propanedioic acid, 1,3-diethyl ester | Diethyl Malonate | 0.34400000 |
| 74. | 93-58-3 | Benzoic acid, methyl ester | Methyl Benzoate | 0.34000000 |
| 75. | 16356-11-9 | 1,3,5-Undecatriene | Undecatriene | 0.33600000 |
| 76. | 65405-70-1 | 4-Decenal, (4E)- | Decenal (Trans-4) | 0.33100000 |
| 77. | 54546-26-8 | 1,3-Dioxane, 2-butyl-4,4,6-trimethyl- | Herboxane | 0.33000000 |
| 78. | 13254-34-7 | 2-Heptanol, 2,6-dimethyl- | Dimethyl-2 6-Heptan-2-ol | 0.33000000 |
| 79. | 98-86-2 | Ethanone, 1-phenyl- | Acetophenone | 0.29900000 |
| 80. | 93-53-8 | Benzeneacetaldehyde, α-methyl- | Hydratropic aldehyde | 0.29400000 |
| 81. | 80118-06-5 | Propanoic acid, 2-methyl-, 1,3-dimethyl-3-buten-1-yl ester | Iso Pentyrate | 0.28500000 |
| 82. | 557-48-2 | 2,6-Nonadienal, (2E,6Z)- | E Z-2,6-Nonadien-1-al | 0.28000000 |
| 83. | 24683-00-9 | Pyrazine, 2-methoxy-3-(2-methylpropyl)- | 2-Methoxy-3-Isobutyl Pyrazine | 0.27300000 |
| 84. | 104-57-4 | Formic acid, phenylmethyl ester | Benzyl Formate | 0.27300000 |
| 85. | 104-45-0 | Benzene, 1-methoxy-4-propyl- | Dihydroanethole | 0.26600000 |
| 86. | 491-07-6 | Cyclohexanone, 5-methyl-2-(1-methylethyl)-, (2R,5R)-rel- | Iso Menthone | 0.25600000 |
| 87. | 89-80-5 | Cyclohexanone, 5-methyl-2-(1-methylethyl)-, (2R,5S)-rel- | Menthone Racemic | 0.25600000 |

TABLE 4A-continued

High Volatile Fragrance Materials

| No. | CAS Number | IUPAC Name | Common Name** | Vapor Pressure (Torr at 25° C.)* |
|---|---|---|---|---|
| 88. | 2463-53-8 | 2-Nonenal | 2 Nonen-1-al | 0.25600000 |
| 89. | 55739-89-4 | Cyclohexanone, 2-ethyl-4,4-dimethyl- | Thuyacetone | 0.25000000 |
| 90. | 150-78-7 | Benzene, 1,4-dimethoxy- | Hydroquinone Dimethyl Ether | 0.25000000 |
| 91. | 64988-06-3 | Benzene, 1-(ethoxymethyl)-2-methoxy- | Rosacene | 0.24600000 |
| 92. | 76-22-2 | Bicyclo[2,2.1]heptan-2-one, 1,7,7-trimethyl- | Camphor gum | 0.22500000 |
| 93. | 67674-46-8 | 2-Hexene, 6,6-dimethoxy-2,5,5-trimethyl- | Methyl Pamplemousse | 0.21400000 |
| 94. | 112-31-2 | Decanal | Decyl Aldehyde | 0.20700000 |
| 95. | 16251-77-7 | Benzenepropanal, β-methyl- | Trifernal | 0.20600000 |
| 96. | 93-92-5 | Benzenemethanol, α-methyl-, 1-acetate | Methylphenyl-carbinol Acetate | 0.20300000 |
| 97. | 143-13-5 | Acetic acid, nonyl ester | Nonyl Acetate | 0.19700000 |
| 98. | 122-00-9 | Ethanone, 1-(4-methylphenyl)- | Para Methyl Acetophenone | 0.18700000 |
| 99. | 24237-00-1 | 2H-Pyran, 6-butyl-3,6-dihydro-2,4-dimethyl- | Gyrane | 0.18600000 |
| 100. | 41519-23-7 | Propanoic acid, 2-methyl-, (3Z)-3-hexen-1-yl ester | Hexenyl Isobutyrate | 0.18200000 |
| 101. | 93-89-0 | Benzoic acid, ethyl ester | Ethyl Benzoate | 0.18000000 |
| 102. | 20780-48-7 | 3-Octanol, 3,7-dimethyl-, 3-acetate | Tetrahydro Linalyl Acetate | 0.18000000 |
| 103. | 101-41-7 | Methyl 2-phenylacetate | Methylphenyl acetate | 0.17600000 |
| 104. | 40853-55-2 | 1-Hexanol, 5-methyl-2-(1-methylethyl)-, 1-acetate | Tetrahydro Lavandulyl Acetate | 0.17300000 |
| 105. | 933-48-2 | Cyclohexanol, 3,3,5-trimethyl-, (1R,5R)-rel- | Trimethylcyclo-hexanol | 0.17300000 |
| 106. | 35158-25-9 | 2-Hexenal, 5-methyl-2-(1-methylethyl)- | Lactone of Cis Jasmone | 0.17200000 |
| 107. | 18479-58-8 | 7-Octen-2-ol, 2,6-dimethyl- | Dihydromyrcenol | 0.16600000 |
| 108. | 140-11-4 | Acetic acid, phenylmethyl ester | Benzyl acetate | 0.16400000 |
| 109. | 14765-30-1 | Cyclohexanone, 2-(1-methylpropyl)- | 2-sec-Butyl Cyclo Hexanone | 0.16300000 |
| 110. | 20125-84-2 | 3-Octen-1-ol, (3Z)- | Octenol | 0.16000000 |
| 111. | 142-19-8 | Heptanoic acid, 2-propen-1-yl ester | Allyl Heptoate | 0.16000000 |
| 112. | 100-51-6 | Benzenemethanol | Benzyl Alcohol | 0.15800000 |
| 113. | 10032-15-2 | Butanoic acid, 2-methyl-, hexyl ester | Hexyl-2-Methyl Butyrate | 0.15800000 |
| 114. | 695-06-7 | 2(3H)-Furanone, 5-ethyldihydro- | Gamma Hexalactone | 0.15200000 |
| 115. | 21722-83-8 | Cyclohexaneethanol, 1-acetate | Cyclohexyl Ethyl Acetate | 0.15200000 |
| 116. | 111-79-5 | 2-Nonenoic acid, methyl ester | Methyl-2-Nonenoate | 0.14600000 |

TABLE 4A-continued

High Volatile Fragrance Materials

| No. | CAS Number | IUPAC Name | Common Name** | Vapor Pressure (Torr at 25° C.)* |
|---|---|---|---|---|
| 117. | 16491-36-4 | Butanoic acid, (3Z)-3-hexen-1-yl ester | Cis 3 Hexenyl Butyrate | 0.13500000 |
| 118. | 111-12-6 | 2-Octynoic acid, methyl ester | Methyl Heptine Carbonate | 0.12500000 |
| 119. | 59323-76-1 | 1,3-Oxathiane, 2-methyl-4-propyl- (2R,4S)-rel- | Oxane | 0.12300000 |
| 120. | 62439-41-2 | Heptanal, 6-methoxy-2,6-dimethyl- | Methoxy Melonal | 0.11900000 |
| 121. | 13851-11-1 | Bicyclo[2,2.1]heptan-2-ol, 1,3,3-trimethyl-, 2-acetate | Frenchyl Acetate | 0.11700000 |
| 122. | 115-95-7 | 1,6-Octadien-3-ol, 3,7-dimethyl-, 3-acetate | Linalyl acetate | 0.11600000 |
| 123. | 18479-57-7 | 2-Octanol, 2,6-dimethyl- | Tetra-Hydro Myrcenol | 0.11500000 |
| 124. | 78-69-3 | 3,7-dimethyloctan-3-ol | Tetra-Hydro Linalool | 0.11500000 |
| 125. | 111-87-5 | 1-Octanol | Octyl Alcohol | 0.11400000 |
| 126. | 71159-90-5 | 3-Cyclohexene-1-methanethiol, α,α,4-trimethyl- | Grapefruit mercaptan | 0.10500000 |
| 127. | 80-25-1 | Cyclohexanemethanol, α,α,4-trimethyl-, 1-acetate | Menthanyl Acetate | 0.10300000 |
| 128. | 88-41-5 | Cyclohexanol, 2-(1,1-dimethylethyl)-, 1-acetate | Verdox ™ | 0.10300000 |
| 129. | 32210-23-4 | Cyclohexanol, 4-(1,1-dimethylethyl)-, 1-acetate | Vertenex | 0.10300000 |
| 130. | 112-44-7 | Undecanal | n-Undecanal | 0.10200000 |
| 131. | 124-19-6 | Nonanal | Nonanal Aldehyde C-9 | 0.53200000 |
| 132. | 929253-05-4 | 6-methoxy-2,6-dimethyloctanal | 6-methoxy-2,6-dimethyl octanal | 0.04020000 |
| 133. | 68039-47-4 | 2-propan-2-yloxyethylbenzene | Phenethyl Isopropyl Ether | 0.24900000 |
| 134. | 6413-10-1 | ethyl 2(2-methyl-1,3-dioxolan-2-yl)acetate | Apple Ketal | 0.21900000 |
| 135. | 106-23-0 | 3,7-dimethyloct-6-enal | citronellal | 0.21500000 |
| 136. | 14667-55-1 | Trimethyl Pyrazine-2,3,5 | Trimethyl Pyrazine-2,3,5 | 1.72400000 |

*Vapor Pressures are acquired as described in the Test Methods Section.
**Origin: Same as for Table 2 hereinabove.

TABLE 4B

High Volatile Fragrance Materials

| No. | Natural oil | Supplier |
|---|---|---|
| 1. | Angelica Seeds Oil | Robertet |
| 2. | Basil Oil Grand Vert | IFF |
| 3. | Bergamot Oil Reggio Early New Crop | Capua |
| 4. | Black Pepper Oil | Robertet |
| 5. | Blackcurrant Buds Absolute | Robertet |
| 6. | Cardamom Guatamala Extract CO2 | IFF |
| 7. | Cardamom Oil Guatemala | IFF |
| 8. | Cedarleaf Oil | Kerry |
| 9. | citronella oil | H. Reynaud & Fils |
| 10. | Clary Sage Oil French | IFF |
| 11. | Coffee Extract CO2 | Firmenich |
| 12. | Cucumber Extract | Firmenich |
| 13. | Cumin Oil | Robertet |
| 14. | Cypress Oil | IFF |
| 15. | Elemi Coeur Oil | Robertet |
| 16. | Ginger oil India | IFF |
| 17. | Grapefruit Zest | Citrus & Allied Essences |
| 18. | It. Bergamot Oil | Capua |

TABLE 4B-continued

High Volatile Fragrance Materials

| No. | Natural oil | Supplier |
|---|---|---|
| 19. | Labdanum Cistus Absolute | Biolandes |
| 20. | Lavandin Grosso Oil | H. Reynaud & Fils |
| 21. | Lemon Oil Winter | Capua |
| 22. | Green Mandarin Oil | Simone Gatto |
| 23. | Nutmeg Oil | Robertet |
| 24. | Oil Orange Sinensal | Citrus & Allied Essences |
| 25. | Olibanum Oil Pyrogenous | Firmenich |
| 26. | Pepper Black CO2 Oil | Firmenich |
| 27. | Petitgrain Mandarinier Oil | Misitano & Stracuzzi |
| 28. | Pink Pepper CO2 OIL | Firmenich |
| 29. | Rum CO2 Oil | Firmenich |
| 30. | Sichuan Pepper CO2 oil | Firmenich |
| 31. | Styrax Resoid | IFF |
| 32. | Tangerine Oil | Robertet |
| 33. | Thym Oil | IFF |
| 34. | Violet Leaves Absolute | Robertet |

Suppliers
   Biolandes, Le Sen, France
   Capua, Campo Calabro, Italy
   Citrus & Allied Essences. New York, USA
   Firmenich, Geneva, Switzerland
   Global Essence Inc, New Jersey, USA
   H. Reynaud & Fils, Montbrun-les-Bains, France
   IFF, Hazlet, New Jersey, USA
   Kerry, Co. Kerry, Ireland
   Mane, Le Bar-sur-Loup, France
   Misitano & Stracuzzi, Messina, Italy
   Robertet, Grasse, France
   Simone Gatto, San Pierre Niceto, Italy Exemplary high volatile fragrance materials selected from the group of Tables 4A or 4B are preferred. However, it is understood by one skilled in the art that other high volatile fragrance materials, not recited in Tables 4A or 4B, would also fall within the scope of the present invention, so long as they have a vapor pressure of greater than 0.1 Torr (0.0133 kPa) at 25° C.

Some embodiments can include a construction including a fragrance component present in an amount of from about 0.04 wt % to about 30 wt %, relative to the total weight of the composition. The fragrance component can include a glucam modulator and at least one low volatile fragrance material having a vapor pressure less than 0.001 Torr (0.000133 kPa) at 25° C. present in an amount of greater than about 30 wt % relative to the total weight of the fragrance component. At least one high volatile fragrance material having a vapor pressure greater than 0.1 Torr (0.0133 kPa) at 25° C. present in an amount greater than about 30 wt % relative to the total weight of the fragrance component. As well as at least one moderate volatile fragrance material having a vapor pressure in the range of 0.1 Torr to 0.001 Torr (0.0133 kPa to 0.000133 kPa) at 25° C. present in an amount of less than about 30 wt %, relative to the total weight of the fragrance component.

Entrapment Materials

According to various embodiments, coating compositions, fragrance compositions, or both of the present invention can include an entrapment material at a level such that the weight ratio of the entrapment material to the coating or fragrance materials is in the range of from about 1:20 to about 20:1. In some examples, the composition may comprise an entrapment material present in the amount of from about 0.001 wt % to about 40 wt %, from about 0.1 wt % to about 25 wt %, from about 0.3 wt % to about 20 wt %, from about 0.5 wt % to about 10 wt %, or from about 0.75 wt % to about 5 wt %, relative to the total weight of the composition. The compositions disclosed herein may include from 0.001 wt % to 40%, from 0.1 wt % to 25 wt %, from 0.3 wt % to 20 wt %, from 0.5 wt % to 10 wt % or from 0.75 wt % to 5 wt %, relative to the total weight of the composition, of a cyclic oligosaccharide.

Suitable entrapment materials for use herein are selected from polymers; capsules, microcapsules and nanocapsules; liposomes, absorbents; cyclic oligosaccharides and mixtures thereof. Preferred are absorbents and cyclic oligosaccharides and mixtures thereof. Highly preferred are cyclic oligosaccharides (see PCT Publication Nos. WO2000/67721 (Procter & Gamble); and WO2000/67720 (Procter & Gamble); and U.S. Pat. No. 6,893,647 (Procter & Gamble)).

As used herein, the term "cyclic oligosaccharide" means a cyclic structure comprising six or more saccharide units. Preferred for use herein are cyclic oligosaccharides having six, seven or eight saccharide units and mixtures thereof, more preferably six or seven saccharide units and even more preferably seven saccharide units. It is common in the art to abbreviate six, seven and eight membered cyclic oligosaccharides to α, β and γ respectively.

The cyclic oligosaccharide of the compositions used for the present invention may comprise any suitable saccharide or mixtures of saccharides. Examples of suitable saccharides include, but are not limited to, glucose, fructose, mannose, galactose, maltose and mixtures thereof. However, preferred for use herein are cyclic oligosaccharides of glucose. The preferred cyclic oligosaccharides for use herein are α-cyclodextrins or β-cyclodextrins, or mixtures thereof, and the most preferred cyclic oligosaccharides for use herein are β-cyclodextrins.

The cyclic oligosaccharide, or mixture of cyclic oligosaccharides, for use herein may be substituted by any suitable substituent or mixture of substituents. Herein the use of the term "mixture of substituents" means that two or more different suitable substituents can be substituted onto one cyclic oligosaccharide. The derivatives of cyclodextrins consist mainly of molecules wherein some of the OH groups have been substituted. Suitable substituents include, but are not limited to, alkyl groups; hydroxyalkyl groups; dihydroxyalkyl groups; (hydroxyalkyl)alkylenyl bridging groups such as cyclodextrin glycerol ethers; aryl groups; maltosyl groups; allyl groups; benzyl groups; alkanoyl groups; cationic cyclodextrins such as those containing 2-hydroxy-3-(dimethylamino) propyl ether; quaternary ammonium groups; anionic cyclodextrins such as carboxyalkyl groups, sulphobutylether groups, sulphate groups, and succinylates; amphoteric cyclodextrins; and mixtures thereof.

The substituents may be saturated or unsaturated, straight chain, or branched chain. Preferred substituents include saturated and straight chain alkyl groups, hydroxyalkyl groups and mixtures thereof. Preferred alkyl and hydroxyalkyl substituents are selected from $C_1$-$C_8$ alkyl or hydroxyalkyl groups or mixtures thereof, more preferred alkyl and hydroxyalkyl substituents are selected from $C_1$-$C_6$ alkyl or hydroxyalkyl groups or mixtures thereof, even more preferred alkyl and hydroxyalkyl substituents are selected from $C_1$-$C_4$ alkyl or hydroxyalkyl groups and mixtures thereof. Especially preferred alkyl and hydroxyalkyl substituents are propyl, ethyl and methyl, more especially hydroxypropyl and methyl and even more preferably methyl.

Suitable cyclic oligosaccharides for use in the present invention are unsubstituted, or are substituted by only saturated straight chain alkyl, or hydroxyalkyl substituents. Therefore, preferred examples of cyclic oligosaccharides for use herein are α-cyclodextrin, β-cyclodextrin, methyl-α-cyclodextrin, methyl-β-cyclodextrin, hydroxypropyl-α-cyclodextrin and hydroxypropyl-β-cyclodextrin. Most preferred examples of cyclic oligosaccharides for use herein are methyl-α-cyclodextrin and methyl-β-cyclodextrin. These are available from Wacker-Chemie GmbH Hanns-Seidel-Platz 4, Munchen, DE under the tradename Alpha W6 M and Beta W7 M respectively.

The cyclic oligosaccharides of the compositions used for the present invention can be soluble in water, ethanol, or both water and ethanol. As used herein "soluble" means at least about 0.1 g of solute dissolves in 100 mL of solvent, at 25° C. and 1 standard atmospheric pressure (760 mmHg). The cyclic oligosaccharides for use herein have a solubility of at least about 1 g/100 mL, at 25° C. and 1 atm of pressure. In some examples, cyclic oligosaccharides are only present at levels up to their solubility limits in a given composition at room temperature. A person skilled in the art will recognize that the levels of cyclic oligosaccharides used in the present invention will also be dependent on the components of the composition and their levels, for example the solvents used or the exact fragrance oils, or combination of fragrance oils, present in the composition. Therefore, although the limits stated for the entrapment material are preferred, they are not exhaustive.

Propellants

The coating compositions, fragrance compositions, or both described herein may include a propellant. Some examples of propellants include compressed air, nitrogen, inert gases, carbon dioxide, and mixtures thereof. Propellants may also include gaseous hydrocarbons like propane, n-butane, isobutene, cyclopropane, and mixtures thereof. Halogenated hydrocarbons like 1,1-difluoroethane may also be used as propellants. Some non-limiting examples of propellants include 1,1,1,2,2-pentafluoroethane, 1,1,1,2-tetrafluoroethane, 1,1,1,2,3,3,3-heptafluoropropane, trans-1,3,3,3-tetrafluoroprop-1-ene, dimethyl ether, dichlorodifluoromethane (propellant 12), 1,1-dichloro-1,1,2,2-tetrafluoroethane (propellant 114), 1-chloro-1,1-difluoro-2,2-trifluoroethane (propellant 115), 1-chloro-1,1-difluoroethylene (propellant 142B), 1,1-difluoroethane (propellant 152A), monochlorodifluoromethane, and mixtures thereof. Some other propellants suitable for use include, but are not limited to, A-46 (a mixture of isobutane, butane and propane), A-31 (isobutane), A-17 (n-butane), A-108 (propane), AP70 (a mixture of propane, isobutane and n-butane), AP40 (a mixture of propane, isobutene and n-butane), AP30 (a mixture of propane, isobutane and n-butane), and 152A (1,1 difluoroethane). The propellant may have a concentration from about 15%, 25%, 30%, 32%, 34%, 35%, 36%, 38%, 40%, or 42% to about 70%, 65%, 60%, 54%, 52%, 50%, 48%, 46%, 44%, or 42% by weight of the total fill of materials stored within the container.

Antiperspirant Active

The fragrance compositions, coating compositions, or both described herein may be free of, substantially free of, or may include an antiperspirant active (e.g., any substance, mixture, or other material having antiperspirant activity). Examples of antiperspirant actives include astringent metallic salts, like the inorganic and organic salts of aluminum, zirconium and zinc, as well as mixtures thereof. Such antiperspirant actives include, for example, the aluminum and zirconium salts, such as aluminum halides, aluminum hydroxyhalides, zirconyl oxyhalides, zirconyl hydroxyhalides, and mixtures thereof.

Other Ingredients

In yet another aspect, the fragrance compositions, coating compositions or both may consist essentially of the recited ingredients but may contain small amounts (not more than about 10 wt %, preferably no more than 5 wt %, or preferably no more than 2 wt % thereof, relative to the total weight of the composition) of other ingredients that do not impact on the fragrance profile, particularly the evaporation rate and release of the fragrance materials. For example, a fine fragrance composition may comprise stabilizing or antioxidant agents, UV filters or quenchers, or coloring agents, commonly used in perfumery. There are a number of other examples of additional ingredients that are suitable for inclusion in the present compositions, particularly in compositions for cosmetic use. These include, but are not limited to, alcohol denaturants such as denatonium benzoate; UV stabilizers such as benzophenone-2; antioxidants such as tocopheryl acetate; preservatives such as phenoxyethanol, benzyl alcohol, methyl paraben, and propyl paraben; dyes; pH adjusting agents such as lactic acid, citric acid, sodium citrate, succinic acid, phosphoric acid, sodium hydroxide, and sodium carbonate; deodorants and anti-microbials such as farnesol and zinc phenolsulphonate; humectants such as glycerine; oils; skin conditioning agents such as allantoin; cooling agents such as trimethyl isopropyl butanamide and menthol; silicones; solvents such as hexylene glycol; hair-hold polymers such as those described in PCT Publication No. WO94/08557 (Procter & Gamble); salts in general, such as potassium acetate and sodium chloride and mixtures thereof.

In yet another aspect, the composition of the present invention, depending on its intended use, is a mixture of fragrance materials possibly together with other ingredients such as, for example, perfume carriers. By the term "perfume carrier", it is meant to include materials which are practically neutral from a perfumery point of view, e.g., which does not significantly alter the organoleptic properties of perfuming components. The perfume carrier may be a compatible liquid or solid fillers, diluents, and the like. The term "compatible", as used herein, means that the components of the compositions of this invention are capable of being combined with the primary actives of the present invention, and with each other, in a manner such that there is no interaction which would substantially reduce the efficacy of the composition under ordinary use situations. The type of carrier utilized in the present invention depends on the type of product desired and may comprise, but are not limited to, solutions, aerosols, emulsions (including oil-in-water or water-in-oil), gels, and liposomes. Preferably, the carrier is a liquid and will be a solvent such as, for example, dipropyleneglycol, diethyl phthalate, isopropyl myristate, benzyl benzoate, 2-(2-ethoxyethoxy)-1-ethanol, or ethyl citrate (triethyl citrate).

In yet another aspect, the compositions for use in the present invention may take any form suitable for use, such as for perfumery or cosmetic use. These include, but are not limited to, vapor sprays, aerosols, emulsions, lotions, liquids, creams, gels, sticks, ointments, pastes, mousses, powders, granular products, substrates, cosmetics (e.g., semi-solid or liquid makeup, including foundations) and the like. In some examples, the compositions for use in the present invention take the form of a vapor spray. Compositions of the present invention can be further added as an ingredient to other compositions, preferably fine fragrance or cosmetic compositions, in which they are compatible. As such they can be used within a solid composition or applied substrates etc. Examples of products including the composition can include a fabric care product, an air care product, a home care product, a beauty care product, or a mixture thereof. Specific examples of products can include a perfume, an eau de toilette, an eau de parfum, a cologne, a body splash, a lotion, a cream, a shampoo, a conditioner, a hair mist, a body oil, a deodorant, a solid fragrance, or a body spray. The composition can be contacted with skin, hair, or a fabric.

Article of Manufacture

The coating compositions, fragrance compositions, or both described herein may be included in an article of manufacture comprising a spray dispenser. The spray dispenser may comprise a vessel for containing the composition to be dispensed. The spray dispenser may comprise an aerosolized composition (e.g., a composition comprising a propellant) within the vessel as well. Other non-limiting examples of spray dispensers include non-aerosol dispensers (e.g., vapor sprays), manually activated dispensers, pump-spray dispensers, or any other suitable spray dispenser available in the art.

Methods of Using the Compositions

The coating compositions of the present invention, according to any embodiment, can be useful to extend the amount of time, which the fragrances in the fragrance composition are detectable. This can be a result of the modulator in the coating composition diffusing at least partially into the fragrance composition. The coating composition can be configured as a primer, a top-coat, or both.

In embodiments in which the coating composition is configured as a primer, the coating composition can be applied directly to surfaces including human or animal skin or hair, paper (fragranced paper), air in a room (air freshener or aromatherapy composition), fabric, furnishings, dishes, hard surfaces and related materials. Preferred substrates include body surfaces such as, for example, hair and skin, most preferably skin. Following application, one or more of the fragrance compositions can be applied at least partially over the coating composition. Upon or shortly after contact, the modulator or modulators in the coating composition begin to diffuse into the fragrance composition.

Alternatively, in embodiments in which the coating composition is a topcoat, the coating composition can be applied to the fragrance compositions. The fragrance compositions of the present invention according to any embodiments described herein is a useful perfuming composition, which can be advantageously used as consumer products intended to perfume any suitable substrate such as the surfaces mentioned above.

The fragrance compositions of the present invention may be used in a conventional manner for fragrancing a substrate. An effective amount of the composition, such as from about 1 μL to about 100 mL, preferably from about 10 μL to about 1,000 μL, more preferably from about 25 μL to about 500 μL, from about 50 μL to about 100 μL, from about 100 μL to about 20 mL, or combinations thereof, is applied to the suitable substrate. Alternatively, an effective amount of the composition of the present invention is less than, equal to, or greater than about 1 μL, 10 μL, 25 μL or 50 μL to about 100 μL, 500 μL, 1,000 μL, 10,000 μL, 10 mL, 20 mL, 25 mL, 30 mL, 40 mL, 50 mL, 60 mL, 70 mL, 80 mL, 90 mL, or 100 mL. The composition may be applied by hand or applied utilizing a delivery apparatus such as, for example, vaporizer or atomizer. Preferably, the composition is allowed to dry after its application to the substrate. The scope of the present invention should be considered to cover one or more distinct applications of the composition or the continuous release of a composition via a vaporizer or other type of atomizer.

Following application of the fragrance compositions, the coating composition can be at least partially applied to the fragrance composition. Upon or shortly after contact, the modulator or modulators in the coating composition begin to diffuse into the fragrance composition.

The present disclosure provides a method for imparting, intensifying, or modifying an odor on human skin or human hair, comprising applying to human skin and/or human hair the composition of the present invention. Examples of notes or characters that can be enhanced include those chosen from a citrus-type note, green-type note, spicy-type note, cinnamon-type notes, pepper-type notes, cumin-type notes, ginger-type notes, floral-type notes, woody-type notes, cedarwood-type notes, sandalwood type notes, vetyver-type notes, leather-type note, smoky-type note, musk-type notes, and mixtures thereof.

Preferably, the fragrance profile or character of the composition of the present invention is detectable by a panel of experts or professional evaluators or individual experts or professional evaluators at later time points such as, for example, 30 mins, 1 hour, 2 hours, 3 hours, 4 hours, 5 hours, 6 hours, 7 hours, 8 hours, 10 hours, and possibly all the way up to 24 hours after application of the composition to a substrate as compared to controls (e.g., those without modulators). The nature of the fragrance which is applied prior or after the drying of the coating composition is not critical for the present disclosure. The technical teaching works for all fragrances independent if they are dedicated for males or females.

In another aspect, the present invention is also directed to a method of producing a consumer product comprising bringing into contact or mixing into the product an organoleptically active quantity of a composition of the present invention.

Test Methods

The following assays set forth must be used in order that the invention described and claimed herein may be more fully understood.

Test Method 1: Determining Vapor Pressure

In order to determine the vapor pressure for the fragrance materials, go to the website https://scifinder.cas.org/scifinder/view/scifinder/scifinderExplore.jsf and follow these steps to acquire the vapor pressure.

1. Input the CAS registry number for the particular fragrance material.
2. Select the vapor pressure from the search results.
3. Record the vapor pressure (given in Torr at 25° C.).

SciFinder uses Advanced Chemistry Development (ACD/Labs) Software Version 11.02. (© 1994-2018). If the CAS number for the particular fragrance material is unknown or does not exist, you can utilize the ACD/Labs reference program to directly determine the vapor pressure. Vapor Pressure is expressed in 1 Torr, which is equal to 0.133 kilopascal (kPa).

Test Method 2: Sensory Testing

At the testing facility, samples of the compositions and the controls are applied to glass slides (50 mm width) and placed on a hot plate at 32° C. to represent skin temperature for varying durations. It is important that glass slides of samples that are to be later compared are prepared at the same time.

Assessment of fragrance EDT: Using a 'Socorex' regulated pipette, apply 20 μl of the fragrance EDT product carefully to glass slide allowing it to spread evenly.

Assessment when using coating solutions: Using a 'Socorex' regulated pipette, apply 20 μl of the primer carefully to the glass slide allowing it to spread evenly.

Wait 4 minutes for solvent to evaporate and then add 20 µl of the fragrance EDT on top of the primer.

Slides are presented coded with three digit numbers so that their identity is not known by the experts. The first composition evaluated by panelists is randomized. Samples and control are presented in the same tray, and panelists are able to compare both at the same moment. Panelists are selected from experienced evaluators among the industry, which have been specifically trained to differentiate fragrance samples.

Test Method 2a: Character Difference of Fragrance Test Samples Vs. Control:

At least 3 expert evaluators were selected for these experiments. Panelists are asked to give a score on a scale of 1 to 5 for changes in the perceived fragrance profile change for the test compositions versus the controls (without use of coating composition) according to the odor grading scale set out in Table herein below.

TABLE 5

Character Difference Odour Grading Scale

| Score | Fragrance Profile change |
|---|---|
| 5 | Total difference in the fragrance profile from the control. |
| 4 | Large difference in fragrance profile from the control |
| 3 | Moderate fragrance profile but similar character to the control. Difference large enough for consumers to notice difference. |
| 2 | Slight fragrance profile change when compared directly with the control. |
| 1 | Frargrance profile is unchanged, i.e., no difference between the sample vs. the control. |

Samples were evaluated at t=5 minutes and t=3 hours' time. The results were summarized a table indicating the mean values, standard deviation, standard error and 95% confidence intervals when variability allowed it. Statistical analysis was performed with t-test and ANOVA with R (R version 3.5.1). Furthermore, list of comments relating to fragrance character was summarized in a bar chart indicating the frequency of the same.

Test Method 2b: Quantitative Descriptive Analysis 10 female trained panelists were selected to perform evaluations, which was done in two replicates. 36 attributes were evaluated on an unlabelled continuous linear scale, where 0=not perceptible odour and 10=very strong odour. The global intensity of the fragrance was measured first, and then 35 olfactive descriptors. Samples were evaluated at t=5 minutes, t=2 hours, t=4 hours, and t=6 hours' time. The results were summarized in bar charts for the global intensity and line charts for the olfactive descriptors, with 95% confidence intervals as error bars. Three-way analysis of variance (replicate/sample/panelist—a=0.05) with interaction followed with Duncan post-hoc multiple comparison test was used as statistical data analysis.

Test Method 3: Solubility Test

Fragrance ingredient was weighed, and added progressively to 5 gr of target solution. At each step, 0.050 gr of fragrance raw material was added, and shaken vigorously during 2 minutes to form a clear aqueous solution at room temperature. When insoluble, the mixture was allowed to sit for 8 hours to solubilize. The mixture was considered soluble when not appearing cloudy and no suspended oil or particles were visible after 8 hours.

EXAMPLES

Various embodiments of the present disclosure can be better understood by reference to the following Examples which are offered by way of illustration. The present disclosure is not limited to the Examples given herein.

Example 1—Exemplary Product Compositions

Compositions I, II, III and are examples of water-based coating compositions according to the present invention. They are prepared by admixture of the components described in Table 6, in the proportions indicated.

TABLE 6

Water-based coating compositions

| | | Compositions (wt %) | | |
|---|---|---|---|---|
| Ingredients | CAS Number | I | II | III |
| Deionized Water | 7732-18-5 | 50 to 70 | 70 to 80 | 70 to 80 |
| Glucam P-20 | 61849-72-7 | 10 to 20 | 10 to 20 | 10 to 20 |
| Carbopol 981 | 9003-01-04 | 0.1 to 0.3 | — | — |
| Sepimax Zen | — | — | 0.1 to 0.3 | — |
| Sodium Hydroxide | 1310-73-2 | 0.1 to 0.3 | 0.1 to 0.3 | — |
| Preservatives | — | 0.5 to 1 | 0.5 to 1 | 0.5 to 1 |
| Microencapsulated fragrance | — | 10 to 15 | 0.1 to 0.5 | — |

Preparation of water-based coating compositions was done with the following steps: in a clean and dried vessel add deionized water and glucam (phase A). Heat until 40° C. approx. and mix for 30 minutes. Reserve aside thickeners in the case of compositions I and II. In a separate vessel, add water and preservatives and heat until 70° C. approx. Let it cool down to 40° C. Start stirring (800 rpm) and sprinkle the thickeners in the case of compositions I and II, and let mix hydrate for 30 minutes. Add sodium hydroxide solution. Measure pH. For compositions I and II, add microencapsulated fragrance and correct pH if necessary.

Composition V, VI and VII are examples of ethanol-based coating compositions according to the present invention. They are prepared by admixture of the components as described in Table 24, in the proportions indicated.

TABLE 8

Ethanol-based coating compositions

| | | Compositions (wt %) | | | |
|---|---|---|---|---|---|
| Ingredients | CAS Number | IV | V | VI | VII |
| Deionized Water | 7732-18-5 | 2 to 12 | 2 to 12 | 15 to 35 | 15 to 35 |
| Alcohol denaturated | 64-17-5 | 60 to 78 | 60 to 78 | 60 to 78 | 60 to 78 |
| Glucam P-20 | 61849-72-7 | 10 to 20 | 10 to 20 | 0.1 to 7 | 0.1 to 7 |

TABLE 8-continued

Ethanol-based coating compositions

| | | Compositions (wt %) | | | |
|---|---|---|---|---|---|
| Ingredients | CAS Number | IV | V | VI | VII |
| Dermacryl 79 | 129702-02-9 | — | 0.1 to 3 | — | — |
| Cavasor ® W7 methylated Beta-cyclodextrin | 128446-36-6 | — | — | 1 to 12.5 | 1 to 12.5 |

Example 2—Olfactive Test Results from Method 2a

Compositions disclosed in Tables 5-8 and different non-commercial and commercial fragrances are applied to glass slides in accordance with the protocol described in the Method Section 2a and a panel of 4 expert evaluators assess the perceived fragrance profile at initial time 0, then at 3 hours post application. Panelists are asked to score the compositions for the fidelity of the fragrance profile on a scale of 0 to 5, wherein 1 represents a no fragrance character change is detected and 5 represents a complete fragrance character change detected. The results of the panelists are then averaged and discussed below.

TABLE 9

Evaluation of character difference (1 to 5 scale) of fragrances with coating compositions versus fragrances without coating in commercial and non-commercial fragrances

| Fragrance | Type | Coating Composition | Application | Time [h] | No Evaluators | Mean value | SD | SE | CI [90%] |
|---|---|---|---|---|---|---|---|---|---|
| Diamond Fragrance | Female | I | Primer | 0 | 4 | 2.25 | 0.50 | 0.25 | 0.80 |
| Diamond Fragrance | Female | I | Primer | 3 | 4 | 3.75 | 0.50 | 0.25 | 0.80 |
| Diamond Fragrance | Female | II | Primer | 0 | 4 | 3.50 | 1.00 | 0.50 | 1.59 |
| Diamond Fragrance | Female | II | Primer | 3 | 4 | 3.50 | 0.58 | 0.29 | 0.92 |
| Diamond Fragrance | Female | IV | Primer | 0 | 4 | 2.25 | 0.50 | 0.25 | 0.80 |
| Diamond Fragrance | Female | IV | Primer | 3 | 4 | 2.25 | 0.96 | 0.48 | 1.52 |
| Diamond Fragrance | Female | V | Primer | 0 | 4 | 3.50 | 0.58 | 0.29 | 0.92 |
| Diamond Fragrance | Female | V | Primer | 3 | 4 | 3.50 | 0.58 | 0.29 | 0.92 |
| Diamond Fragrance | Female | V | Topcoat | 0 | 4 | 2.75 | 0.50 | 0.25 | 0.80 |
| Diamond Fragrance | Female | V | Topcoat | 3 | 4 | 3.50 | 0.58 | 0.29 | 0.92 |
| Diamond Fragrance | Female | III | Primer | 0 | 4 | 3.75 | 0.50 | 0.25 | 0.80 |
| Diamond Fragrance | Female | III | Primer | 3 | 4 | 2.00 | 0.82 | 0.41 | 1.30 |
| Dior J'Adore EDP | Female | IV | Primer | 0 | 3 | 2.67 | 0.58 | 0.33 | 1.43 |
| Dior J'Adore EDP | Female | IV | Primer | 3 | 4 | 2.00 | 0.00 | 0.00 | 0.00 |
| Dior J'Adore EDP | Female | V | Primer | 0 | 3 | 1.67 | 0.58 | 0.33 | 1.43 |
| Dior J'Adore EDP | Female | V | Primer | 3 | 4 | 2.00 | 0.00 | 0.00 | 0.00 |
| Dior J'Adore EDP | Female | V | Topcoat | 0 | 3 | 2.00 | 0.00 | 0.00 | 0.00 |
| Dior J'Adore EDP | Female | V | Topcoat | 3 | 4 | 2.25 | 0.50 | 0.25 | 0.80 |
| Lancome La Vie Est Belle EDP | Female | IV | Primer | 0 | 3 | 2.33 | 0.58 | 0.33 | 1.43 |
| Lancome La Vie Est Belle EDP | Female | IV | Primer | 3 | 4 | 2.25 | 0.96 | 0.48 | 1.52 |

TABLE 9-continued

Evaluation of character difference (1 to 5 scale) of fragrances with coating compositions versus fragrances without coating in commercial and non-commercial fragrances

| Fragrance | Type | Coating Composition | Application | Time [h] | No Evaluators | Mean value | SD | SE | CI [90%] |
|---|---|---|---|---|---|---|---|---|---|
| Lancome La Vie Est Belle EDP | Female | V | Primer | 0 | 3 | 4.00 | 0.00 | 0.00 | 0.00 |
| Lancome La Vie Est Belle EDP | Female | V | Primer | 3 | 3 | 3.33 | 0.58 | 0.33 | 1.43 |
| Lancome La Vie Est Belle EDP | Female | V | Topcoat | 0 | 3 | 3.67 | 0.58 | 0.33 | 1.43 |
| Lancome La Vie Est Belle EDP | Female | V | Topcoat | 3 | 3 | 2.00 | 0.00 | 0.00 | 0.00 |
| Boss Ma Vie EDP | Female | IV | Primer | 0 | 3 | 2.00 | 0.00 | 0.00 | 0.00 |
| Boss Ma Vie EDP | Female | IV | Primer | 3 | 4 | 3.00 | 0.00 | 0.00 | 0.00 |
| Boss Ma Vie EDP | Female | Vact | Primer | 3 | 4 | 3.50 | 0.58 | 0.29 | 0.92 |
| Boss Ma Vie EDP | Female | V | Primer | 0 | 3 | 2.67 | 0.58 | 0.33 | 1.43 |
| Boss Ma Vie EDP | Female | V | Primer | 3 | 4 | 3.25 | 0.50 | 0.25 | 0.80 |
| Boss Ma Vie EDP | Female | Vact | Primer | 3 | 4 | 3.75 | 0.50 | 0.25 | 0.80 |
| Boss Ma Vie EDP | Female | V | Topcoat | 0 | 3 | 2.33 | 0.58 | 0.33 | 1.43 |
| Boss Ma Vie EDP | Female | V | Topcoat | 3 | 4 | 3.00 | 0.00 | 0.00 | 0.00 |
| Boss Ma Vie EDP | Female | Vact | Topcoat | 3 | 4 | 3.00 | 0.00 | 0.00 | 0.00 |
| Chanel Bleu EDT | Male | IV | Primer | 0 | 4 | 2.00 | 0.82 | 0.41 | 1.30 |
| Chanel Bleu EDT | Male | IV | Primer | 3 | 4 | 2.50 | 0.58 | 0.29 | 0.92 |
| Chanel Bleu EDT | Male | V | Primer | 0 | 4 | 3.00 | 0.00 | 0.00 | 0.00 |
| Chanel Bleu EDT | Male | V | Primer | 3 | 4 | 3.25 | 0.50 | 0.25 | 0.80 |
| Chanel Bleu EDT | Male | V | Topcoat | 0 | 4 | 2.50 | 1.29 | 0.65 | 2.05 |
| Chanel Bleu EDT | Male | V | Topcoat | 3 | 4 | 3.25 | 0.50 | 0.25 | 0.80 |
| Boss Bottled EDP | Male | IV | Primer | 0 | 4 | 1.75 | 0.50 | 0.25 | 0.80 |
| Boss Bottled EDP | Male | IV | Primer | 3 | 4 | 2.50 | 0.58 | 0.29 | 0.92 |
| Boss Bottled EDP | Male | V | Primer | 0 | 4 | 3.25 | 0.50 | 0.25 | 0.80 |
| Boss Bottled EDP | Male | V | Primer | 3 | 4 | 2.50 | 0.58 | 0.29 | 0.92 |
| Boss Bottled EDP | Male | V | Topcoat | 0 | 4 | 3.00 | 0.82 | 0.41 | 1.30 |
| Boss Bottled EDP | Male | V | Topcoat | 3 | 4 | 3.50 | 0.58 | 0.29 | 0.92 |
| CK One | Male | IV | Primer | 0 | 4 | 2.75 | 0.50 | 0.25 | 0.80 |
| CK One | Male | IV | Primer | 3 | 4 | 3.00 | 0.00 | 0.00 | 0.00 |
| CK One | Male | V | Primer | 0 | 4 | 3.75 | 0.96 | 0.48 | 1.52 |
| CK One | Male | V | Primer | 3 | 4 | 2.50 | 1.00 | 0.50 | 1.59 |
| CK One | Male | V | Topcoat | 0 | 4 | 3.00 | 0.82 | 0.41 | 1.30 |
| CK One | Male | V | Topcoat | 3 | 4 | 2.50 | 0.58 | 0.29 | 0.92 | act—refers to sample where cyclodextrines were activated by expiring one large breath on top of it, and immediately after evaluate by panel.

Table 9 shows the effect of coating compositions and application type (primer or topcoat) on the character of commercial and non-commercial fragrances at t=0 h and t=3 h. Overall, all of the coatings had an impact on the character at t-=3 h (95% CI: 2.72-3.01) and at t=0 h (95% CI: 2.6-2.97) and were significantly higher than score 2 ($p<0.001$, one-side t-test). This indicates a modification of character from the first moment of coating addition. The impact on fragrance character change over time was greater for coating compositions I and II, followed by IV, IV applied as a topcoat and V, and lastly III. These differences were significant at t=3 h (p=0.0021) analyzed with an ANOVA, indicating that the mix of modulators had a stronger effect as expected. Applying the coating composition IV as a primer rather than a topcoat drove a significantly higher character difference (3.21 and 2.9 respectively, two-sample t-test p=0.05). As it can be seen in FIG. 1, the majority of these character differences were due to coatings enhancing the fresh, fruity, floral, green, and citric notes. Other notes such as woody, aromatic and oriental notes were as well enhanced depending on the fragrances used with the coating. Similar results were observed at t=0.

TABLE 10

Evaluation of character difference (1 to 5 scale) of fragrances with coating compositions versus fragrances without coating in fragrances with a hourglass-construction

| Fragrance | Type | Coating Composition | Application | Time [h] | No Evaluators | Mean value | SD | SE |
|---|---|---|---|---|---|---|---|---|
| Lacoste Essential EDT | Male | IV | Primer | 0 | 3 | 2.33 | 0.58 | 0.33 |
| Lacoste Essential EDT | Male | IV | Primer | 3 | 3 | 3.00 | 1.00 | 0.58 |
| Lacoste 1212 Noir EDT | Male | IV | Primer | 0 | 3 | 2.67 | 0.58 | 0.33 |
| Lacoste 1212 Noir EDT | Male | IV | Primer | 3 | 3 | 3.00 | 0.00 | 0.00 |

Table 10 shows the effect of coating composition applied as a primer on two commercial products with a unique fragrance composition. These fragrances were constructed with a similar content of high- and low-volatility fragrance ingredients, and a lower content of mid-volatility fragrance ingredients as per the definitions in this patent. As it can be seen from the results, over time the difference in fragrance character becomes more evident. Surprisingly, the use of the primer composition enhances aromatic, citrus and woody notes, but reduced green notes in contrast to what is observed for other constructions.

Example 3—Solubility Results

Classical perfume contain a high % of ethanol to solubilize perfume raw materials. Surprisingly, by the addition of a high amount of glucam, compensated by a removal of water, some raw materials like Ambroxan and Cedrol Crystals can be further solubilized as shown in Table 11.

In the first case, solubility increased 6.49% whereas in the second one a 57.8%. Furthermore, natural raw materials like Coffee Santos SFE could be solubilized into glucam-containing composition. This gives the opportunity to create new olfactive spaces otherwise impossible.

TABLE 11

Comparison of fragrance material solubility between a classical ethanol solution and a glucam-containing ethanol solution

| Fragrance Material | Max Solubility in 88% Ethanol/12% Water solution | Max Solubility in 83% Ethanol/17% Glucam solution |
|---|---|---|
| Ambroxan | 0.847 g | 0.902 g |
| Cerdol Crystals | 0.273 g | 0.431 g |
| Coffee Santos SFE | 0 g | 0.054 g |

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure.

Additional Embodiments

The following exemplary embodiments are provided, the numbering of which is not to be construed as designating levels of importance:

Embodiment 1 provides a coating composition comprising:
 a carrier; and
 a substantially non-odorous fragrance modulator present in the amount of from about 0.1 wt % to about 50 wt %, relative to the total weight of the composition.

Embodiment 2 provides the coating composition of Embodiment 1, where the substantially non-odorous fragrance modulator is present in the amount of from about 5 wt % to about 20 wt %.

Embodiment 3 provides the coating composition of any one of Embodiments 1 or 2, wherein the at least one substantially non-odorous fragrance modulator is chosen from glucam, methyl glucoside polyol, ethyl glucoside polyol, propyl glucoside polyol, polypropylene glycol-10 methyl glucose ether, ethoxylated methyl glucose ether, polypropylene glycol-20 methyl glucose ether, caprylyl, capryl glucoside, undecyl glucoside, a cyclodextrine, an acrylate, a carboxylated acrylate/octyacrylamide copolymer, or mixtures thereof.

Embodiment 4 provides the coating composition of any one of Embodiments 1-3, wherein the at least one substantially non-odorous fragrance modulator is glucam.

Embodiment 5 provides the coating composition of any one of Embodiments 1-4, wherein the composition is substantially free of isocetyl alcohol, diisobutyl adipate, diisoamyl adipate, polypropylene glycol-3 myristyl ether, and neopentyl glycol diethyl hexanoate, neopentyl glycol diisononanoate, cetearyl ethyl hexanoate, and their mixtures, or a mixture thereof.

Embodiment 6 provides the coating composition of any one of Embodiments 1-5, wherein the at least one substantially non-odorous fragrance modulator is chosen from:
a compound of formula (I):

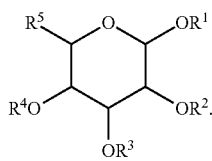

wherein:
R$^1$ is hydrogen, alkyl, alkenyl or alkynyl;
R$^2$ is selected from hydrogen, (C$_2$-C$_{20}$)alkyl, (C$_2$-C$_{20}$)alkenyl, (C$_2$-C$_{20}$)alkynyl, —[R$^6$R$^7$(R$^8$)O]$_w$R$^9$, wherein w is from 1 to 10, preferably 2 to 9;
R$^3$ is selected from hydrogen, alkyl, alkenyl, alkynyl, —[R$^6$R\R$^8$)O]yR$^9$, wherein y is from 1 to 10 or 2 to 9;
R is selected from hydrogen, alkyl, alkenyl, alkynyl, —[R$^6$R\R$^8$)O]xR$^9$, wherein x is from 1 to 10, preferably 2 to 9;
R$^5$ is selected from hydrogen, alkyl, alkenyl, alkynyl, —R$^6$OR$^9$, —R$^6$O [R$^6$R$^7$(R$^8$)O]zR$^9$,
wherein z is from 1 to 10, preferably 2 to 9;
each R$^6$ and R$^7$ are independently selected from (C$_2$-C$_{20}$)alkylene, (C$_2$-C$_{20}$)alkenylene, or (C$_2$-C$_{20}$)alkynylene; and
each R$^8$ and R$^9$ is independently selected from hydrogen or alkyl,
a compound of formula (II):

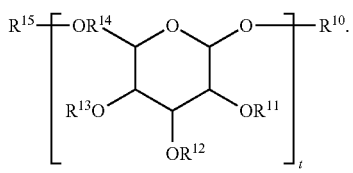

wherein:
R$^{10}$ is hydrogen, (C$_2$-C$_{20}$)alkyl, (C$_2$-C$_{20}$)alkenyl or (C$_2$-C$_{20}$)alkynyl;
each R$^{11}$ is independently selected from hydrogen, (C$_2$-C$_{20}$)alkyl, (C$_2$-C$_{20}$)alkenyl, (C$_2$-C$_{20}$)alkynyl;
each R$^{12}$ is independently selected from hydrogen, (C$_2$-C$_{20}$)alkyl, (C$_2$-C$_{20}$)alkenyl, or (C$_2$-C$_{20}$)alkynyl;
each R$^3$ is independently selected from hydrogen, (C$_2$-C$_{20}$)alkyl, (C$_2$-C$_{20}$)alkenyl, or (C$_2$-C$_{20}$)alkynyl;
each R$^{14}$ is selected from (C$_2$-C$_{20}$)alkylene, (C$_2$-C$_{20}$)alkenylene, or (C$_2$-C$_{20}$)alkynylene; and
R$^{15}$ is hydrogen, (C$_2$-C$_{20}$)alkyl, (C$_2$-C$_{20}$)alkenyl or (C$_2$-C$_{20}$) alkynyl;
wherein t is 5 or less, preferably 1, 2 or 3;
Sucrose Laurate, Sucrose Dilaurate, Sucrose Myristate, Sucrose Palmitate, Sucrose Stearate, Sucrose Distearate, Sucrose Tristearate, and their mixtures;
Trimethylcyclohexane derivatives having the formula (III):

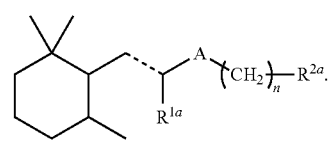

wherein:
n is 0, 1 or 2;
A is C=O or CH—OH;
R$^{1a}$ is hydrogen or methyl;
R$^{2a}$ is a C$_2$-C$_{10}$ hydrocarbon group; and
is a saturated or unsaturated carbon-carbon bond;
L-methoxy ether derivatives having the formula (IV):

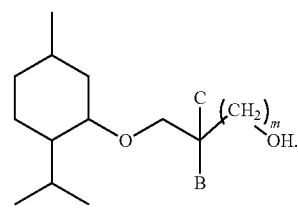

wherein:
m is 0, 1 or 2;
B is hydrogen or OH;
and C is hydrogen or
methyl;
Tetra-hydronaphthalene derivatives having the formula (V):

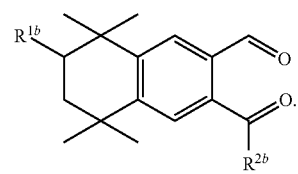

wherein:
$R^{1b}$ is hydrogen or methyl; and
$R^{2b}$ is alkyl;
140
Hyaluronic acid disaccharide sodium salt, sodium hyaluronate and their mixtures;
Ether derivatives having the formula (VI) or formula (VII):

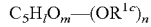  (VI).

wherein:
$C_5H_lO_m$ is a pentose residue, wherein l is an integer from 6 to 9, and m is an integer from 1 to 4;
n is an integer from 1 to 4; and
$R^{1c}$ is $C_4$-$C_{20}$ hydrocarbon group; and

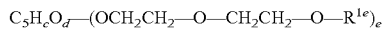  (VII)

wherein:
$C_6H_xO_y$ is a hexose residue, wherein x is an integer from 7 to 11, and y is an integer from 1 to 5;
z is an integer from 1 to 5: and
$R^{1d}$ is $C_4$-$C_{20}$ hydrocarbon group; and
Diethylene Glycol Ether derivatives having the formula (VIII) or formula (IX):

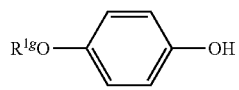  (VIII)

wherein:
$C_5H_cO_d$ is a pentose residue, wherein c is an integer from 6 to 8,
and d is an integer from 1 to 3;
e is an integer from 2 to 4;
and $R^{1e}$ is $C_1$-$C_6$ alkyl
group; and

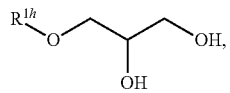

wherein:
$C_6H_fO_g$ is a hexose residue, wherein f is an integer from 7 to 10, and g is an integer from 1 to 4;
h is an integer from 2 to 5;
and $R^{1f}$ is $C_1$-$C_6$ alkyl
group;
Hydroquinone Glycoside derivatives having the formula (X):

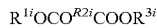  (X).

wherein:
$R^{1g}$ is selected from the group consisting of: (i) pentose residue, hexose residue, aminosaccharide residue, uronic acid residue and their mixtures; (ii) methylated versions of group (i); and (iii) mixtures of groups (i) and (ii); and Propylene Glycol Propyl Ether; Dicetyl Ether; Polyglycerin-4 Ethers; Isoceteth-5; Isoceteth-7; Isoceteth-10; Isoceteth-12; Isoceteth-15; Isoceteth-20; Isoceteth-25; Isoceteth-30; Disodium Lauroamphodipropionate; Hexaethylene glycol monododecyl ether; and their mixtures;

Glyceryl Ether derivatives having the formula (XI):

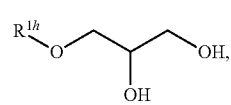  (XI)

wherein:
$R^{1h}$ is $C_4$-$C_{12}$ aliphatic hydrocarbon group;
Panthenol Ethyl Ether, DL-Panthenol and their mixtures;
Aliphatic Dibasic Acid Diester derivatives having the formula (XII):

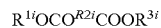  (XII).

wherein:
$R^{1i}$ is $C_4$-$C_5$ alkyl;
$R^{2i}$ is $C_4$ alkylene;
and $R^{3i}$ is $C_4$-$C_5$
alkyl; and
Aliphatic Ether derivatives having the formula (XIII):

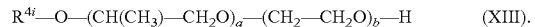  (XIII).

wherein:
a and b are integers such that the sum of a and b is from 1 to 4;
and $R^{4i}$ is an aliphatic chain comprising from 8 to 18 carbons;
N-hexadecyl n-nonanoate, N-octadecyl n-nonanoate and their mixtures;
Tricyclodecane Amide derivatives selected from the group consisting of:
the compounds of formula (XIV):

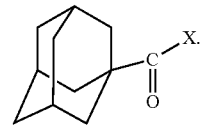  (XIV)

wherein:
X is selected from:

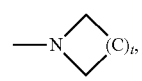  (Xa)

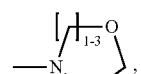  (Xb)

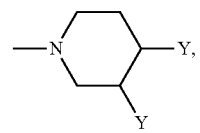  (Xc)

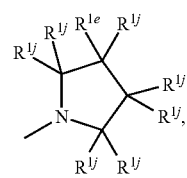  (Xd)

-continued

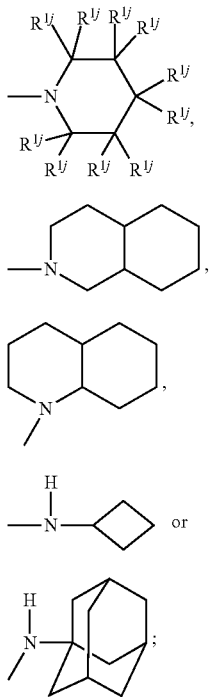

t is 1 to 8;
Y is hydrogen, or a halogen; and
each $R^{1j}$ is independently selected from a hydrogen, or $C_1$-$C_4$ alkyl;
the compounds of formula (XV):

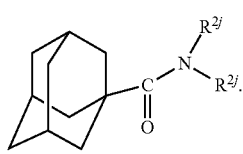

(XV)

wherein:
each $R^{2j}$ is independently selected from a hydrogen, methyl, ethyl or $C_3$-$C_{18}$ alkyl, cycloalkyl or cycloheteroalkyl, with the proviso that both $R^{2e}$ groups are not hydrogen; and
mixtures of the compounds of formulae (XII) and (XIII); and
mixtures thereof.

Embodiment 7 provides the coating composition of any one of Embodiments 1-6, wherein the coating composition comprises a plurality of modulators.

Embodiment 8 provides the coating composition of any one of Embodiments 1-7, wherein the carrier is an aqueous carrier or an organic carrier.

Embodiment 9 provides the coating composition of Embodiment 8, wherein the aqueous carrier is water.

Embodiment 10 provides the coating composition of any one of Embodiments 1-9, wherein the organic carrier is ethanol, dipropylene glycol, benzyl benzoate, diethyl phthalate, isopropyl myristate, ($C_1$-$C_{20}$)alkyl, ($C_1$-$C_{20}$)alkenyl, ($C_1$-$C_{20}$)alkynyl, ($C_1$-$C_{20}$)hydroxyl, or mixtures thereof.

Embodiment 11 provides the coating composition of any one of Embodiments 1-10, further comprising; a chelator, a thickener, an antioxidant, an emulsifier, or a combination thereof.

Embodiment 12 provides the coating composition of any one of Embodiments 1-11, further comprising at least one capsule dispersed in the composition.

Embodiment 13 provides the coating composition of Embodiment 12, wherein the at least one capsule comprises a fragrance component located therein.

Embodiment 14 provides the coating composition of any one of Embodiments 12 or 13, wherein the at least one capsule comprises a capsule wall comprising polyacrylates; polyethylenes; polyamides; polystyrenes; polyisoprenes; polycarbonates; polyesters; polyureas; polyurethanes; polyolefins; polysaccharides; epoxy resins; vinyl polymers; urea cross-linked with formaldehyde or gluteraldehyde; melamine cross-linked with formaldehyde; gelatin-polyphosphate coacervates optionally cross-linked with gluteraldehyde; gelatin-gum Arabic coacervates; cross-linked silicone fluids; polyamine reacted with polyisocyanates; acrylate monomers polymerized via free radical polymerization; silk; wool; gelatine; cellulose; proteins; and combinations thereof.

Embodiment 15 provides the coating composition of any one of Embodiments 12-14, wherein the at least one capsule is configured to degrade.

Embodiment 16 provides the coating composition of any one of Embodiments 1-15, wherein the coating composition is a primer or a top-coat.

Embodiment 17 provides a multi-component fragrance composition comprising:
the coating composition according to any one of Embodiments 1-16;
a fragrance composition in contact with the coating composition.

Embodiment 18 provides the multi-component fragrance composition of Embodiment 17, wherein the fragrance composition comprises:
a fragrance component present in an amount of from about 0.04 wt % to about 30 wt %, relative to the total weight of the composition, and wherein the fragrance component comprises at least one of:
at least one low volatile fragrance material having a vapor pressure less than 0.001 Torr (0.000133 kPa) at 25° C. present in an amount greater than 30 wt %, relative to the total weight of the fragrance component;
at least one moderate volatile fragrance material having a vapor pressure in the range of 0.1 Torr to 0.001 Torr (0.0133 kPa to 0.000133 kPa) at 25° C. present in an amount of from about 30 wt % to about 70 wt %, relative to the total weight of the fragrance component; and
at least one high volatile fragrance material having a vapor pressure greater than 0.1 Torr (0.0133 kPa) at 25° C. present in an amount of from about 0 wt % to about 30 wt % relative to the total weight of the fragrance component.

Embodiment 19 provides the multi-component fragrance composition of Embodiment 18, wherein the fragrance composition further comprises at least one substantially non-odorous fragrance modulator present in the amount of from about 0.1 wt % to about 20 wt %, relative to the total weight of the composition.

Embodiment 20 provides the multi-component fragrance composition of any one of Embodiments 18 or 19, wherein the at least one low volatile fragrance material is present in an amount of from 31 wt % to about 60 wt % relative to the total weight of the fragrance material.

Embodiment 21 provides the multi-component fragrance composition of any one of Embodiments 18-20, wherein the at least one moderate volatile fragrance material is present in an amount of from about 35 wt % to about 60 wt % relative to the total weight of the fragrance material.

Embodiment 22 provides the multi-component fragrance composition of any one of Embodiments 18-21, wherein the at least one high volatile fragrance material is present in an amount of from about 1 wt % to about 30 wt % relative to the total weight of the fragrance material.

Embodiment 23 provides the multi-component fragrance composition of any one of Embodiments 18-22, wherein the high volatile fragrance material is chosen from any of the materials or combinations of materials listed in any one of Tables 4A and 4B.

Embodiment 24 provides the multi-component fragrance composition of any one of Embodiments 18-23, wherein the low volatile fragrance material is chosen from chosen from any of the materials or combinations of materials listed in any one of Tables 2A and 2B.

Embodiment 25 provides the multi-component fragrance composition of any one of Embodiments 18-24, wherein the moderate volatile fragrance material is chosen from chosen from any of the materials or combinations of materials listed in any one of Tables 3A and 3B.

Embodiment 26 provides the multi-component fragrance composition of Embodiment 17, wherein the fragrance composition comprises:
  a fragrance component present in an amount of from about 0.04 wt % to about 30 wt %, relative to the total weight of the composition, and wherein the fragrance component comprises at least one of:
    at least one low volatile fragrance material having a vapor pressure less than 0.001 Torr (0.000133 kPa) at 25° C. present in an amount of from about 0 wt % to about 30 wt % relative to the total weight of the fragrance component;
    at least one moderate volatile fragrance material having a vapor pressure in the range of 0.1 Torr to 0.001 Torr (0.0133 kPa to 0.000133 kPa) at 25° C. present in an amount of from about 30 wt % to about 70 wt %, relative to the total weight of the fragrance component; and
    at least one high volatile fragrance material having a vapor pressure greater than 0.1 Torr (0.0133 kPa) at 25° C. present in an amount greater than about 30 wt % relative to the total weight of the fragrance component.

Embodiment 27 provides the multi-component fragrance composition of Embodiment 26, wherein the fragrance composition further comprises at least one substantially non-odorous fragrance modulator present in the amount of from about 0.1 wt % to about 20 wt %, relative to the total weight of the composition.

Embodiment 28 provides the multi-component fragrance composition of any one of Embodiments 26 or 2627 wherein the at least one high volatile fragrance material is present in an amount of from 31 wt % to about 60 wt % relative to the total weight of the fragrance material.

Embodiment 29 provides the multi-component fragrance composition of any one of Embodiments 26-28, wherein the at least one moderate volatile fragrance material is present in an amount of from about 35 wt % to about 60 wt % relative to the total weight of the fragrance material.

Embodiment 30 provides the multi-component fragrance composition of any one of Embodiments 26-29, wherein the at least one low volatile fragrance material is present in an amount of from about 1 wt % to about 30 wt % relative to the total weight of the fragrance material.

Embodiment 31 provides the multi-component fragrance composition of any one of Embodiments 26-30, wherein the high volatile fragrance material is chosen from any of the materials or combinations of materials listed in any one of Tables 4A and 4B.

Embodiment 32 provides the multi-component fragrance composition of any one of Embodiments 26-31, wherein the low volatile fragrance material is chosen from chosen from any of the materials or combinations of materials listed in any one of Tables 2A and 2B.

Embodiment 33 provides the multi-component fragrance composition of any one of Embodiments 26-32, wherein the moderate volatile fragrance material is chosen from chosen from any of the materials or combinations of materials listed in any one of Tables 3A and 3B.

Embodiment 34 provides the multi-component fragrance composition of Embodiment 17, wherein the fragrance composition comprises:
  a fragrance component present in an amount of from about 0.04 wt % to about 30 wt %, relative to the total weight of the composition, and wherein the fragrance component comprises at least one of:
    at least one low volatile fragrance material having a vapor pressure less than 0.001 Torr (0.000133 kPa) at 25° C. present in an amount or from about 30 wt % to about 70 wt %, relative to the total weight of the fragrance component;
    at least one moderate volatile fragrance material having a vapor pressure in the range of 0.1 Torr to 0.001 Torr (0.0133 kPa to 0.000133 kPa) at 25° C. present in an amount less than about 30 wt %, relative to the total weight of the fragrance component; and
    at least one high volatile fragrance material having a vapor pressure greater than 0.1 Torr (0.0133 kPa) at 25° C. present in an amount of from about 0.1 wt % to about 30 wt % relative to the total weight of the fragrance component.

Embodiment 35 provides the multi-component fragrance composition of Embodiment 34, wherein the fragrance composition further comprises at least one substantially non-odorous fragrance modulator present in the amount of from about 0.1 wt % to about 20 wt %, relative to the total weight of the composition.

Embodiment 36 provides the multi-component fragrance composition of any one of Embodiments 34 or 35, wherein the at least one moderate volatile fragrance material is present in an amount of from 1 wt % to about 30 wt % relative to the total weight of the fragrance material.

Embodiment 37 provides the multi-component fragrance composition of any one of Embodiments 34-36, wherein the at least one high volatile fragrance material is present in an amount of from about 35 wt % to about 60 wt % relative to the total weight of the fragrance material.

Embodiment 38 provides the multi-component fragrance composition of any one of Embodiments 34-37, wherein the at least one low volatile fragrance material is present in an amount of from about 1 wt % to about 30 wt % relative to the total weight of the fragrance material.

Embodiment 39 provides the multi-component fragrance composition of any one of Embodiments 34-38, wherein the high volatile fragrance material is chosen from any of the materials or combinations of materials listed in any one of Tables 4A and 4B.

Embodiment 40 provides the multi-component fragrance composition of any one of Embodiments 34-39, wherein the low volatile fragrance material is chosen from chosen from any of the materials or combinations of materials listed in any one of Tables 2A and 2B.

Embodiment 41 provides the multi-component fragrance composition of any one of Embodiments 34-40, wherein the moderate volatile fragrance material is chosen from chosen from any of the materials or combinations of materials listed in any one of Tables 3A and 3B.

Embodiment 42 provides the multi-component fragrance composition of Embodiment 17, wherein the fragrance composition comprises:
  a fragrance component present in an amount of from about 0.04 wt % to about 30 wt %, relative to the total weight of the composition, and wherein the fragrance component comprises at least one of:
    at least one low volatile fragrance material having a vapor pressure less than 0.001 Torr (0.000133 kPa) at 25° C.;
    at least one moderate volatile fragrance material having a vapor pressure in the range of 0.1 Torr to 0.001 Torr (0.0133 kPa to 0.000133 kPa) at 25° C.; and
    at least one high volatile fragrance material having a vapor pressure greater than 0.1 Torr (0.0133 kPa) at 25° C.,
    wherein the at least one low volatile fragrance material, at least one moderate volatile fragrance material, and at least one high volatile fragrance material are individually present in substantially the same amount relative to the total weight of the fragrance component.

Embodiment 43 provides the multi-component fragrance composition of any one of Embodiment 42, wherein the composition maintains a perceived fragrance profile, particularly the characters attributable to the moderate volatile fragrance material, low volatile fragrance material, or high volatile fragrance material, to remain substantively unchanged from application up to 2 hrs, 3 hrs, 4 hrs, 5 hrs, 6 hrs or 8 hrs after application vs. a control composition that does not include the coating.

Embodiment 44 provides the multi-component fragrance composition of any one of Embodiments 42 or 43, wherein the composition maintains a perceived fragrance profile, particularly the characters attributable to the moderate volatile fragrance material, low volatile fragrance material, or high volatile fragrance material, to be substantially enhanced from application up to 2 hrs, 3 hrs, 4 hrs, 5 hrs, 6 hrs or 8 hrs after application vs. a control composition that does not include the coating.

Embodiment 45 provides the multi-component fragrance composition of Embodiment 17, wherein the fragrance composition comprises:
  a fragrance component present in an amount of from about 0.04 wt % to about 30 wt %, relative to the total weight of the composition, and wherein the fragrance component comprises at least one of:
    at least one low volatile fragrance material having a vapor pressure less than 0.001 Torr (0.000133 kPa) at 25° C. present in an amount of greater than about 30 wt % relative to the total weight of the fragrance component;
    at least one high volatile fragrance material having a vapor pressure greater than 0.1 Torr (0.0133 kPa) at 25° C. present in an amount greater than about 30 wt % relative to the total weight of the fragrance component; and
    at least one moderate volatile fragrance material having a vapor pressure in the range of 0.1 Torr to 0.001 Torr (0.0133 kPa to 0.000133 kPa) at 25° C. present in an amount of less than about 30 wt %, relative to the total weight of the fragrance component.

Embodiment 46 provides the multi-component fragrance composition of Embodiment 45, wherein the fragrance composition further comprises at least one substantially non-odorous fragrance modulator present in the amount of from about 0.1 wt % to about 20 wt %, relative to the total weight of the composition.

Embodiment 47 provides the multi-component fragrance composition of any one of Embodiments 45 or 46, wherein the at least one high volatile fragrance material is present in an amount of from 31 wt % to about 60 wt % relative to the total weight of the fragrance material.

Embodiment 48 provides the multi-component fragrance composition of any one of Embodiments 45-47, wherein the at least one low volatile fragrance material is present in an amount of from about 30 wt % to about 60 wt % relative to the total weight of the fragrance material.

Embodiment 49 provides the multi-component fragrance composition of any one of Embodiments 45-48, wherein the high volatile fragrance material is chosen from any of the materials or combinations of materials listed in any one of Tables 4A and 4B.

Embodiment 50 provides the multi-component fragrance composition of any one of Embodiments 45-49, wherein the low volatile fragrance material is chosen from chosen from any of the materials or combinations of materials listed in any one of Tables 2A and 2B.

Embodiment 51 provides the multi-component fragrance composition of any one of Embodiments 45-50, wherein the moderate volatile fragrance material is chosen from chosen from any of the materials or combinations of materials listed in any one of Tables 3A and 3B.

Embodiment 52 provides the multi-component fragrance composition of Embodiment 17, wherein the fragrance composition comprises:
  a fragrance component present in an amount of from about 0.04 wt % to about 30 wt %, relative to the total weight of the composition, and wherein the fragrance component comprises at least one of:
    at least one low volatile fragrance material having a vapor pressure less than 0.001 Torr (0.000133 kPa) at 25° C. present in an amount of from about 30 wt % to about 40 wt %, relative to the total weight of the fragrance component;
    at least one moderate volatile fragrance material having a vapor pressure in the range of 0.1 Torr to 0.001 Torr (0.0133 kPa to 0.000133 kPa) at 25° C. present in an amount of from about 30 wt % to about 40 wt %, relative to the total weight of the fragrance component; and
    at least one high volatile fragrance material having a vapor pressure greater than 0.1 Tor (0.0133 kPa) at 25° C. present in an amount of from about 30 wt % to about 40 wt %, relative to the total weight of the fragrance component.

Embodiment 53 provides the multi-component fragrance composition of Embodiment 52, wherein the fragrance composition further comprises at least one substantially non-odorous fragrance modulator present in the amount of from about 0.1 wt % to about 20 wt %, relative to the total weight of the composition.

Embodiment 54 provides the multi-component fragrance composition of any one of Embodiments 52 or 53, wherein the at least one high volatile fragrance material is present in an amount of from 32 wt % to about 35 wt % relative to the total weight of the fragrance material.

Embodiment 55 provides the multi-component fragrance composition of any one of Embodiments 52-54, wherein the at least one moderate volatile fragrance material is present in an amount of from about 32 wt/u to about 35 wt % relative to the total weight of the fragrance material.

Embodiment 56 provides the multi-component fragrance composition of any one of Embodiments 52-55, wherein the at least one low volatile fragrance material is present in an amount of from about 32 wt % to about 35 wt % relative to the total weight of the fragrance material.

Embodiment 57 provides the multi-component fragrance composition of any one of Embodiments 52-56, wherein the high volatile fragrance material is chosen from any of the materials or combinations of materials listed in any one of Tables 4A and 4B.

Embodiment 58 provides the multi-component fragrance composition of any one of Embodiments 52-57, wherein the low volatile fragrance material is chosen from chosen from any of the materials or combinations of materials listed in any one of Tables 2A and 2B.

Embodiment 59 provides the multi-component fragrance composition of any one of Embodiments 52-58, wherein the moderate volatile fragrance material is chosen from chosen from any of the materials or combinations of materials listed in any one of Tables 3A and 3B.

Embodiment 60 provides the multi-component fragrance composition of Embodiment 17, wherein the fragrance composition comprises:
- a fragrance component present in an amount of from about 0.04 wt % to about 30 wt %, relative to the total weight of the composition, and wherein the fragrance component comprises:
  - at least one low volatile fragrance material having a vapor pressure less than 0.001 Torr (0.000133 kPa) at 25° C. present in an amount less than 30 wt % relative to the total weight of the fragrance component;
  - at least one moderate volatile fragrance material having a vapor pressure in the range of 0.1 Torr to 0.001 Torr (0.0133 kPa to 0.000133 kPa) at 25° C. present in an amount of higher than 45% relative to the total weight of the fragrance component; and
  - at least one high volatile fragrance material having a vapor pressure greater than 0.1 Torr (0.0133 kPa) at 25° C. present in an amount less than 25 wt % relative to the total weight of the fragrance component.

Embodiment 61 provides the multi-component fragrance composition of Embodiment 60, wherein the fragrance composition further comprises at least one substantially non-odorous fragrance modulator present in the amount of from about 0.1 wt % to about 20 wt %, relative to the total weight of the composition.

Embodiment 62 provides the multi-component fragrance composition of any one of Embodiments 60 or 61, wherein the at least one moderate volatile fragrance material is present in an amount of from 45 wt % to about 80 wt % relative to the total weight of the fragrance material.

Embodiment 63 provides the multi-component fragrance composition of any one of Embodiments 60-62, wherein the at least one high volatile fragrance material is present in an amount of from about 1 wt % to about 30 wt % relative to the total weight of the fragrance material.

Embodiment 64 provides the multi-component fragrance composition of any one of Embodiments 60-64, wherein the at least one low volatile fragrance material is present in an amount of from about 1 wt % to about 30 wt % relative to the total weight of the fragrance material.

Embodiment 65 provides the multi-component fragrance composition of any one of Embodiments 60-65, wherein the high volatile fragrance material is chosen from any of the materials or combinations of materials listed in any one of Tables 4A and 4B.

Embodiment 66 provides the multi-component fragrance composition of any one of Embodiments 60-65, wherein the low volatile fragrance material is chosen from chosen from any of the materials or combinations of materials listed in any one of Tables 2A and 2B.

Embodiment 67 provides a method of using the coating composition of any one of Embodiments 1-16, the method comprising contacting the fragrance composition of any one of Embodiments 17-66 with the coating composition.

Embodiment 68 provides the method of Embodiment 67, wherein the coating composition is applied to a substrate and the fragrance component is applied to the coating composition.

Embodiment 69 provides the method of Embodiment 68, wherein the substrate comprises keratin or a fabric.

Embodiment 70 provides the method of Embodiment 69, wherein the fragrance component is applied to a substrate and the coating composition is applied to the fragrance component.

Embodiment 71 provides the method of Embodiment 70, wherein the substrate comprises keratin or a fabric.

Embodiment 72 provides the coating composition of any one of Embodiments 1-16, wherein the coating composition is free of a fragrance material.

Embodiment 73 provides the coating composition of any one of Embodiments 1-16 and 72, wherein the coating composition is substantially free of;
- at least one low volatile fragrance material having a vapor pressure less than 0.001 Torr (0.000133 kPa) at 25° C.;
- at least one moderate volatile fragrance material having a vapor pressure in the range of 0.1 Torr to 0.001 Torr (0.0133 kPa to 0.000133 kPa) at 25° C.; and
- at least one high volatile fragrance material having a vapor pressure greater than 0.1 Torr (0.0133 kPa) at 25° C.

Embodiment 74 provides the coating composition of any one of Embodiments 1-16 and 72-73, wherein,
- the high volatile fragrance material is chosen from any of the materials or combinations of materials listed in any one of Tables 4A and 4B;
- the low volatile fragrance material is chosen from chosen from any of the materials or combinations of materials listed in any one of Tables 2A and 2B; and
- the moderate volatile fragrance material is chosen from chosen from any of the materials or combinations of materials listed in any one of Tables 3A and 3B.

Embodiment 75 provides the coating composition of any one of Embodiments 1-16 and 72-74 wherein the composition consists essentially of substantially non-odorous materials.

Embodiment 76 provides a method to enhance the fragrance profile of a composition or improve the longevity of an aroma, comprising bringing into contact or mixing at least one non-odorous fragrance modulator with at least one low volatile fragrance material, high volatile fragrance material, and moderate volatile fragrance material according to a coating composition of any one of Embodiments 17-75.

What is claimed is:

1. A coating composition comprising:
    a carrier; and
    a substantially non-odorous fragrance modulator present in the amount of from about 6 wt % to about 50 wt %, relative to the total weight of the composition,
    wherein the at least one substantially non-odorous fragrance modulator is chosen from methyl glucoside polyol, ethyl glucoside polyol, propyl glucoside polyol, polypropylene glycol-10 methyl glucose ether, ethoxylated methyl glucose ether, polypropylene glycol-20 methyl glucose ether, caprylyl, capryl glucoside, undecyl glucoside, a cyclodextrine, an acrylate, a carboxylated acrylate/octyacrylamide copolymer, or mixtures thereof
    wherein the coating composition is substantially free of;
        at least one low volatile fragrance material having a vapor pressure less than 0.001 Torr (0.000133 kPa) at 25° C.;
        at least one moderate volatile fragrance material having a vapor pressure in the range of 0.1 Torr to 0.001 Torr (0.0133 kPa to 0.000133 kPa) at 25° C.; and
        at least one high volatile fragrance material having a vapor pressure greater than 0.1 Torr (0.0133 kPa) at 25° C.

2. The coating composition of claim 1, where the substantially non-odorous fragrance modulator is present in the amount of from about 10 wt % to about 20 wt %.

3. The coating composition of claim 1, wherein the at least one substantially non-odorous fragrance modulator is polypropylene glycol-20 methyl glucose ether.

4. The coating composition of claim 1, wherein the composition is substantially free of isocetyl alcohol, diisobutyl adipate, diisoamyl adipate, polypropylene glycol-3 myristyl ether, and neopentyl glycol diethyl hexanoate, neopentyl glycol diisononanoate, cetearyl ethyl hexanoate, or a mixture thereof.

5. The coating composition of claim 1, wherein the coating composition comprises a plurality of modulators.

6. The coating composition of claim 1, wherein the carrier is an aqueous carrier or an organic carrier.

7. The coating composition of claim 6, wherein the aqueous carrier is water.

8. The coating composition of claim 1, wherein the organic carrier is ethanol, dipropylene glycol, benzyl benzoate, diethyl phthalate, isopropyl myristate, ($C_1$-$C_{20}$) alkyl, ($C_1$-$C_{20}$) alkenyl, ($C_1$-$C_{20}$) alkynyl, ($C_1$-$C_{20}$) hydroxyl, or mixtures thereof.

9. The coating composition of claim 1, further comprising;
    a chelator, a thickener, an antioxidant, an emulsifier, or a combination thereof.

10. The coating composition of claim 1, further comprising at least one capsule dispersed in the composition.

11. The coating composition of claim 10, wherein the at least one capsule comprises a fragrance component located therein.

12. The coating composition of claim 10, wherein the at least one capsule comprises a capsule wall comprising polyacrylates; polyethylenes; polyamides; polystyrenes; polyisoprenes; polycarbonates; polyesters; polyureas; polyurethanes; polyolefins; polysaccharides; epoxy resins; vinyl polymers; urea cross-linked with formaldehyde or luteraldehyde; melamine cross-linked with formaldehyde; gelatin-polyphosphate coacervates optionally cross linked with gluteraldehyde; gelatin-gum Arabic coacervates; cross-linked silicone fluids; polyamine reacted with polyisocyanates; acrylate monomers polymerized via free radical polymerization; silk; wool; gelatine; cellulose; proteins; and combinations thereof.

13. The coating composition of claim 10, wherein the at least one capsule is configured to degrade.

14. The coating composition of claim 1, wherein the coating composition is a primer or a top-coat.

15. A multi-component fragrance composition comprising:
    the coating composition according to claim 1;
    a fragrance composition in contact with the coating composition.

16. The multi-component fragrance composition of claim 15, wherein the fragrance composition comprises:
    a fragrance component present in an amount of from about 0.04 wt % to about 30 wt %, relative to the total weight of the composition, and wherein the fragrance component comprises at least one of:
    at least one low volatile fragrance material having a vapor pressure less than 0.001 Torr (0.000133 kPa) at 25° C. present in an amount greater than 30 wt %, relative to the total weight of the fragrance component;
    at least one moderate volatile fragrance material having a vapor pressure in the range of 0.1 Torr to 0.001 Torr (0.0133 kPa to 0.000133 kPa) at 25° C. present in an amount of from about 30 wt % to about 70 wt %, relative to the total weight of the fragrance component; and
    at least one high volatile fragrance material having a vapor pressure greater than 0.1 Torr (0.0133 kPa) at 25° C. present in an amount of from about 0 wt % to about 30 wt % relative to the total weight of the fragrance component.

17. The multi-component fragrance composition of claim 15, wherein the fragrance composition comprises:
    a fragrance component present in an amount of from about 0.04 wt % to about 30 wt %, relative to the total weight of the composition, and wherein the fragrance component comprises at least one of:
    at least one low volatile fragrance material having a vapor pressure less than 0.001 Torr (0.000133 kPa) at 25° C. present in an amount of from about 0 wt % to about 30 wt % relative to the total weight of the fragrance component;
    at least one moderate volatile fragrance material having a vapor pressure in the range of 0.1 Torr to 0.001 Torr (0.0133 kPa to 0.000133 kPa) at 25° C. present in an amount of from about 30 wt % to about 70 wt %, relative to the total weight of the fragrance component; and
    at least one high volatile fragrance material having a vapor pressure greater than 0.1 Torr (0.0133 kPa) at 25° C. present in an amount greater than about 30 wt % relative to the total weight of the fragrance component.

18. The multi-component fragrance composition of claim 15, wherein the fragrance composition comprises:
    a fragrance component present in an amount of from about 0.04 wt % to about 30 wt %, relative to the total weight of the composition, and wherein the fragrance component comprises at least one of:
    at least one low volatile fragrance material having a vapor pressure less than 0.001 Torr (0.000133 kPa) at 25° C.

present in an amount of greater than about 30 wt % relative to the total weight of the fragrance component;

at least one high volatile fragrance material having a vapor pressure greater than 0.1 Torr (0.0133 kPa) at 25° C. present in an amount greater than about 30 wt % relative to the total weight of the fragrance component; and at least one moderate volatile fragrance material having a vapor pressure in the range of 0.1 Torr to 0.001 Torr (0.0133 kPa to 0.000133 kPa) at 25° C. present in an amount of less than about 30 wt %, relative to the total weight of the fragrance component.

* * * * *